(12) United States Patent
Go et al.

(10) Patent No.: US 10,562,227 B2
(45) Date of Patent: Feb. 18, 2020

(54) SYSTEMS, DEVICES, AND METHODS FOR HIGH-THROUGHPUT THREE-DIMENSIONAL PRINTING

(71) Applicant: Massachusetts Institute of Technology, Cambridge, MA (US)

(72) Inventors: Jamison Go, Orlando, FL (US); Anastasios John Hart, Waban, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 368 days.

(21) Appl. No.: 15/260,813

(22) Filed: Sep. 9, 2016

(65) Prior Publication Data

US 2017/0151704 A1  Jun. 1, 2017

Related U.S. Application Data

(60) Provisional application No. 62/261,394, filed on Dec. 1, 2015.

(51) Int. Cl.
*B29C 64/209* (2017.01)
*B33Y 30/00* (2015.01)
(Continued)

(52) U.S. Cl.
CPC ............ *B29C 64/209* (2017.08); *B33Y 30/00* (2014.12); *B29C 48/0023* (2019.02); *B29C 48/02* (2019.02);
(Continued)

(58) Field of Classification Search
CPC . B29C 64/106; B29C 48/0023; B29C 64/209; B29C 64/20; B29C 64/118;
(Continued)

(56) References Cited

U.S. PATENT DOCUMENTS 3,222,904 A   12/1965  Ernestus
5,121,329 A *  6/1992  Crump ................... B22F 3/115
                                                    228/180.5
(Continued)

FOREIGN PATENT DOCUMENTS

WO   2015/050958 A2   4/2015
WO   2015/175651 A1  11/2015

OTHER PUBLICATIONS

Wohlers, T. T., et al., "Wohlers Report 2015: 3D Printing and Additive Manufacturing State of the Industry Annual Worldlvide Progress Report," Fort Collins, CO: Wohlers Associates, 2015. (pp. 3-9,32-42, 55, 64).

(Continued)

*Primary Examiner* — Joseph S Del Sole
*Assistant Examiner* — Jerzi H Moreno Hernandez
(74) *Attorney, Agent, or Firm* — Nutter McClennen & Fish LLP

(57) ABSTRACT

Printing devices and methods are provided that utilize high throughput extrusion to generate a printer material, such as a three-dimensional object. High-throughput extrusion systems as provided volumetrically pre-heat an extruded filament to a desired pre-heat temperature, and then either maintain or heat the extruded filament to a desired melt temperature prior to having the filament extruded out of the system and onto a surface, such as a build platform. By pre-heating the filament prior to heating it to the temperature at which it is excluded, it helps increase the throughput of the system. Likewise, by doing the heating volumetrically, it further helps increase the throughput of the system. Various embodiments of devices and methods typically used for printing in conjunction with the disclosed high throughput systems are also provided.

24 Claims, 35 Drawing Sheets

(51) Int. Cl.
  *B29C 64/20* (2017.01)
  *B29C 64/118* (2017.01)
  *B29C 48/02* (2019.01)
  *B29C 48/00* (2019.01)
  *B29C 48/285* (2019.01)
  *B29C 48/86* (2019.01)

(52) U.S. Cl.
  CPC ........ *B29C 48/2886* (2019.02); *B29C 48/865* (2019.02); *B29C 48/873* (2019.02); *B29C 64/118* (2017.08); *B29C 64/20* (2017.08)

(58) Field of Classification Search
  CPC ..... B29C 48/873; B29C 48/865; B29C 48/02; B29C 48/2886; B33Y 30/00; B33Y 10/00; D01H 5/00; B29K 2105/12
  See application file for complete search history.

(56) References Cited

U.S. PATENT DOCUMENTS

| | | | |
|---|---|---|---|
| 6,004,124 | A | 12/1999 | Swanson et al. |
| 6,722,872 | B1 | 4/2004 | Swanson et al. |
| 6,749,414 | B1 | 6/2004 | Hanson et al. |
| 7,125,512 | B2 | 10/2006 | Crump et al. |
| 8,647,098 | B2 | 2/2014 | Swanson et al. |
| 2009/0274540 | A1* | 11/2009 | Batcheder ............. B65H 51/00 414/431 |
| 2010/0021580 | A1* | 1/2010 | Swanson ............... B29C 31/042 425/132 |
| 2011/0074065 | A1 | 3/2011 | Batchelder et al. |
| 2011/0076495 | A1* | 3/2011 | Batchelder .......... B29C 47/0038 428/369 |
| 2012/0070523 | A1* | 3/2012 | Swanson ............. B29C 47/0002 425/96 |
| 2014/0252684 | A1 | 9/2014 | Swanson et al. |
| 2015/0086668 | A1* | 3/2015 | Perez .................. B29C 47/1045 425/376.1 |
| 2015/0097307 | A1* | 4/2015 | Batchelder ............ B29B 13/022 264/40.6 |
| 2015/0108677 | A1 | 4/2015 | Mark et al. |
| 2015/0140155 | A1* | 5/2015 | Ohno ...................... B29C 64/20 425/375 |
| 2015/0174824 | A1* | 6/2015 | Gifford ................... B29C 64/20 425/183 |
| 2015/0183161 | A1* | 7/2015 | Molinari ............. B29C 67/0085 425/375 |
| 2015/0224714 | A1* | 8/2015 | Swanson ............. B29C 47/0014 264/308 |
| 2015/0298393 | A1* | 10/2015 | Suarez ................... B33Y 70/00 425/3 |
| 2015/0367576 | A1* | 12/2015 | Page ...................... B33Y 30/00 264/257 |
| 2016/0354977 | A1* | 12/2016 | Gordon ................. B33Y 30/00 |
| 2017/0129170 | A1* | 5/2017 | Kim .................... B29C 67/0055 |
| 2017/0348911 | A1* | 12/2017 | Bruggeman ........... H05B 6/108 |

OTHER PUBLICATIONS

Zhang, G. Q., et al., "Use of Industrial Robots in Additive Manufacturing—A Survey and Feasibility Study," ISR/Robotik 2014; 2014; 41st International Symposium on Robotics, pp. 1-6.
[No Author Listed] "3D Printing History: The Free Beginner's Guide," 3D Printing Industry, 2015. [Online]. Available: http://3dprintingindustry.com/3d-printing-basics-free-beginners-guide/history/. [Accessed: Aug. 20, 2015].
[No Author Listed] Accuratus, "Accuflect High Energy Laser Reflectors," 2013. [Online]. Available: http://accuratus.com/laserref.html. [Accessed: Aug. 21, 2015].
[No Author Listed] Accuratus, "Macor Machinable Glass Ceramic," 2013. [Online]. Available: <http://accuratus.com/macorlab.html> [Accessed: Aug. 21, 2015].

[No Author Listed] Adafruit Industries, "ORION™ Delta 3D Printer," 2015. [Online]. Available: http://www.adafruit.com/products/2259. [Accessed: Aug. 20, 2015].
[No Author Listed] "Afinia H480 3D Printer," (advertisement) Octave Systems Incorporated, Apr. 16, 2014. [Online]. Available: https://www.octave.com/p1173433239/Afinia-H480-3D-Printer/product_info.html. [<https://web.archive.org/web/20150906153533/https://www.octave.com/p1173433239/Afinia-H480-3D-Printer/product_info.html>WebArchive access date Aug. 9, 2015].
[No Author Listed] Anaheim Automation, "PRONET-E Servo System," 2015. [Online]. Available: http://anaheimautomation.com/products/servo/servo-systems-item.php?sID=437&serID=2&pt=i&tID=1106&cID=527. [Accessed: Aug. 21, 2015].
[No Author Listed] Applied Motion Products, "9700-018—ServoSET with 100W motor and SVAC3-S-E120 servo drive," 2015 [online] Available: http://www.applied-motion.com/products/servosets/9700-018. [Accessed: Aug. 21, 2015 J.
[No Author Listed], Arcam AB®, "EBM for Orthopedic Implants." [Online]. Available: http://www.arcam.com/solutions/orthopedic-implants/. [Accessed: Aug. 20, 2015]. Web archive version Sep. 7, 2015 <https://web-beta.archive.org/web/20150907034950/http://www.arcam.com/solutions/orthopedic-implants>.
[No Author Listed] "Assembled Printrbot Simple," Printrbot, 2015. [Online]. Available: http://printrbot.com/shop/assembled-simple-metal/. [Accessed: Aug. 20, 2015]. (product listing).
[No Author Listed] "ASTM F2792-12a: Standard Terminology for Additive Manufacturing Technologies," ASTM International, West Conshohocken, PA, 2013.
[No Author Listed] "Ball screw motorized linear guide—NEMA 23," Direct Industry, 2015. [Online]. Available: http://www.directindustry.com/prod/pbc-linear/product-7045-1408261.html. [Accessed: Aug. 20, 2015].
[No Author Listed] "Big Area Additive Manufacturing Fact Sheet," Cincinnati Incorporated, 2014. [Online] Available: (http://wwwassets.e-ci.com/PDF/Products/baam-fact-sheet.pdf> [Accessed: Aug. 20, 2015].
[No Author Listed] "Codian Robotics," Onexia, Inc., 2015. [Online] http://onexia.com/CodianRobotics/index.html. [Accessed: Aug. 20, 2015].
[No Author Listed] DMG Mori, Lasertec 65 3D, "All in 1: Laser Deposition Welding & Milling-additive Manufacturing in Milling Quality," 2013, DMG MORI Co. Ltd., (accessed Nov. 28, 2016).
[No Author Listed] Electronics Tutorials, "Stepper Motor Construction and Control," 2015. [Online]. Available: http://www.electronics-tutorials.ws/io/io35.gif?81223b. [Accessed: Aug. 20, 2015]. WebArchive version Jul. 4, 2015 <https://web.archive.org/web/20150704072506/http://www.electronics-tutorials.ws/io/io35.gif?81223b> 1 page.
[No Author Listed] EOS e-Manufacturing Solutions, "Industrial 3D Printing for Tooling," 2015. [Online]. Available: http://www.eos.info/tooling. [Accessed: Aug. 20, 2015].
[No Author Listed] "EOS partnership forms new micro laser sintering company," TCT Magazine; May 12, 2014. [Online]. Available: http://www.tctmagazine.com/3D-printing-news/eospartnership-forms-new-micro-laser-sintering-company/. [Accessed: Aug. 20, 2015].
[No Author Listed] Fastenal Engineering, "Screw Thread Design," Mar. 4, 2009, Fastenal Engineering & Design Support. <https://www.fastenal.com/content/feds/pdf/Article%20-%20Screw%20Threads%20Design.pdf>.
[No Author Listed] "FDM Design Handbook," Fortus 3D Production Systems, Stratasys, 2010, Eden Prairie, MN.
[No Author Listed] "Festo EGC-TB Linear Tooth-Belt Driven Actuator," Motor Technology. [Online]. Available: http://www.controlinmotion.com/products/mechanical-actuators/festo-egc-tb-linear-; tooth-belt-driven-actuator.shtml. [Accessed: Aug. 20, 2015].
[No Author Listed] FormFutura, 1.75 mm Filaments, Web Archive <https://web.archive.org/web/20150904091729/http://www.formfutura.com/175mm-filaments/> dated Sep. 4, 2015.
[No Author Listed] Gates Mectrol, Inc., "Timing Belt Theory," 2006, [online] <http://www.gatesmectrol.com/mectrol/downloads/download_common_cfm?file=Belt_Theory06sm_pdf&folder=brochure>.

(56) References Cited

OTHER PUBLICATIONS

[No Author Listed] "GE Aviation's First Additive Manufactured Part Takes Off on a GE90 Engine," GE Aviation, Apr. 14, 2015. [Online]. Available: http://www.geaviation.com/press/ge90/ge90_20150414.html. [Accessed: Aug. 20, 2015].
[No Author Listed] "Heat Beds in 3D Printing-Advantages and Equipment," 2015, [Online]. Available: https://bootsindustries.com/pmtfolio-item/heat-bed-3d-printing/. [Accessed: Aug. 20, 2015]. on hand from <https://bootsindustries.com/heat-bed-3d-printing/>.
[No Author Listed] "Invisalign," 2015. [Online]. Available: http://www.invisalign.com/. [Accessed: Aug. 20—3D Printing Industry, Jul. 18, 2015 access <https://web-beta.archive.org/web/20150718055338/http://www.invisalign.com:80/>.
[No Author Listed] "Jewelry Industry," EnvisionTEC, 2015, [Online]. Available: http://envisiontec.com/3d-printing-industries/jewelry/. [Accessed: Aug. 20, 2015]. Web Archive access Sep. 12, 2015 >.
[No Author Listed] "Liquid Lattice," Within Lab. [Online]. Available: http://withinlab.com/case-studies/index7.php. [Accessed: Aug. 20, 2015]. Web Archive version dated Jan. 19, 2016 <https://web-beta.archive.org/web/20160119222114/withinlab.com/case-studies/index7.php>.
[No Author Listed] Loughborough University, "Sheet Lamination—Additive Manufacturing Research Group," 2015. [Online]. Available: http://www.lboro.ac.uk/research/amrg/about/the7categoriesofadditivemanufacturing/sheetlamination/. [Accessed: Aug. 20, 2015]. Web Archive version access date Sep. 1, 2015 <https://web-beta.archive.org/web/20161007184248/http://www.lboro.ac.uk/research/amrg/about/the7categoriesofadditivemanufacturing/sheetlamination/>.
[No Author Listed] MakerBot Industries "MakerBot Replicator™ Dual Extruder 3D Printer," MakerBot, 2015, http://www.saelig.com/MFR00114/R0012.htm. [Accessed: Aug. 21, 2015]. found at <http://www.saelig.com/product/RO012.htm>.
[No Author Listed] Markforged, "Make with the Mark One," 2015. [Online]. Available: https://markforged.com/applications/. [Accessed: Aug. 20, 2015]. WebArchive version Sep. 12, 2015 <https://web-beta.archive.org/web/20150914002700/https://markforged.com/applications/>.
[No Author Listed] Markforged, "Materials," 2015. [Online]. Available: https://markforged.com/materials/. [Accessed: Aug. 20, 2015] [https://web.archive.org/web/20150726083951/https://markforged.com/materials/].
[No Author Listed] NoIR LaserShields, "Laser Standards," Available: http://noirlaser.com/laserstandards. [Accessed: Aug. 21, 2015]. WebArchive version Oct. 26, 2015 <https://web-beta.archive.org/web/20151026155504/http://noirlaser.com/laser-standards>.
[No Author Listed] NinjaFlex, "Flexible 3D Printing with Strong Flexible Filament," 2014. [Online]. Available: http://www.ninjaflex3d.com/. [Accessed: Aug. 20, 2015].; web archive version of Sep. 8, 2017 <https://web-beta.archive.org/web/20150908121523/http://www.ninjaflex3d.com/>.
[No Author Listed] Omega, "Stepper Motors," 2015. [Online]. Available: http://www.omega.com/prodinfo/stepper_motors.html. [Accessed: Aug. 20, 2015]. Web archive version Sep. 5, 2015 <https://web-beta.archive.org/web/20150905215824/www.omega.com/prodinfo/stepper_motors.html>.
[No Author Listed] "Overview of materials for Acrylonitrile Butadiene Styrene (ABS), Extruded," Matweb, 2015, [Online] http://www.matweb.com/search/DataSheet.aspx?MatGUID=3a8afcddac864d4b8f58d4057Od2e5aa&ckck=1. [Accessed: Aug. 20, 2015]; webarchive version of Apr. 1, 2016 <https://web-beta.archive.org/web/20160401232035/http://www .matweb.com/search/DataSheetaspx?MatGUID=3a8afcddac864d4b8f58d40570d2e5aa&ckck=1>.
[No Author Listed] proto labs, "Additive Manufacturing Materials," 2015. [Online]. Available: http://www.protolabs.com/resources/additive-materials. [Accessed: Aug. 20, 2015].; web archive version of Aug. 20, 2015 <https://web-beta.archive.org/web/20150820034440/www.protolabs.com/resources/additive-materials>.

[No Author Listed] Repetier, "Repetier-Host Documentation," [Online]. Available: http://www.repetier.com/documentation/repetier-host/. [Accessed: Aug. 21, 2015]. Web archive version of Aug. 25, 2015 <https://web-beta.archive.org/web/20150825131321/http://www.repetier. com/documentation/repetier-host/>.
[No Author Listed] RepRap, "Marlin," RepRap Wiki. [Online]. Available: http://reprap.org/wiki/Marlin. [Accessed: Aug. 21, 2015]. Web Archive Aug. 20, 2015 <https://web-beta.archive.org/web/20150820055332/http://reprap.org/wiki/Marlin>.
[No Author Listed] RepRap, "Rambo," RepRap Wiki, 2015. [Online]. Available: http://reprap.org/wiki/Rambo. [Accessed: Aug. 21, 2015]. Web archive version <https://web-beta.archive.org/web/20150821080513/http://reprap.org/wiki/Rambo>.
[No Author Listed] "Request a Castable sample part!," Formlabs, 2015. [Online]. Available: http://formlabs.com/stories/castable-sample-part/. [Accessed: Aug. 20, 2015]. Web Archive version Sep. 10, 2015 <https://web-beta.archive.org/web/20150910123715/http://formlabs.com/stories/castable-sample-part/>.
[No Author Listed] "Select the Right Drive Train Technology for 3D Printing," Parker, Jul. 2, 2014. Available: http://blog.parker.com/select-the-right-drive-train-technology-for-3d-printing-precision-linear-motion-systems. [Accessed: Aug. 20, 2015]; web archive version Oct. 7, 2015 <https://web-beta.archive.org/web/20151007044855/http://blog.parker.com/select-the-right-drive-train-technology-for-3d-printing-precision-linear-motion-systems>.
[No Author Listed] Shapeways, "Shapeways—3D Printing Service and Marketplace," 2015. [Online]. Available: http://www.shapeways.com/. [Accessed: Aug. 20, 2015]. Web archive version <https://web-beta.archive.org/web/20150820072258/%20http://www.shapeways.com/>.
[No Author Listed] Shapeways, "3D Printing Materials: Plastic, Metal, Ceramics and More," 2015. [Online]. Available: http://www.shapeways.com/materials/. [Accessed: Aug. 20, 2015][https://web.archive.org/web/20150821051223/%20http://www.shapeways.com/materials/]Aug. 21, 2015.
[No Author Listed] Stratasys, "3D Printed (FDM) Solutions for Jigs and Fixtures," 2015. [Online]. Available: http://www.stratasys.com/solutions/ additive-manufacturing/jigs-and-fixtures. [Accessed: Aug. 20, 2015]. Web Archive version Sep. 5, 2015 <https://web-beta.archive.org/web/20150905065803/http://www.stratasys.com/solutions/additive-manufacturing/jigs-and-fixtures>.
[No Author Listed] Stratasys, "About the Mojo Desktop 3D Printer," 2015. [Online]. Available: http://www.stratasys.com/3d-printers/idea-series/mojo. [Accessed: Aug. 21, 2015]. Web Archive version 09050215 <https://web-beta.archive.org/web/20150905065928/http://www.stratasys.com/3d-printers/idea-series/mojo>.
[No Author Listed] Stratasys, "ABSplus-P430," Design Series, 2014. [Online]. Available: http://usglobalimages.stratasys.com/Main/Secure/Material Specs MS/Fortus-MaterialSpecs/Fortus-MS-ABSplus-01-13-web.pdf. [Accessed: Aug. 20, 2015].
[No Author Listed] Stratasys, "Additive Manufacturing," 2015. [Online]. Available: http://www.stratasys.com/solutions/additive-manufacturing. [Accessed: Aug. 20, 2015]. Web archive version Sep. 5, 2015 <https://web-beta.archive.org/web/20150905061229/http://www.stratasys.com/solutions/additive-manufacturing>.
[No Author Listed] Stratasys, "Dental Case Study: Specialty Appliances," 2015. [Online]. Available: http://www.stratasys.com/resources/case-studies/dental/specialty-appliances. [Accessed: Aug. 20, 2015]; Web archive version Sep. 5, 2015 <https://web-beta.archive.org/web/20150905212919/http://www.stratasys.com/resources/case-studies/dental/specialty-appliances>.
[No Author Listed] Stratasys, "Dimension 1200es 3D Modeling Printers," 2015. [Online]. Available: http://www.stratasys.com/3d-printers/design-series/dimension-1200es. [Accessed: Aug. 21, 2015]; Web archive version Sep. 5, 2015 (https://web-beta.archive.org/web/20150905060316/http://www.stratasys.com/3d-printers/design-series/dimension-1200es>.
[No Author Listed] Stratasys, "FDM Materials Comparison," 2015. [Online] . . . [Accessed: Aug. 20, 2015] <https://web.archive.org/web/20150905074941/www.stratasys.com/materials/fdm/compare-fdm-materials>.
[No Author Listed] Stratasys, "Rapid Prototyping Helps Keep HVAC Customers Happy," 2013. [Online]. Available: http://www.

(56) References Cited

OTHER PUBLICATIONS stratasys.com/resources/case-studies/commercial-products/reddot-ultem-9085-prototyping. [Accessed: Aug. 20, 2015]. Web archive version Sep. 5, 2015 <https://web-beta.archive.org/web/20150905211242/http://www.stratasys.com/resources/case-studies/commercial-products/reddot-ultem-9085-prototyping>.
[No Author Listed] Stratasys, "Rubber-Like Materials for 3D Printing," 2015. [Online]. Available: http://www.stratasys.com/materials/polyjet/rubber-like#content-slider-1. [Accessed: Aug. 20, 2015].; Web archive version Sep. 5, 2015 <https://web-beta.archive.org/web/20150905061332/http://www.stratasys.com/materials/polyjet/rubber-like>.
[No Author Listed] Technical Glass Products, "Fused Quartz Transmittance Curves," 2010. [Online]. Available: http://www.technicalglass.com/fused_quartz_transmission.html. [Accessed: Aug. 21, 2015]. Web archive version Sep. 12, 2015 <https://web-beta.archive.org/web/20150912002005/http://www.technicalglass.com/fused_quartz_transmission.html>.
[No Author Listed] "This Week in Digital Fabrication: The ROI of Household 3D Printing; UPS Store Partners with Stratasys, Plus MCOR's Full-Color Paper 3D-Printer," Core77, Aug. 2002. [Online]. [Accessed: Aug. 20, 2015]. Web archive version Jan. 7, 2016 < https://web-beta.archive.org/web/20160107234016/http://www.core77.com/posts/25312/This-Week-in-Digital-Fabrication-The-ROI-of-Household-3D-Printing-UPS-Store-Partners-with-Stratasys-Plus-MCORs-Full-Color-Paper-3D-Printer>.
[No Author Listed] "Voxeljet Announces New Phenolic-Direct-Binding 30 Printing Method at Euromold," www.3Ders.org, Nov. 25, 2014. [Online]. Available: http://www.3ders.org/articles/20141125-voxeljet-announces-new-phenolic-direct-binding-3d-printing-method-at-euromold.html. [Accessed: Aug. 20, 2015]. Web Archive version Sep. 8, 2015 <https://web-beta.archive.org/web/20150908034341/http://www.3ders.org/articles/20141125-voxeljet-announces-new-phenolic-direct-binding-3d-printing-method-at-euromold.html>.
Ahn, B., et al., "Omnidirectional Printing of Flexible, Stretchable, and Spanning Silver Microelectrodes," Science, 2009, v. 323, pp. 1590-1593. [Online]. Available: http://lewisgroup.seas.harvard.edu/files/lewisgroup/files/omnidirectional_printing_of_flexible_stretchable_and_spanning_silver_microelectrodes.pdf. [Accessed: Jun. 1, 2015].
Ahn, S. H., "Anisotropic material properties of fused deposition modeling ABS," Rapid Prototyp. J., 2002; vol. 8, No. 4, pp. 248-257.
Bellini, A., et al., "Liquefier Dynamics in Fused Deposition," J. Manuf. Sci. Eng., 2004, vol. 126, No. 2, pp. 237-246.
Bergman, T. L., et al., Fundamentals of Heat and Mass Transfer, 2011, 7th Ed., pp. 468-483; John Wiley & Sons, Hoboken, NJ.
Beyer, C., "Strategic Implications of Current Trends in Additive Manufacturing," J. Manuf. Sci. Eng., vol. 136, No. 6, p. 064701, Oct. 2014.
Bonev, I., "Delta Parallel Robot—the Story of Success," ParalleMIC, 2001. [Online]. Available: http://www.parallemic.org/Reviews/Review002.html. [Accessed: Aug. 20, 2015]. Web archive version Nov. 16, 2015 <https://web-beta.archive.org/web/20151116060604/http://www.parallemic.org:80/Reviews/Review002p.html>.
Budynas, R. G., et al., Shigley's Mechanical Engineering Design, 9th ed., 2011, New York: McGraw-Hill. (table of contents only).
Chilson, L., "The Difference Between ABS and PLA for 3D Printing," ProtoParadigm, Jan. 25, 2013. [Online]. Available: Web Archive Aug. 21, 2015 <https://web-beta.archive.org/web/20150821053910/http://www.protoparadigm.com/news-updates/the-difference-between-abs-and-pla-for-3d-printing>.
Conner, B. P., et al., "Making sense of 3-D printing: Creating a map of additive manufacturing products and services," Addit. Manuf., vol. 1-4, pp. 64-76, 2014.
English, A. R., "3D Printer Filament Buyer's Guide," ProtoParadigm, Jun. 13, 2012. [Online]. Available: http://www.protoparadigm.com/news-updates/3d-printer-filament-buyers-guide. [Accessed: Aug. 20, 2015]; Web Archive version Aug. 28, 2016 <https://web-beta.archive.org/Web/20150828061853/http://www.protoparadigm.com/news-updates/3d-printer-filament-buyers-guide>.
Ferry, J. D., Viscoelastic Properties of Polymers, Third Edition, 1980, Wiley, New York (table of contents only).
Gerard, K., "Plastic Injection Molding vs. Plastic Machining: How to Decide," Craftech Industries Blog, Sep. 6, 2013. [Online]. Available: http://info.craftechind.com/blog/bid/333498/Plastic-Injection-Molding-vs-Plastic-Machining-How-to-Decide. [Accessed: Aug. 20, 2015]. Web Archive version Sep. 16, 2015 <https://web-beta.archive.org/web/20150916224401/http://info.craftechind.com/blog/bid/333498/Plastic-Injection-Molding-vs-Plastic-Machining-How-to-Decide>.
Gibson, I., et al., Additive Manufacturing Technologies, Second. New York: Springer Science & Business Media, 2015.
Go, J., "High-Throughput Extrusion-Based Additive Manufacturing," MS Thesis, submitted at Massachusetts Institute of Technology, Sep. 2015 (180 pages).
Grunewald, S. J., "Sciaky Unveils Expanded Line of Sophisticated EBAM Metal 3D Printers," 3DPrint.com, May 13, 2015. [Online]. Available: http://3dprint.com/65170/sciaky/. [Accessed: Aug. 20, 2015]. Web archive version Sep. 26, 2015 <https://web.archive.org/web/20150926121034/http://3dprint.com/65170/sciaky/>.
Hanssen, J., "FORTUS 360mc/400mc Accuracy Study," Stratasys, 2009. [Online]. Available: http://usglobalimages.stratasys.com/Main/Secure/WhitePapers/Rebranded/SSYS_WP_fortus_360mc-400mc_accuracy_study.pdf?v=635011144344083282. [Accessed: Aug. 21, 2015].
Hopkinson, N., et al., "Analysis of rapid manufacturing-using layer manufacturing processes for production," Proc. Inst. Mech. Eng. Part CJ. Mech. Eng. Sci., vol. 217, No. 1, pp. 31-39, Jan. 2003.
International Search Report and Written Opinion, dated Jan. 30, 2017, for Application No. PCT/US16/62752 (17 pages).
Johnson, N. S., "New Z Corporation 3D Printers Start at $14,900," Cadalyst, Aug. 12, 2010. [Online]. Available: http://www.cadalyst.com/hardware/3d-printers/new-zcorporation-3d-printers-start-14900-13407. [Accessed: Aug. 20, 2015]., Web archive version Aug. 15, 2010 <https://web.archive.org/web/20100815092005/http://www.cadalyst.com/hardware/3d-printers/new-z-corporation-3d-printers-start-14900-13407>.
Kalpakjian, S., et al., Manufacturing Engineering and Technology, 4th ed., Upper Saddle River, NJ: Prentice Hall, 2001. (pp. 537-538, 566, 625-627, 668-670, 729-730, 769-771).
Klein, R., Laser Welding of Plastics, John Wiley & Sons, 2011 (pp. 3-241).
Krassenstein, B., "14 Coolest 3D Printing Stories of 2014,"3DPrint.com, Dec. 29, 2014. [Online]. Available: http://3dprint.com/30482/3d-printing-2014/. [Accessed: Aug. 20, 2015]., Web archive version Aug. 22, 2015 <https://web.archive.org/web/20150822160642/http://3dprint.com/30482/3d-printing-2014/>.
Krassenstein, B., "Carbon3D Unveils Breakthrough CLIP 3D Printing Technology, 25-100X Faster," 3DPrint.com, 2015. [Online]. Available: http://3dprint.com/51566/carbon3d-clip-3d-printing/. [Accessed: Aug. 20, 2015]; Web archive version Sep. 15, 2015 <https://web.archive.org/web/20150915203400/http://3dprint.com/51566/carbon3d-clip-3d-printing/>.
Krassenstein, B., "Graphene 3D Lab Launches BlackMagic3D Filament Brand & New Graphene 3D Printing Material," 3DPrint.com, Mar. 16, 2015. [Online]. Available: http://3dprint.com/51502/black-magic-3d-graphene/. [Accessed: Aug. 20, 2015], Web archive version Aug. 24, 2015 <https://web.archive.org/web/20150824171638/https://3dprint.com/51502/black-magic-3d-graphene/>.
Langnau, L., "Additive and subtractive machining in one setup," Direct Industry, May 7, 2014, (DMG MORI) [Online] http://www.makepartsfast.com/additive-subtractive-machining-one-setup/ (6 pages).
Lipsett, R., "Why Lead Screws are the Best Fit for Many Linear Motion Applications—and How to Rightly Apply Them" Thomson Industries, Article dated Apr. 30, 2012, Wood Dale, IL. [online] http://www.thomsonlinear.com/downloads/articles/Why_Lead_Screws_Best_Fit_Linear Motion_Applications_taen.pdf.
Liszewski, A., "How Shapeways Squeezes Every Last Bit Out of a 3D-Printing Run," Gizmodo Australia, Aug. 16, 2013. [Online]. Available: http://www.gizmodo.com.au/2013/08/how-shapeways-squeezes-every-last-bit-out-of-a-3d-printing-run/. [Accessed: Aug.

(56) References Cited

OTHER PUBLICATIONS 20, 2015], Web Archive version 8/48/2013 <https://web.archive.org/web/20130818054902/http://gizmodo.com/how-shapeways-squeezes-every-last-bit-out-of-a-3d-print-1147768743>.

Love, L. J., "The Importance of Carbon Fiber to Polymer Additive Manufacturing," J. Mater. Res., 2014, vol. 29, No. 17, pp. 1893-1898.

McNally, D., "DARPA Seeks Advanced Manufacturing Standards," Army Technology, Jul. 1, 2014. [Online]. Available: http://armytechnology.armylive.dodlive.mil/index.php/2014/07/0117-2/. [Accessed: Aug. 20, 2015].

Moyer, I. E., "Core (X,Y)," CoreXY / Cartesian Motor Platform, 2012, [Online]. Available: http://corexy.com/theory.html. [Accessed: Aug. 21, 2015].

Newman, J., "Sciaky's Direct Manufacturing 3D Printing Process Goes Big," RapidReady, Feb. 13, 2013. [Online]. Available: http://www.rapidreadytech.com/2013/02/sciakys-direct-manufacturing-process-goes-big/. [Accessed: Aug. 20, 2015].

Norfolk, M., "Hybrid 3D Printing," Fabrisonic, Jan. 8, 2015. [Online]. Available: http://fabrisonic.com/hybrid-3d-printing/. [Accessed: Aug. 20, 2015].

Raphael (blog poster) "How much does it cost when you 3D print a thousand different parts all at once?," 3D Printing, Shapeways Blog, Oct. 3, 2014. [Online]. Available: http://www.shapeways.com/blog/archives/ 1817 4-how-much-does-it-cost-when-you-3dprint-a-thousand-different-parts-all-at-once.html. [Accessed: Aug. 20, 2015].

Sher, D., "Arcam Metal 3D Printers Making Titanium Implants on Sicily's Etna Volcano," 3D Printing Industry, Jul. 16, 2015.

Sollman, K. S., "Dynamic Modeling of a Two-Axis, Parallel, H-Frame-Type <emphasis emphasistype=' italic'> XY </ emphasis> Positioning System," IEEE/ASME Trans. Mechatronics, vol. 15, No. 2, pp. 280-290, Apr. 2010.

Sollman, K. S., "Modeling, Simulation and Control of a Belt Driven, Parallel H-Frame Type Two Axes Positioning System," Master's Thesis, 2007, University of Rhode Island. <http://digitalcommons.uri.edu/theses/607/>.

Szondy, D., "GE announces first FAA approved 3D-printed engine part," Gizmag, Apr. 19, 2015. [Online]. Available: http://www.gizmag.com/ge-faa-3d-printing-aircraft-engine-part/37018/. [Accessed: Aug. 20, 2015].

Throne, J. L, Technology of Thermoforming, 1996, Cincinnati, OH: Hanser Gardner Publications.

Turner, B. N., et al., "A review of melt extrusion additive manufacturing processes: I. Process design and modeling," Rapid Prototyp. J., vol. 20, No. 3, pp. 192-204, Apr. 2014.

Valentan, B., et al., "Basic Solutions on Shape Complexity Evaluation of STL Data," J. Achiev. Mater. Manuf. Eng., vol. 26, No. 1, pp. 73-80, 2008.

Venkataraman, N., et al., "Mechanical and rheological properties of feedstock material for fused deposition of ceramics and metals (FDC and FDMet) and their relationship to process performance," in Solid Freeform Fabrication Proceedings, 1999, pp. 351-360.

Venkataraman, N., et al., "Process-Property-Performance Relationship for Fused Deposition of Ceramics (FDC) Feedstock Materials," MRS Proc., 2000, vol. 625, p. 203-210.

Weikert, R., et al., "Modeling and measurement of h-bot kinematic systems," Am. Soc. Precis. Eng., 2011.

Whittaker, P., "EOS offers enhanced procedures for quality control in Additive Manufacturing," ipmd.net, Jun. 4, 2013. [Online]. Available: http://www.ipmd.net/news/002261.html. [Accessed: Aug. 20, 2015]. <http://www.pm-review.com/eos-offers-enhanced-procedures-for-quality-control-in-additive-manufacturing/>.

Wohlers, T., "Wohlers Report 2014." Wohlers Associates, Fort Collins, CO, 2014. (pp. 3-11, 109-111, 114-115, 134, 174-176, 178-185).

Extended European Search Report for Application No. 16871275.0, dated Jul. 3, 2019 (10 pages).

* cited by examiner (a) Section of thread profile (b) Forces on an unwound thread

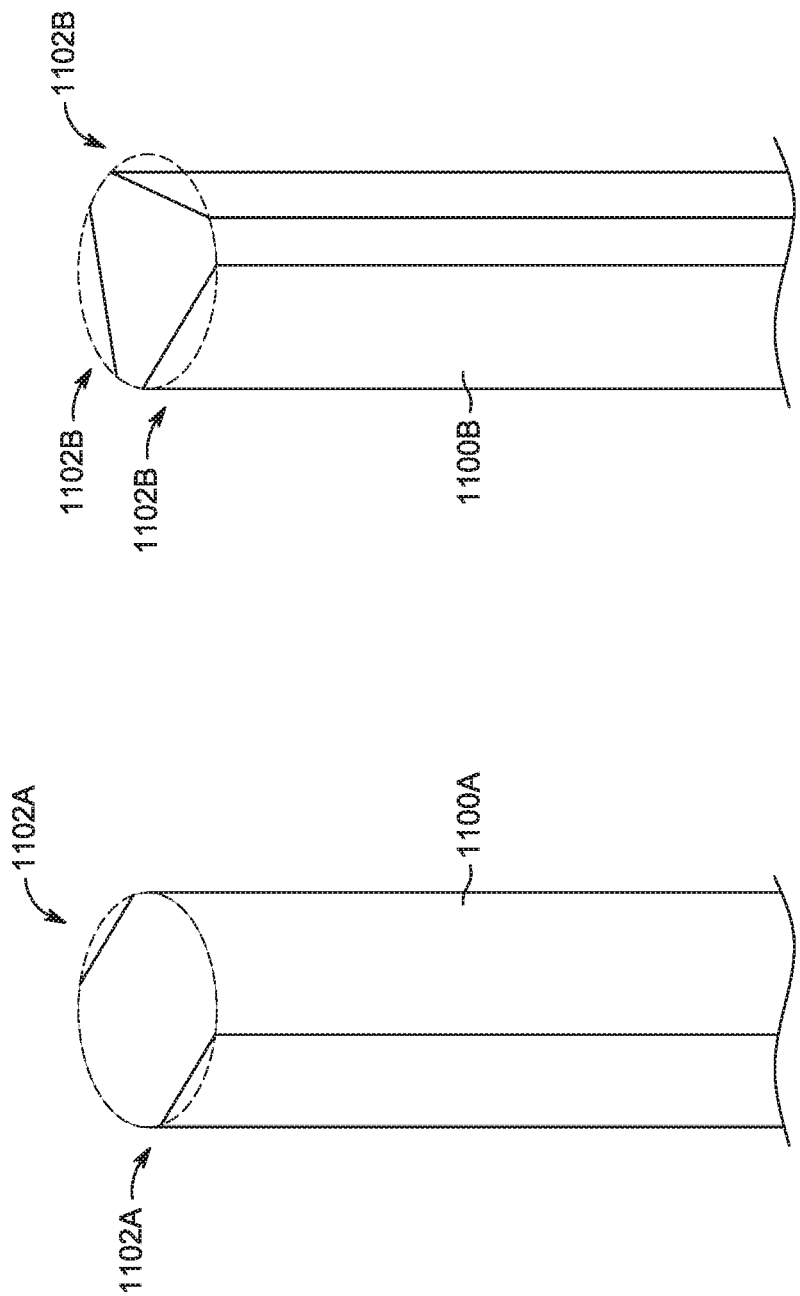

SYSTEMS, DEVICES, AND METHODS FOR HIGH-THROUGHPUT THREE-DIMENSIONAL PRINTING

CROSS REFERENCE TO RELATED APPLICATION

The present application claims priority to and the benefit of U.S. Provisional Application No. 62/261,394, filed on Dec. 1, 2015, and titled "High-Throughput Extrusions-Based Additive Manufacturing," the content of which is incorporated herein by reference in its entirety.

FIELD

The present application relates to systems, devices, and methods for high-throughput three-dimensional printing, and more specifically to high-throughput extrusion-based additive manufacturing.

BACKGROUND

Additive manufacturing (AM) techniques such as fused deposition Modeling® (FDM®) and fused filament fabrication (FFF) are rapidly gaining popularity in a variety of manufacturing industries due to AM's ability to create unique geometries and process unique material compositions. In particular, AM can operate on a variety of length scales with a large number of thermoplastic feedstock materials.

An additive manufacturing process includes building parts from selectively dispensing material through a nozzle or orifice. Multiple layers are built on top of each other to create a part or solid object. Material such as polymer is delivered to an extruder as a filament coiled in a spool, and is then melted during extrusion. That is, the polymer, typically held in the machine as spooled filament, is fed by the extruder into the liquefier where it is heated and melted, by receiving heat by conduction with heated walls in the liquefier. The extruder therefore feeds the filament through the liquefier, such that molten polymer is dispensed through the nozzle at the end of the liquefier chamber, which reduces the diameter of the molten polymer at its output. The extruder and liquefier assembly are directed in the X-Y plane using a gantry to build a cross-section of the part. Parts are built on a movable build platform within a chamber designed to control the printing environment. When printing in thermoplastic, the platform and/or its chamber are typically heated to reduce residual stresses, within the part, that arise during cooling after the deposition from the nozzle.

Two important components during the additive manufacturing process are the filament extrusion mechanism and the filament liquefier. Typically, a pinch-wheel mechanism that includes a drive wheel and a pinch or knurled wheel form a filament extrusion mechanism that drives the filament linearly by applying force along the side of the filament. Traction between the drive wheel and filament is provided by the clamping force applied by the pinch wheel. Driving the filament in this way generally causes the filament to be compressed between itself and the drive wheel, particularly when the drive wheel employs knurls, which dig into the filament. A filament fails by shear when an amount of force applied to the filament by the drive wheel exceeds the average shear stress over the area of engagement with the filament. Generally, the filament liquefier heats the polymer by conducting heat energy to the polymer from the liquefier wall and melts the polymer within the cavity before reaching the extrusion nozzle where its cross-section is reduced.

The production of parts using additive manufacturing is limited, for instance, by the design of current extruders, liquefiers, and gantries. For example, traditional extruders inhibit extrusion rates by providing a filament engagement area that limits the force that can be applied or transmitted by the extruder on the filament; traditional liquefiers do not provide an adequate heat rate necessary for expedient extrusion; and traditional gantries are speed and acceleration limited and cannot move with the agility needed to match high-throughput extrusion rates.

That is, in general, extrusion force in current extruders is limited by the filament shear area. Extrusion failure occurs when the extruder stress is greater than the shear stress of the filament shear area but less than the pressure drop caused by the liquefier.

Moreover, current liquefiers are limited by the maximum heat rate into the filament during extrusion, because they generally rely on conduction heat transfer from the heated liquefier walls. Due to the poor thermal conductivity of the filament and the conduction heat transfer rate, filament feed rate must be kept slow to allow full heating of the filament to the required melt temperature. Thus, with increasing extrusion rates, the filament receives less heat from the conduction liquefier. If the filament is not heated to the required temperature, the filament does not melt in the liquefier and instead jams in the nozzle, thereby preventing extrusion.

Current gantries for positioning a nozzle and build platform are effective at low dynamic performance, but traditional stepping motors used with gantries are speed limited due to fundamental operating principles of the actuators and their open-loop control scheme. On the other hand, simply using larger actuators causes an increase in mass and inertia of the gantry, thereby slowing the gantry response time despite having a higher torque capacity.

As a result of the above limitations of current additive manufacturing techniques, including insufficiently heating the filament, a high pressure needs to be exerted on the liquefier in order to properly extrude the filament. However, the high pressure or force on the filament may cause filament shear failure.

Accordingly, there is a need for systems, devices, and methods for high-throughput additive manufacturing that, among other things, are designed to increase the maximum force capable by the extruder, the heat rate into the volume of the filament, and the rate of deposition of the material of the filament. Moreover, there is a need for such systems, devices, and methods to be applicable to polymer resins and high-performance thermoplastic, and adaptable to large scale extrusion AM systems, in a variety of sectors such as medicine, product design, cinematography, education, aerospace, and advanced materials, among other sectors.

SUMMARY

Systems, devices, and methods are generally provided for high-throughput three-dimensional printing. In some example embodiments, high-throughput three-dimensional printing and/or additive manufacturing is provided using an extruder, a heater that includes a pre-heater and a liquefier, and a movement system, such as a gantry and cart. For instance, a filament can be fed into a feed nut of a nut feed extruder. The extruder motor can rotate the feed nut, causing linear motion of the filament by allowing internal engagement features of the feed nut to push against or pull on external engagement features of the filament. A heater (or radiative liquefier) volumetrically pre-heats the filament to or above a pre-heat temperature by transferring energy to molecules within the material in a first chamber (e.g., a pre-heater) before the filament enters a second chamber (e.g., a liquefier that transfers heat by conduction). The filament is further heated, or at least a temperature is maintained, until the filament is heated to or above a melt temperature, after which the filament is deposited towards and/or onto a build platform. Deposition of the material is controlled by a motion system that drives the heater and a nozzle associated therewith to a number of desired X-Y coordinates on a plane, creating one or more layers of a three-dimensional object. The motion system can also help adjust a location of the nozzle with respect to a platform on which the object is printed, e.g., the build platform, or with respect to one or more layers of the object already printed onto the platform, so that printing can occur along a third axis—the Z-axis.

In one exemplary embodiment of a high-throughput extrusion system, the system includes an extruder, a pre-heater, and a liquefier that are in fluid communication with each other. The extruder is configured to advance a filament through the pre-heater and the liquefier towards a build platform, the pre-heater is configured to volumetrically raise a temperature of filament received from the extruder to at least a desired pre-heat temperature, and the liquefier is configured to maintain or raise the temperature of the filament that passed through the pre-heater to at least a desired melt temperature prior to the filament passing through the liquefier, towards a build platform.

In some embodiments, the system can also include a gantry and a cart, with the cart having the liquefier coupled to it. The gantry can be configured to move the cart in an X-Y plane to position the liquefier to one or more target X-Y coordinates in the X-Y plane. The gantry can be, for example, an H-frame gantry. The system can further include a build platform towards which the filament is extruded after it exits the liquefier. The build platform can be configured to be positioned on one or more Z coordinates along a Z-axis that intersects the X-Y plane. In embodiments that include both a gantry and a build platform, the gantry and build platform can be configured to operate together such that filament extruded by the extruder through the liquefier is extruded onto one or more target X-Y-Z coordinates. Further, embodiments that include a gantry, cart, and build platform can be defined as a printer for printing three-dimensional objects that includes the high-throughput extrusion system (i.e., the extruder, the pre-heater, and the liquefier).

The pre-heater and the liquefier can be their own separate components, each having their own separate housing with some mechanism for allowing fluid communication between them, such as a tube. Alternatively, the pre-heater and the liquefier can be disposed within a housing of a single heating unit, referred to herein more generally as a heater.

The extruder can be a nut feed extruder that includes a rotatable feed nut having one or more internal engagement features. The engagement features can be configured to engage one or more complementary mating external engagement features disposed on filament that is advanced by the extruder to impart a force on the one or more complementary mating external engagement features and advance the filament through the pre-heater and the liquefier towards a build platform upon rotation of the feed nut.

In some embodiments, the system can include a filament having one or more external engagement features that are complementary to the one or more internal engagement features of the rotatable feed nut such that the one or more internal engagement features are configured to impart a force on the one or more external engagement features to advance the filament through the pre-heater an the liquefier towards a build platform upon rotation of the feed nut. In some embodiments, the engagement features can be threads. The filament having engagement features can include both a first material and a second material. In some instances, the second material can be more conductive than the first material. The first material can melt when it is heated to the desired melt temperature and the second material can remain solid or less viscous than the first material when heated to the desired melt temperature. Further, in some embodiments, the system can include a die such as a threading die that is configured to generate one or more engagement features on an exterior of filament advanced by the extruder. The internal engagement features of the feed nut and the external engagement features of the filament can include one or more complementary geometric configurations, including but not limited to mating periodic textures, triangles, rectangles, and threads.

The pre-heater can include a transmitter that is configured to transmit radiation or current to a filament that is to be advanced by the extruder such that a temperature of the filament is raised to the desired pre-heat temperature in a substantially uniform manner across a volume of the filament. By way of examples, the pre-heater can be an infrared (IR) heater or an electrically-assisted heater.

The system can also include a controller that is configured to adjust at least one of power supplied to the pre-heater, power supplied to the liquefier, and force applied to a feed nut of the extruder to modify at least one of the desired pre-heat temperature, the desired melt temperature, and the feed rate of the extruder based on received real-time parameters of the system. The real-time parameters can include, by way of example, one or more of an extrusion force applied by the extruder on the filament advanced by the extruder, the feed rate of the extruder, a temperature of the filament prior to the filament entering the pre-heater, a temperature of the filament prior to the filament entering the liquefier, and a temperature of the filament prior to or concurrently with the filament exiting the liquefier, towards a build platform. Parameters can be measurements that are made by the system, but they do not have to be measurements. The controller, or another component of the system, can adjust an amount of power being supplied to components of the system (e.g., the pre-heater and/or the liquefier), and/or an amount of force or torque applied to the nut feed extruder, to achieve desired results. For example, the power and/or force can be adjusted to maintain a constant feed rate, to maintain a constant force being applied to the filament, and/or to match a command signal provided by a controller.

In one exemplary embodiment of a method for printing, the method includes extruding a filament to a first chamber of a printing device, volumetrically heating the filament to a pre-determine pre-heat temperature while the filament is at or advancing through the first chamber, and advancing the filament to a second chamber of the printing device. The method further includes maintaining or heating the filament to a desired melt temperature while the filament is at or advancing through the second chamber, and extruding the filament towards a build platform when the filament is at or exceeds the desired melt temperature.

In some embodiments, the method can include positioning the second chamber at one or more target X-Y coordinates with respect to the build platform so that the filament that is extruded towards the build platform when the filament is at or exceeds the desired melt temperature is extruded towards the one or more target X-Y coordinates. A build platform can be positioned along a Z-axis to adjust a location of where the melted filament is extruded relative to the build platform.

Feeding a filament to a first chamber of a printing device can include rotating a feed nut of an extruder of the printing device such that the one or more internal engagement features of the feed nut engages one or more external engagement features located on the filament. In some embodiments, the method can include generating the one or more external engagement features located on the filament. This can be accomplished, for example, by providing a die as part of an extruder that performs the step of extruding the filament to the first chamber of the printing device. The die or die cutter can be heated, or a separate mechanism can be used to heat the surface of the filament to assist in the creation of engagement features on the filament surface. Additionally or alternatively, a mechanical process, such as rotary cutting while the filament is advanced, may be used to create the engagement features. The engagement features can have a variety of profiles that are conducive to allowing the subsequent nut feed mechanism to apply a force to or upon the filament that is necessary for its processing through an extrusion die wherein its cross-section is reduced.

The method can also include observing one or more parameters related to at least one of extrusion of the filament and the interaction of the filament with the build platform, and adjusting at least one of the desired pre-heat temperature, pre-heat power, the desired melt temperature, and a feed rate of the extruding step in response to the one or more observed parameters. The observed parameters can include, by way of example, one or more of an extrusion force applied to the filament during the extruding step, a feed rate of the filament during the extruding step, a temperature of the filament prior to the filament entering the first chamber, a temperature of the filament prior to the filament exiting the second chamber, a temperature of the filament upon exit from the second chamber, and temperature of the filament in the vicinity of its interaction with the build platform. In some instances, the method can include determining one or more of the parameters by making measurements or otherwise sensing the parameters. Alternatively, or additionally, measurements can also be made of the material upon exit from the second chamber, or at the location onto which the material is extruded.

Additional filament can be extruded to print a three-dimensional object. For example, additional filament can be volumetrically heated to a desired pre-heat temperature and heated to a desired melt temperature onto the filament that is extruded towards a build platform when the filament is at or exceeds the desired melt temperature to print a three-dimensional object. The additional filament can be selectively placed at locations on the build platform and/or on previously extruded filament.

In another exemplary embodiment of a high-throughput extrusion system, the system includes an extruder having a feed nut. The feed nut is configured to advance a filament towards a build platform by rotating about a feed axis along which the filament is fed into the feed nut. The feed nut has one or more internal engagement features formed on it that are configured to engage with the filament such that the feed nut applies force to the filament along the feed axis.

In some embodiments, the system can also include a pre-heater that is in fluid communication with the extruder. The pre-heater can be configured to receive filament from the extruder and volumetrically raise a temperature of the filament to at least a desired pre-heat temperature, which may be less than or equal to the filament temperature, prior to the filament exiting the pre-heater at a distal end of the pre-heater. In some other embodiments, the system can also include a liquefier that is in fluid communication with the extruder. The liquefier can be configured to receive filament from the extruder and raise a temperature of the filament to at least a desired melt temperature prior to the filament exiting the liquefier at a distal end of the liquefier. In still some other embodiments, the system can include both a pre-heater and a liquefier. The pre-heater can be in fluid communication with the extruder and can be configured to receive filament from the extruder, while the liquefier can be in fluid communication with the pre-heater and can be configured to receive filament from the pre-heater. Further, the pre-heater can be configured to volumetrically raise a temperature of the filament received from the extruder to at least a desired pre-heat temperature, and the liquefier can be configured to maintain or raise the temperature of the filament that passed through the pre-heater to at least a desired melt temperature prior to the filament exiting the liquefier at a distal end of the liquefier, towards the build platform.

The extruder can include a die that is configured to generate one or more engagement features on an exterior of filament advanced by the extruder. The one or more internal engagement features formed on the feed nut can be substantially perpendicular to the feed axis when they engage the filament. In some embodiments, the one or more internal engagement features can be configured to engage one or more complementary engagement features formed on an outer surface of the filament. The one or more internal engagement features of the feed nut and one or more external engagement features of the filament can include one or more complementary geometric configurations, such as mating periodic textures, triangles, rectangles, and threads.

The system can include a threaded filament having one or more external threads that are complementary to the one or more internal engagement features of the feed nut. As a result, the one or more internal engagement features can be configured to impart a force on the one or more external threads to advance the filament through the extruder upon rotation of the feed nut. In some embodiments the threaded filament can include both a first material and a second material, with the second material being more conductive than the first material. The first material can melt when it is heated to the desired melt temperature and the second material can remain less viscous than the second material when they are heated to the desired melt temperature.

BRIEF DESCRIPTION OF DRAWINGS

The present application will be more fully understood from the following detailed description taken in conjunction with the accompanying drawings, in which:

FIG. 16A is a perspective view of another exemplary embodiment of a filament, the filament including two flat surfaces; and FIG. 16B is a perspective view of yet another exemplary embodiment of a filament, the filament including three flat surfaces.

DETAILED DESCRIPTION

Figure 1A:
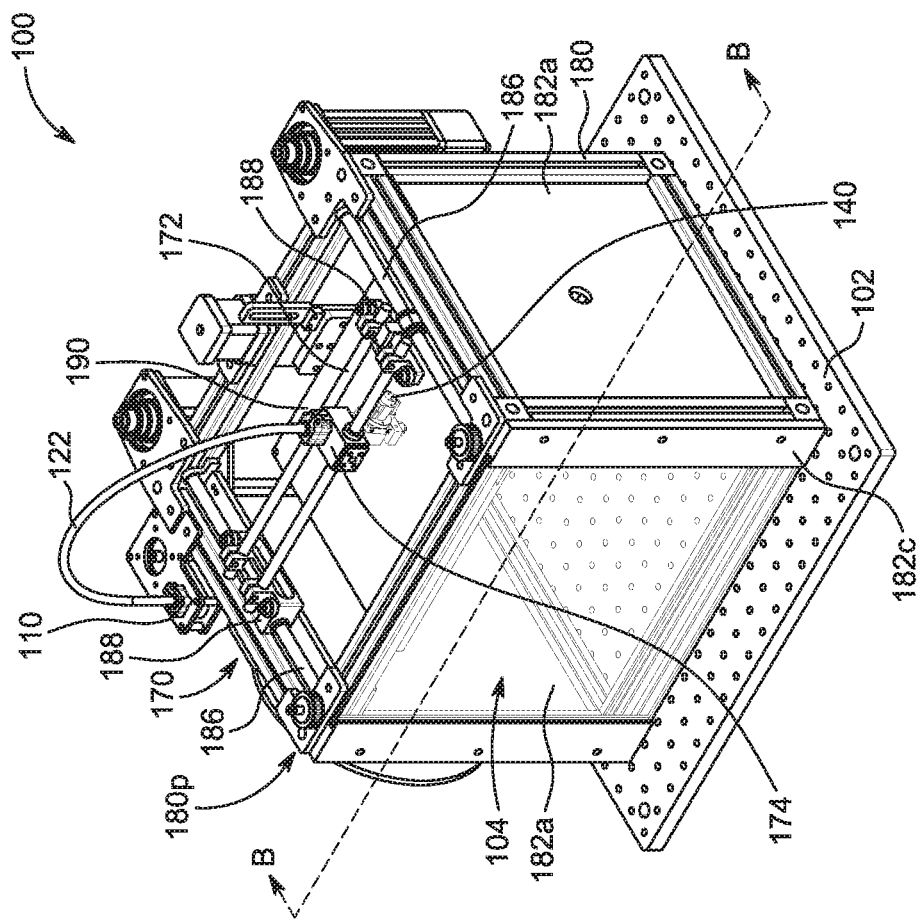
FIG. 1A is a perspective view of one exemplary embodiment of a high-throughput extrusion-based three-dimensional printing device.
Figure 1B:
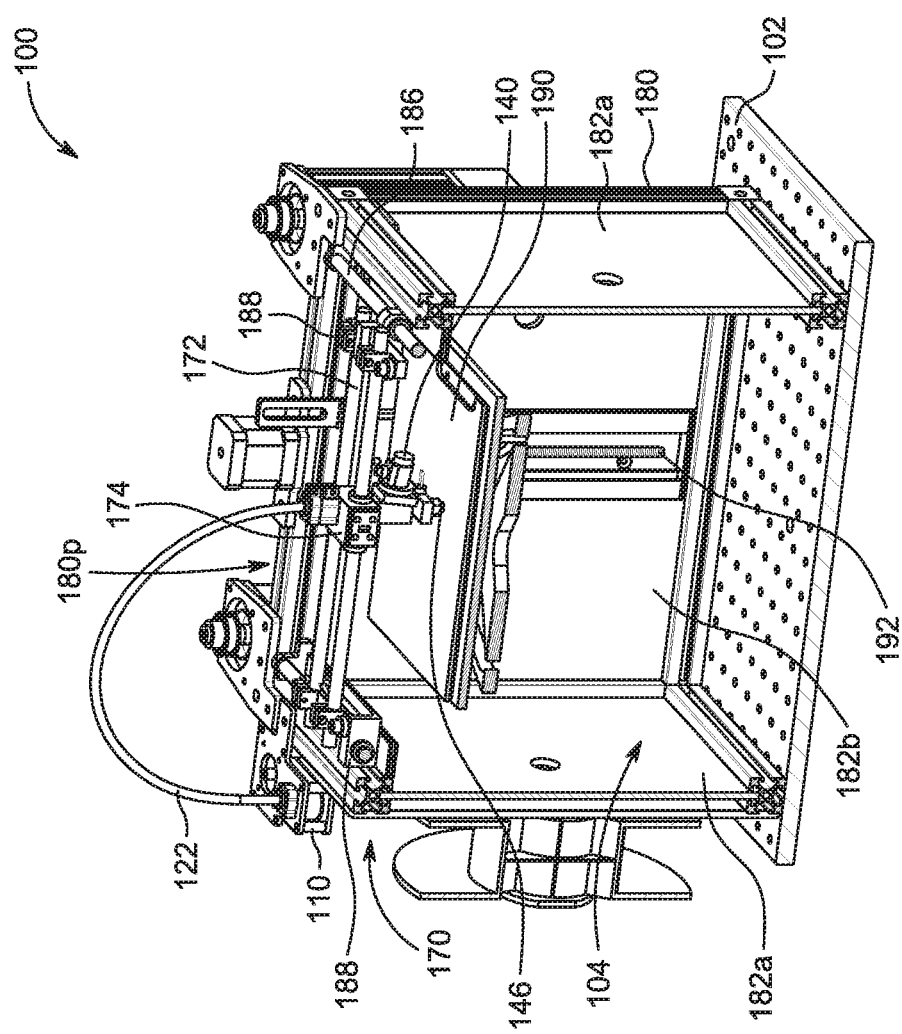
FIG. 1B is a perspective, cross-sectional view of the printing device of FIG. 1A taken along the line B-B.
Figure 1C:
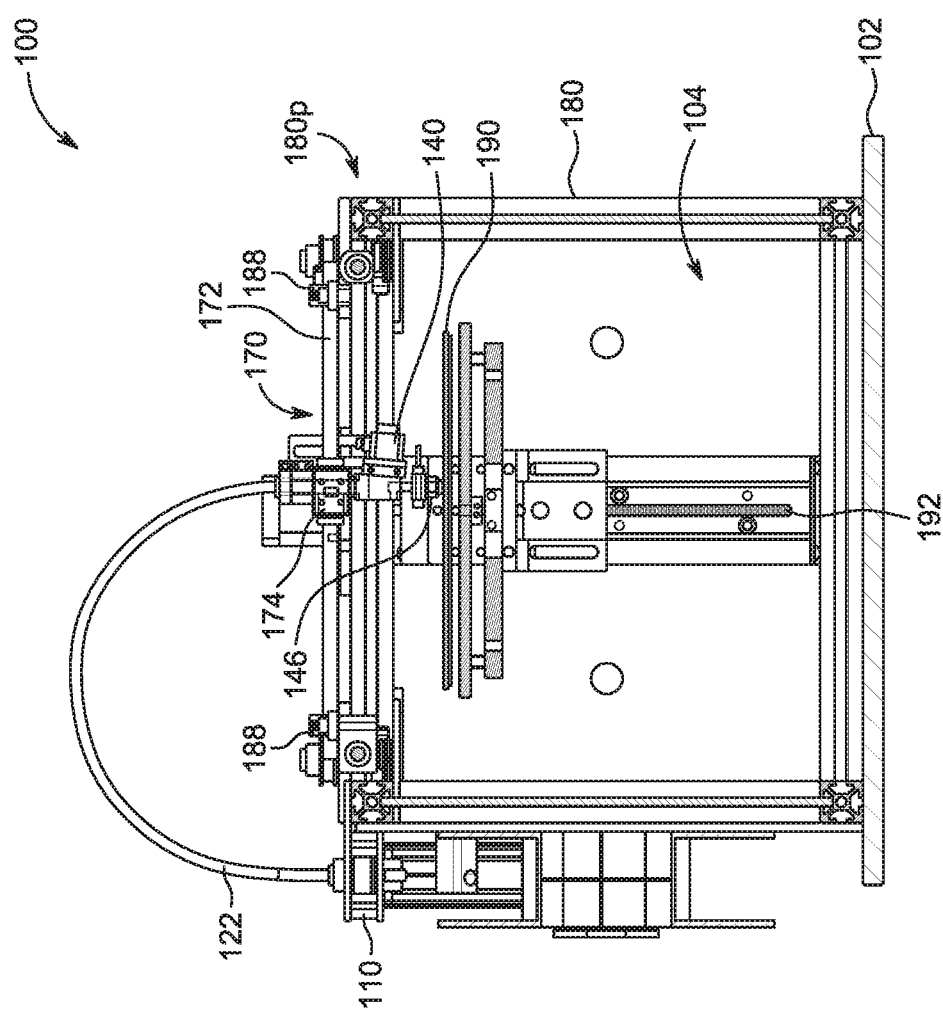
FIG. 1C is a front view of the cross-sectional view of the printing device of FIG. 1B.
Figure 1D:
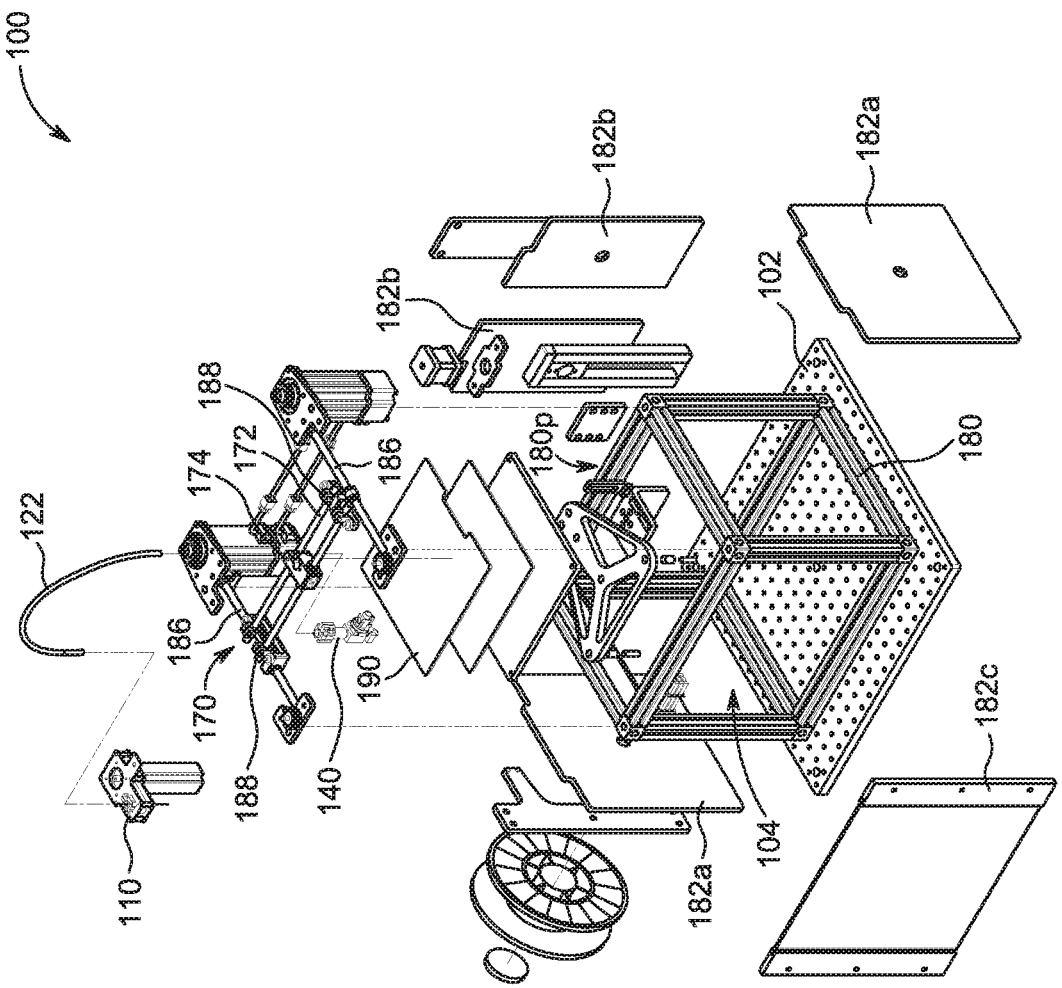
FIG. 1D is an exploded view of the printing device of FIG. 1A.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of various embodiments generally have similar features when those components are of a similar nature and/or serve a similar purpose.

The present disclosure includes some illustrations and descriptions that include prototypes or bench models. A person skilled in the art will recognize how to rely upon the present disclosure to integrate the techniques, systems, devices, and methods provided for into a product, such as a consumer-ready, factory-ready, or lab-ready three-dimensional printer.

Exemplary embodiments of the present disclosure provide for devices capable of printing three-dimensional objects in a high-throughput manner, also referred to as three-dimensional printing devices or printers. In some exemplary embodiments, the printers described are configured to create and/or produce objects and/or material compositions at a high rate using additive manufacturing (AM) techniques such as fused filament fabrication (FFF) or fused deposition Modeling® (FDM®). The increased deposition rate that can result from the present disclosures can be 200% or greater than existing systems while still maintaining high accuracy and resolution. As described in greater detail below, the printers can extrude nanocomposite polymer resins, high performance thermoplastics, and other desirable materials to print the three-dimensional objects.

High-Throughput Three-Dimensional Printer

FIGS. 1A-1D illustrate one exemplary embodiment of a high-throughput extrusion-based three-dimensional printing device or printer 100. As shown, the printer 100 includes an extruder 110, a heater 140, and a motion system 170 that includes a frame 180 and a build or printing platform 190. The printer 100 can be built atop any sort of platform 102, and in the illustrated embodiment the platform is a breadboard. To avoid confusion herein, the platform 102 is typically referred to as a base platform 102 and the platform 190 is typically referred to as a build or printing platform 190. Some exemplary materials for making the base platform 102 include but are not limited to solid aluminum or the like (e.g., aluminum T-slot extrusion), solid steel, polymer concrete, and ground stone. The printer 100 provides a weighted base for increased stability and enablement of modular and reconfigurable mounting of components without requiring changes to the structure. The printer 100 may be placed on mounts to isolate sensitive electronics (e.g., servo drives, laser diode, etc.) from sources of vibration or shock. Further, as described in greater detail below, a build chamber 104 can be defined by the base platform 102, a proximal end 180p of the frame 180, and walls 182 extending therebetween, with the build chamber 104 being the location within which the printed object is printed.

The extruder 110 is generally configured to drive filament into and through the heater 140 to be deposited onto the printing platform 190. The heater 140 heats the filament to desired temperatures at designated times to help increase the throughput of the device 100. The motion system 170 drives a location of where the extruded and heated filament is deposited with respect to the build platform 190. Additional detail about each of the extruder 110, the heater 140, and the motion system 170 are provided in delineated sections below, as well as elsewhere in the present application.

While more specifics of the components of the printing device 100 are described in greater detail below, a general description of how the components work together to print is provided in this section.

The extruder 110 may be a nut feed extruder or the like, capable of providing high-force filament feed and high-throughput extrusion. In FIGS. 1A to 1D, the extruder 110 is assembled and/or attached to frame 180 of the printer 100. The extruder 110 is connected to the heater 140 using a compliant member that directs the filament into the heater 140 for any X-Y position of the motion system 170. It should be understood that in other embodiments the extruder 110 may be assembled and/or attached to the heater 140 and/or any component of the motion system 170. The extruder 110 can be in fluid communication with the heater 140 such that filament disposed in the extruder 110 can be driven, fed, or otherwise extruded to or through the heater 140.

The heater 140 may be divided into multiple sections, with each section being designed to heat the received filament to a desired temperature. For example, the sections described in greater detail below include a pre-heater 142 and a liquefier 144. The pre-heating portion 142 may be a radiative liquefier or infrared (IR) heater (e.g., laser heater), a resistive liquefier or joule heater, or an electrically-assisted heater in some exemplary embodiments, although other heater types are possible. Generally, the pre-heater 142 is designed to raise the temperature of the filament received from the extruder 110 via volumetric or surface heating until the filament reaches or exceeds a desired (or target) pre-heat or threshold temperature.

In turn, the pre-heated filament is fed and/or advanced from the pre-heating portion 142 towards the liquefying portion or liquefier 144. Generally, the liquefier 144 is designed to maintain or raise the temperature of the filament to achieve or exceed a desired (or target) melt temperature for extruding the filament through a distal portion thereof, such as through a nozzle 146, onto the build platform 190 or other filament that had been previously deposited. The liquefier 144 maintains the temperature in instances in which the desired pre-heat temperature is equal to the desired melt temperature. However, when the desired melt temperature is greater than then desired pre-heat temperature, and the filament is below the desired melt temperature when it arrives at the liquefier 144, the liquefier heats the filament to achieve or exceed the desired melt temperature.

It should be understood that in some instances one of the pre-heater 142 and the liquefier 144 may not be included, with the other component being used for all of the heating of the filament. For example, in some embodiments there may be no liquefier prior to the nozzle, and instead the pre-heater 142 can volumetrically heat the filament to the desired melt temperature. The filament can then be deposited through the nozzle 146, towards the build platform 190, when or sometime after the desired melt temperature is achieved or exceeded.

Further, it should be understood that the desired (or target) pre-heat and melt temperatures may be pre-determined temperatures identified or calculated prior to printing based, for example, on build instructions. Alternatively, the desired pre-heat and melt temperatures may be dynamically determined based on real-time measurements obtained from the printing device, as described below in further detail. For example, the desired preheat and/or melt temperatures may be dynamically determined such that the viscosity of the extruded material can be modified during printing.

The heater 140 is advanced, positioned, and/or driven with respect to the build platform 190 by the motion system 170, such as a gantry 172. In the illustrated embodiment, the gantry 172 is an H-frame gantry, although many other configurations are possible without departing from the spirit of the present disclosure. As shown, the motion system 170 is built and/or assembled on top of the frame 180, i.e., on a proximal portion 180p of the frame 180. Some possible components of the motion system 170 that are associated with the illustrated H-frame gantry 172 are described in detail below with respect to FIGS. 7A-7C, and thus not all components are labeled and described in this section.

In the illustrated embodiment, the heater 140 is assembled on, connected to, and/or is otherwise positioned on a cart 174 of the motion system 170. The cart 174, and thus the heater 140, is driven by the motion system 170 to position the heater 140 on a desired X-Y coordinate in an X-Y plane to deposit filament at the commensurate coordinate on the build platform 190, or on filament already deposited at that commensurate coordinate location on the build platform 190. A layer of an object to be printed is created by moving the cart 174, and thus the heater 140, to each of the desired coordinates on the X-Y plane and depositing the filament that has been heated to or exceeds the desired melt temperature onto the build platform 190 at each desired coordinate. The resulting printed object can become a three-dimensional object by adjusting a location of the build platform 190 with respect to the Z-axis using techniques known to those skilled in the art, for instance by providing a motor to drive the build platform 190 up-and-down, i.e., proximally and distally. Alternatively, or additionally, the cart 174 or other aspects of the printer 100 more generally can be moved to also provide for printing in the third dimension so that the location of the nozzle through which filament is extruded changes with respect to the location of the build platform 190 and filament deposited on the build platform 190. Further, a person skilled in the art, in view of the present disclosures, will understand how various components of the printer 100 can be adjusted to print across each of the X, Y, and Z axes.

Temperature control within the build chamber 104 can be achieved using, for example, a build platform 190 that is heated. For example, a heated build platform can include a printed circuit board (PCB) resistive heater or cartridge heater. The PCB resistive heater may be thermally connected to an aluminum plate using a thin layer of thermal paste to provide a precision surface and a heat spreader. A removable perforated build plate can be fixed to the PCB surface to provide, among other benefits, good base layer adhesion, part removal, and cleaning. In some embodiments, a temperature of the build platform 190 can be approximately in the range of about 80° Celsius to about 120° Celsius, and in one non-limiting exemplary embodiment the temperature of the build platform 190 can be about 100° Celsius.

Generally, coordination and/or management of components of the printing devices provided for herein, including the printer 100, including actuators, resistive heaters, and temperature feedback devices, can be coordinated and/or managed by or through a motherboard, control board, or the like, such as a reprap Arduino-compatible mother board (RAMBo). Such a mother board may include one or more steppers, drivers, and heater transistors, among other features, which may be used, for example, to control the Z-axis positioning of the build platform 190 and/or the nozzle 146, the desired pre-heat temperature for filament being used in printing, the desired melt temperature for the same filament, and the desired temperature of the build platform 190 onto which the filament is printed, among other features the mother board can control. Servomotors associated with the extruder 110 and motion system 170 may use external drivers paired with the motors. In some exemplary embodiments, the motherboard direction and step signals pins can be remapped to auxiliary outputs.

The printer may be controlled via a personal computer or similar computing device, using software for interfacing with the motherboard of the printer, and software for providing graphical user interfaces (GUIs) for real-time monitoring and feedback analysis of process variables and print progress. Other software employed by the computing device may include software for controlling a diode laser.

Many objects having a host of different shapes, sizes, and configurations can be printed in view of the present disclosures. The printer, and/or components associated therewith, such as software, can be used to plot the best print path to print an object and determine how long it will take to print the object by determining various parameters that may impact the print path and print time, including but not limited to determining how extrusion and heating of the filament can be controlled, and determining how to operate the motion system 170 to achieve the most efficient and effective printing path. For example, if an object to be printed is a rectangular prism measuring 30 millimeters long, 15 millimeters deep, and 4 millimeters tall, thus necessitating 1800 millimeters$^3$ of material, the printer and associated components can calculate that, based on a deposition rate of 5.8 millimeters$^3$ per second, it will take approximately 560 seconds to print the object using the most efficient printing path. By way of further example, if an object is printed using a heating (or pre-heating) portion of a heater, such that it may print at 150 millimeters per second, this amounts to a 12 millimeters$^3$ per second deposition rate. In such an instance, the printer may determine that the approximate time it will take to print the object is approximately 196 seconds. While the printer is generally designed for three-dimensional printing, printing does not have to result in a three-dimensional object. Two-dimensional objects are also possible to be produced.

As shown in FIGS. 1A-1D, in some instances the frame 180 can be enclosed to reduce ambient heat loss and maximize safety. In the illustrated embodiment, the frame 180 is enclosed by two sidewalls 182a, a back wall 182b, and a front wall 182c, which are referred to herein collectively as walls or panels 182. The size and shape of the walls 182 can depend on a variety of factors, including but not limited to the size and shape of the other components with which it used, and in the illustrated embodiments the walls 182 are generally rectangular in shape and sized to extend from the proximal end 180p of the frame 180 to the base platform 102. A variety of materials can be used to construct the walls 182, including but not limited to materials that provide desired thermal insulation while reflecting and diffusing stray radiation. Some non-limiting examples of such material includes custom aluminum clad foam core board, solid aluminum paneling, and infrared opaque plastics. Further, the walls 182 do not have to be constructed from the same material. For example, the front wall 182c in the illustrated embodiment also serves as a window through which a user can view the object being printed and components of the printer 100. Some non-limiting examples of materials that can be used to construct the front wall 182c and/or other walls in which a window may be desirable, include a plastic or glass material having a coating which attenuates infrared radiation while allowing visible wavelengths of light. As a result, a window of the walls 182 can be designed so its resistance matches or exceeds peak wavelengths of lasers corresponding to and/or used by the printer 100.

Notably, a person skilled in the art will recognize components of the printer 100 like the extruder 110, the heater 140, and the motion system 170 are by no means limited by the particular descriptions provided for below. The illustrated embodiments are merely some exemplary configurations of such components. A person skilled in the art, in view of the present disclosures, would understand how to implement other configurations of extruders, heaters, and motions systems in conjunction with the teachings provided for herein to arrive at other printers and printing devices without departing from the spirit of the present disclosure. Other configurations, other components and sub-components of the various parts, and even other devices capable of achieving the same results as the extruder 110, the heater 140, and motion system 170 are contemplated in view of the present disclosures.

It should be understood that, in some embodiments, a printer can be configured solely with an extruder (such as the extruder described herein) and a nozzle via which the filament is extruded onto a build platform or object being built thereon. In other embodiments, the printer may be configured with an extruder and pre-heater, an extruder and a liquefier, or an extruder and a heater including a pre-heater and liquefier. In such embodiments, the heating components (e.g., pre-heater, liquefier, or both) of the printer can be configured to provide the desired heating. A person having skill in the art will understand how any of the individual components provided for herein can be combined with other components provided for herein or otherwise used to create desired printing systems and methods without departing from the spirit of the present disclosure.

Extruder

Figure 2A:
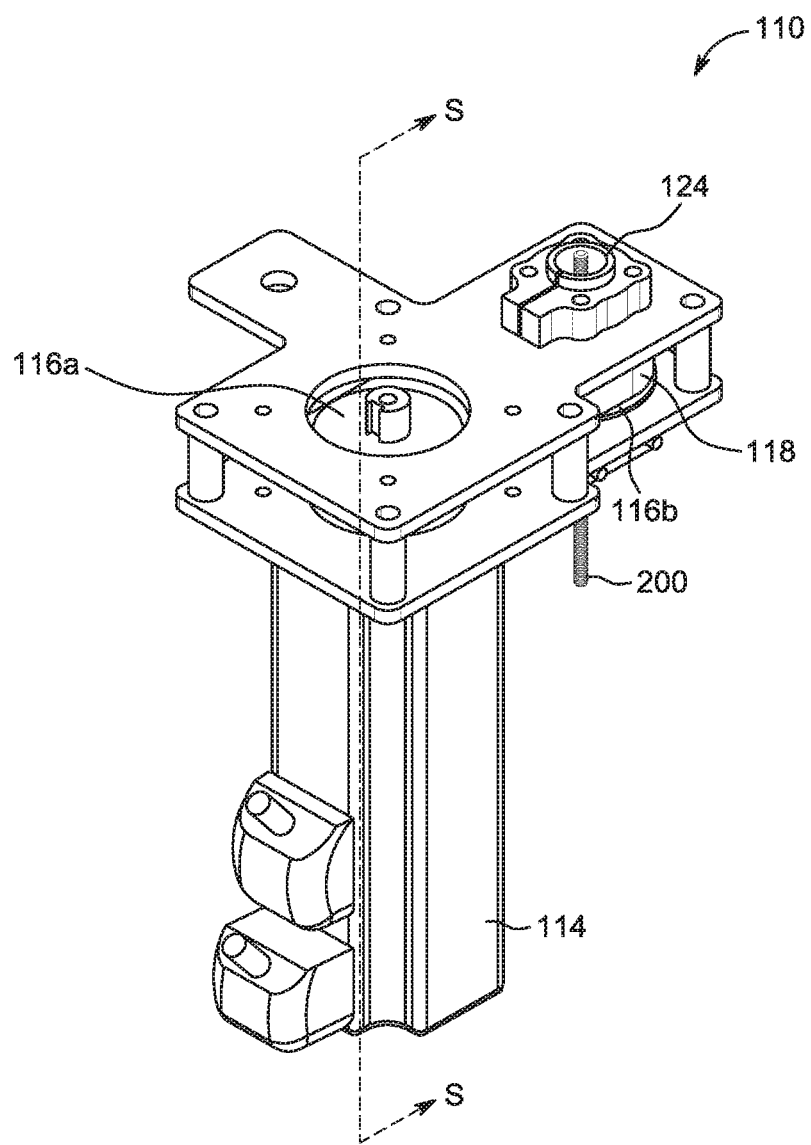
FIG. 2A is a perspective view of an extruder of the printing device of FIG. 1A.
Figure 2B:
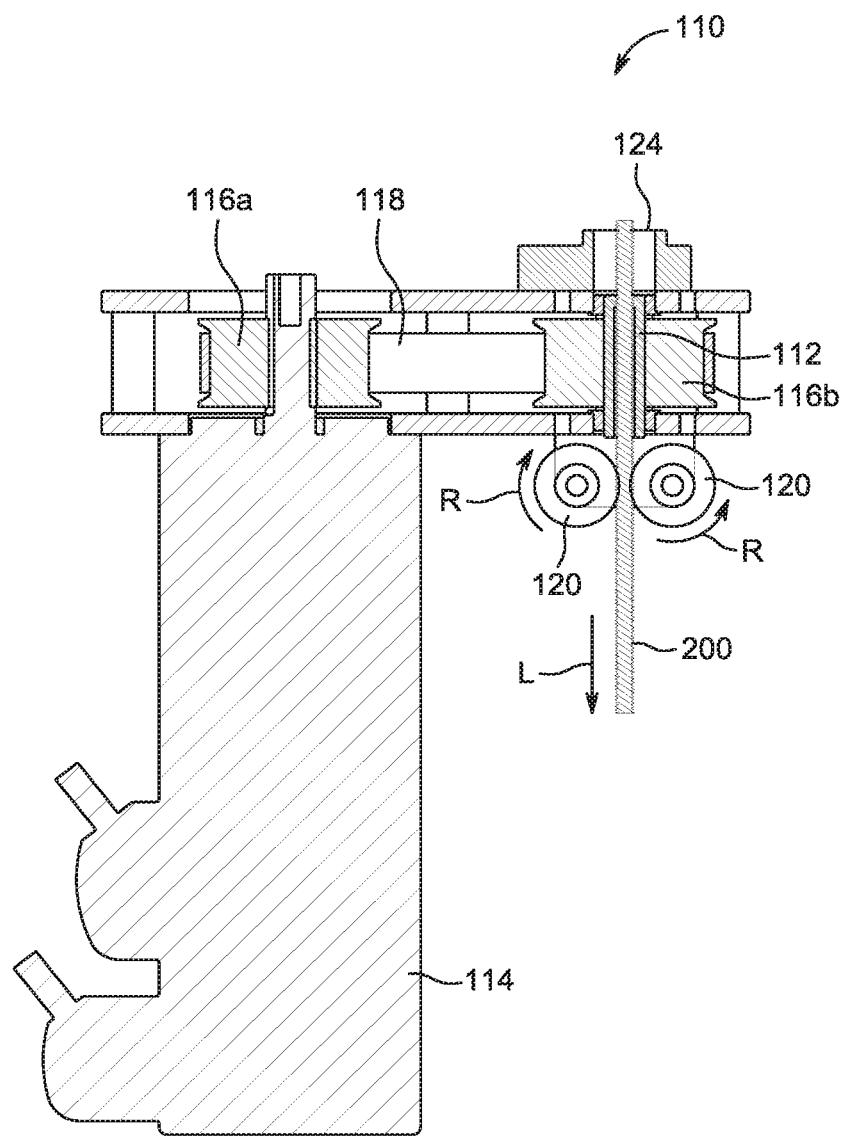
FIG. 2B is a front view of the cross-sectional view of the extruder of FIG. 2A taken along the line S-S.
Figure 2C:
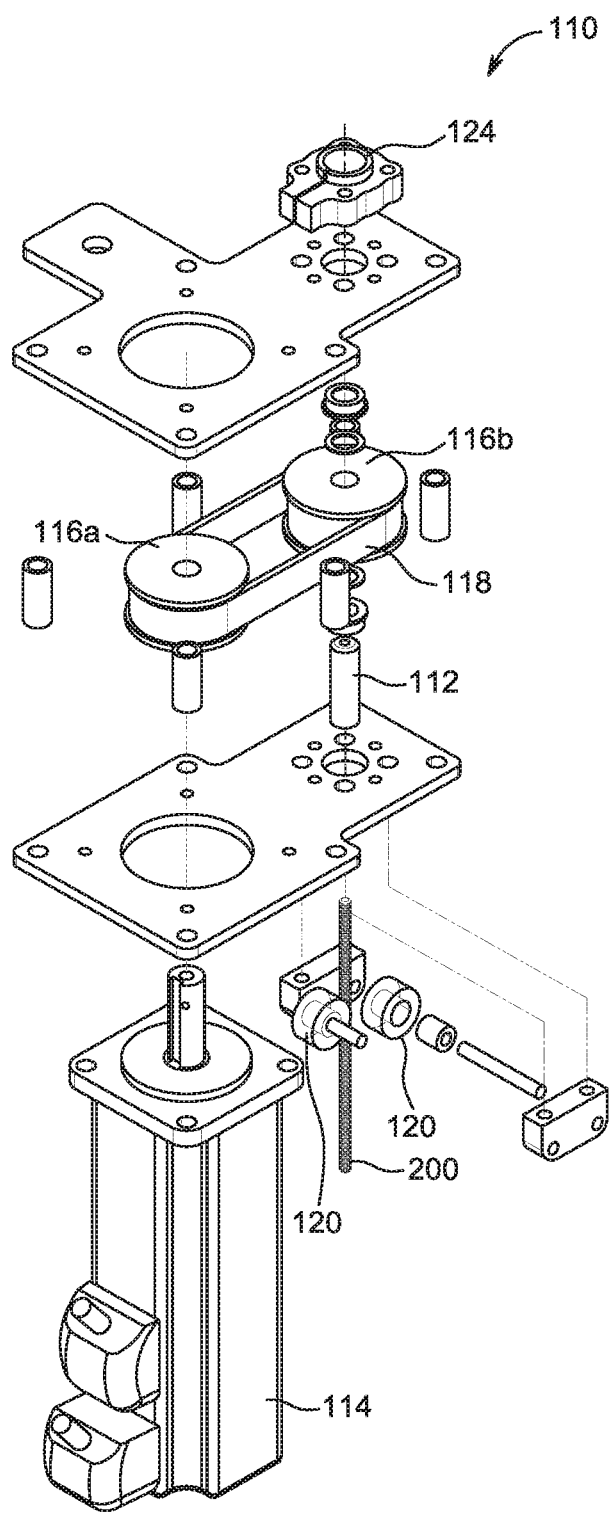
FIG. 2C is an exploded view of extruder of FIG. 2A.

FIGS. 2A-2C illustrate the extruder 110, which in the illustrated embodiment is a nut feed extruder for receiving or engaging with a filament 200 and advancing the filament 200 to or through the heater 140 towards an output or build area, e.g., the build platform 190. The filament can have a variety of cross-sectional shapes, including but not limited to being circular, square, and/or hexagonal, and it does not necessary even have to have the same shape for the entirety of its length. As described in further detail below, the filament 200 can comprise one or more materials, at least one of which can be melted or softened.

Moreover, as described in further detail below, the filament 200 may be linearly advanced along an axis, illustrated as a feed axis L, driven and/or extruded by rotating the feed nut 112 of the extruder 110 in the direction R. More specifically, the feed nut 112 can rotate in the direction R about the axis L to drive the filament 200 distally towards an output area (e.g., a build platform) such that an axis of rotation around which the feed nut 112 rotates is substantially collinear with the feed axis L of the filament. In other words, as shown, the feed nut 112 can rotate concentric to the filament 200. In some exemplary embodiments, the feed nut 112 of the extruder 110, serving as the driving mechanism, can be configured such that the contact area or engagement area between the feed nut 112 and the filament 200 is as large as desired (e.g., increased relative to the contact area or engagement area achieved and is larger than traditional pinch wheel mechanisms). The engagement area can be increased by having a larger area of material of the filament 200 that engages with the feed nut 112 and the feed nut's texture, engagement portions, or threads (described below in further detail).

For example, in an embodiment in which a filament 200 includes convex threads and the feed nut 112 includes mating concave threads, the shear area of the filament 200 refers to the portion of the thread of the filament 200 that engages with the mating thread of the feed nut 112, resulting in a projected area of material that is primarily under shear loading or shear stress when the threads are engaged and the filament is being driven in its axial direction. The extruder 110 and the feed nut 112 are therefore configured to reduce the shear load or stress on the filament 200 by maximizing the contact area between the engagement features and the filament 200. That is, an increased contact area results in a lower average shear stress in or on the filament 200, at the root of the engagement features, particularly when compared to shear stress resulting from traditional pinch wheel mechanisms. In some embodiments, the desired or optimum force to be applied on the filament 200 is such that the filament 200 can be more rapidly heated and extruded while avoiding buckling thereof.

It should be understood that reducing the number of driving mechanisms, such as the feed nut 112, of the printer typically decreases the weight of the extruder 110, which can result in a lower power requirement to drive the extruder 110 or motion system. Further, it should also be understood that one or more rotating elements that do not rotate concentrically to the filament 200 may be used instead of or in addition to the feed nut 112. Such a rotating element may engage a periodic texture or engagement feature of the filament 200, and may rotate parallel to the filament axis while only contacting the filament along a single edge.

In some embodiments, the extruder is powered by a single rotary actuator or motor 114. More specifically, the nut feed extruder 110 can include a rotary motor 114 (also referred to herein as "extrusion motor" or "extruder motor"), timing pulleys 116a and 116b, a feed nut 112, and a timing belt 118, and is used to drive, i.e., extrude, a filament 200 having texture or engagement features such as threads. In some embodiments, a feed nut 112 may be integrated with a central shaft of the motor 114 such that the filament 200 passes collinearly through the motor 114. In addition to, or instead of, these components, in some embodiments power transmission elements such as a sprocket and chain, gears, or other similarly purposed components may be provided in the extruder 110 to achieve the same effect. The filament 200 can be separately provided and added to the extruder 110 when the printer 100 is to be operated to print an object.

In some embodiments, the filament 200 and the feed nut 112 contain one or more mating and/or complementary engagement features. The engagement, features may be periodic textures on the filament 200 and/or feed nut 112 that enable mechanical engagement while the feed nut 112 rotates about an axis of rotation substantially parallel to a feed axis via which the filament is fed into the extruder 110. Mechanical engagement may be enhanced by providing engagement features that are disposed on the feed nut 112 and/or filament 200 in a position substantially perpendicular to the filament feed axis.

Figure 13B:
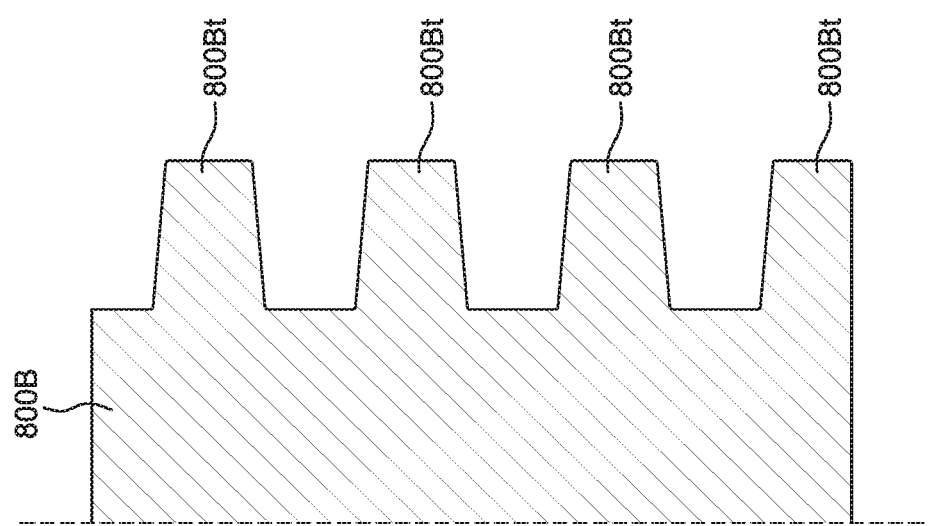
FIG. 13B is a schematic illustration of another exemplary embodiment of a thread profile of a filament.
Figure 13A:
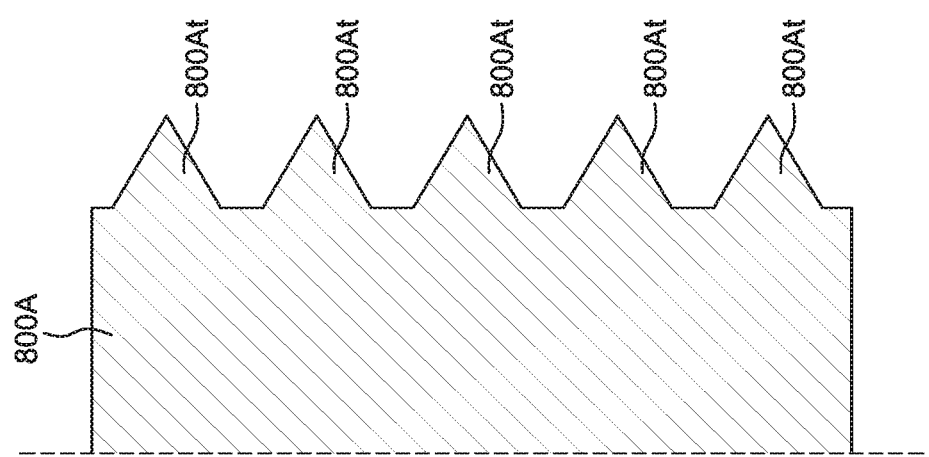
FIG. 13A is a schematic illustration of one exemplary embodiment of a thread profile of a filament.

In some embodiments, the engagement features and/or periodic features may be mating and disposed on the outer surface of the filament 800A and the inner surface of the corresponding feed nut. The textures can be threads of matching pitch which wrap helically insider or outside of the feed nut or filament 800A in a consistent and repeatable fashion. The threads may have different cross section profiles suited for specific applications and manufacturing costs. The thread cross-section profiles may differ in their thread angles α. In Equation 1, shown below, it is shown that increasing thread angle increases the contact surface area between the feed nut and the filament 800A, thereby increasing the friction between them. One exemplary embodiment of a filament having an increased thread angle is illustrated in FIG. 13A, in which threads 800At have a triangular section. Such threads with a triangular section may resemble traditional commercial fasteners. Moreover, the threads 800At shown in FIG. 13A may be used with a non-back drivable extrusion system such that constant pressure can be maintained within the liquefier. Increases to the thread angle α may also increase the torque required by the extrusion actuator to rotate the feed nut to linearly advance the filament 800A. Conversely, decreasing the thread angle α reduces friction and less torque is required to extrude the filament. In some embodiments in which the thread angle is reduced, a thread 800Bt with a more quadrilateral cross-sectional shape, such as substantially square, rectangular, or trapezoidal cross-sections, may be provided, such as the filament 800B illustrated in FIG. 13B. In some instances, a light thread angle may be used to facilitate manufacturing thereof.

Figure 14B:
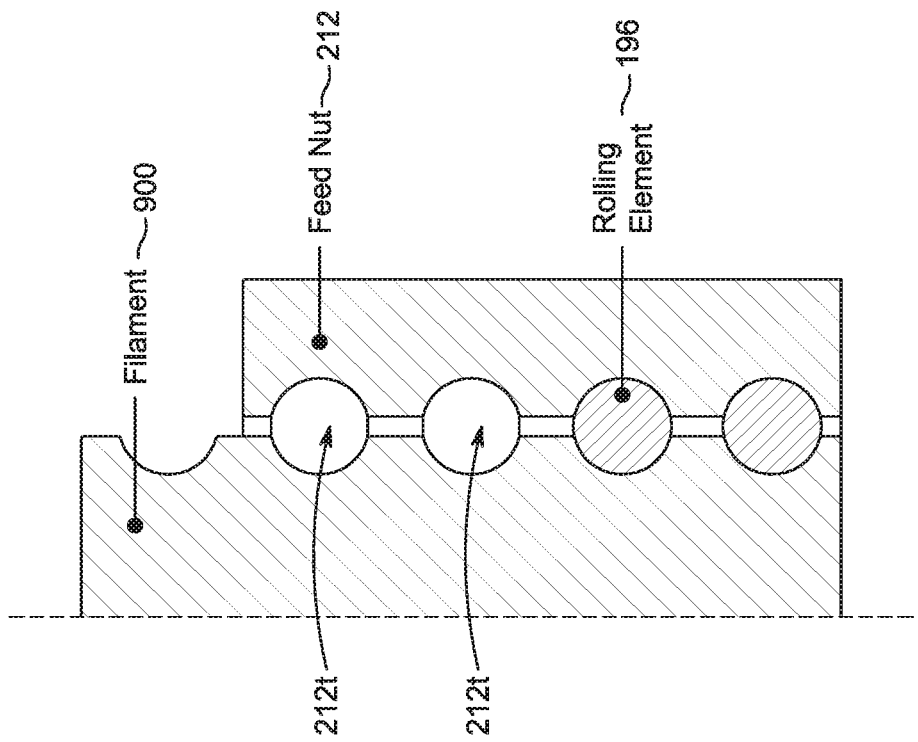
FIG. 14B is a side cross-sectional view of the rolling elements, filament, and feed nut of FIG. 14A.
Figure 14A:
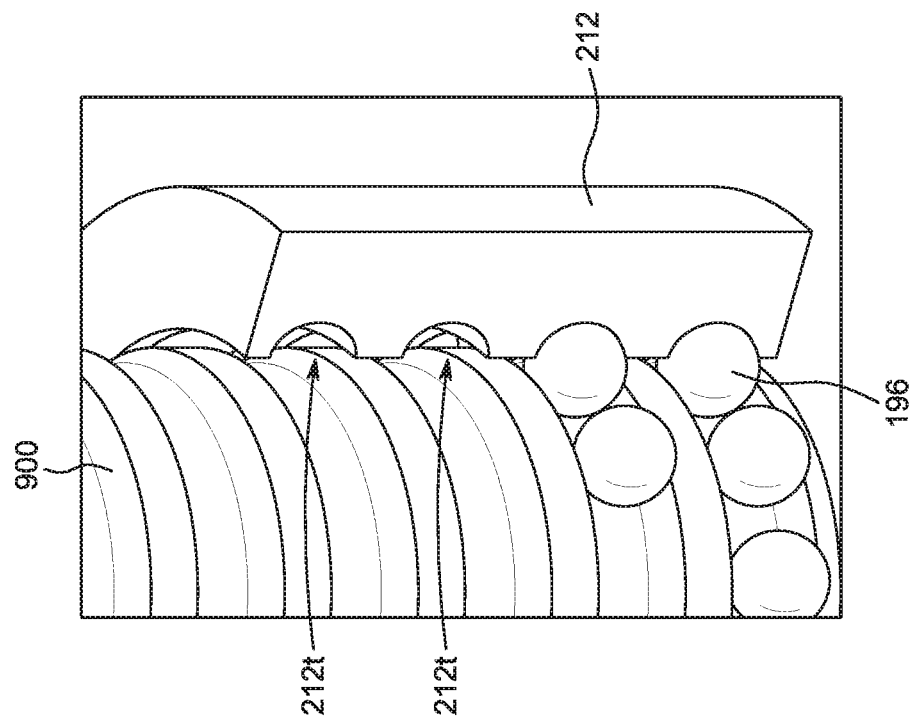
FIG. 14A is a perspective view of one exemplary embodiment of rolling elements engaging with a filament and feed nut, with a portion of the feed nut being cut away for illustrative purposes.

In other embodiments, a rolling element 196 may be placed in between threads 212t of a feed nut 212 and a filament 900 to reduce friction therebetween, as shown in FIG. 14A. These rolling elements 196 may include shapes such as spherical, cylindrical, and/or conical shapes. The thread profile of the filament 900 and the feed nut 212 can be designed to match the geometry of the rolling element 196. For example, as shown in FIG. 14B, in a system configured to use spherical rolling elements, the filament 900 and the feed nut 212 can include concave hemispherical threads 212t with a radius approximately equal in size to that of the spherical rolling element 196.

Figure 15C:
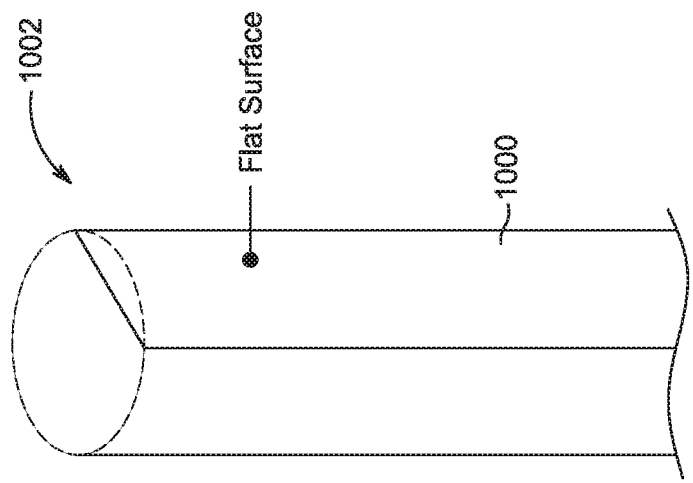
FIG. 15C is a perspective view of the filament of FIG. 15A, the filament including a flat surface.
Figure 15A:
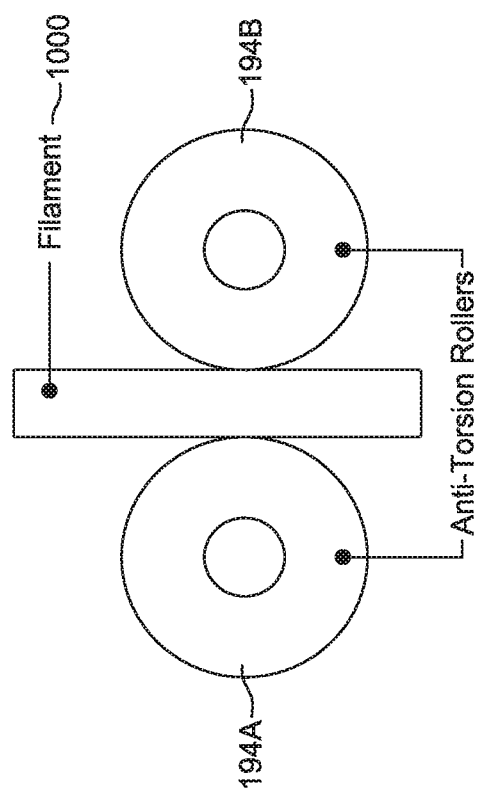
FIG. 15A is a side view of one exemplary embodiment of an extruder having a filament associated therewith.
Figure 15B:
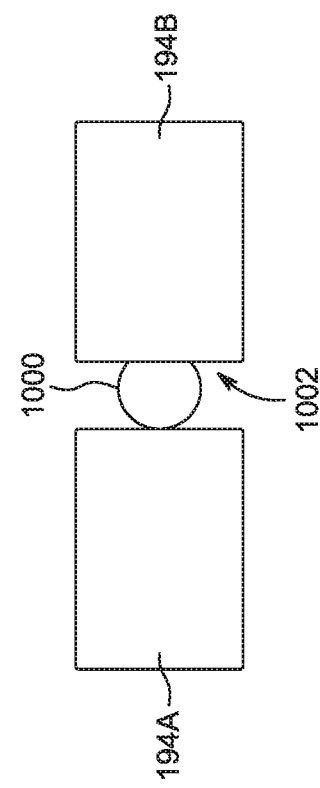
FIG. 15B is a top view of the extruder and filament of FIG. 15A.

In other embodiments, textures may run tangent to the filament surface in the axial direction of the filament. These features may be used in conjunction with other elements of the extruder to index rotary position or prevent torsion during the extrusion process. As described herein, a filament can begin to rotate under high force extrusion conditions as a result of high thread friction. As shown in FIG. 15, anti-torsion rollers 194A and 194B may be used to mitigate the rotation of a filament 1000. The rollers 194A and 194B can be made, for example, of one or more soft elastomeric materials. Mechanical guides 1002, such as axially oriented textures, may be provided for as part of the filament 1000 to also and/or alternatively mitigate rotation of the filament 1000 with respect to the rollers 194A and 194B. The mechanical guides 1002 can, promote the axial advancement of the filament 1000 to deliver more material to a liquefier in association with the systems, devices, and methods provided for herein. The mechanical guides 1002 may be a "D" shape added to the flat surface on the side of the filament 1000, as shown in FIG. 15B. In other embodiments, multiple flats (or flat surfaces), or more complex geometries, can be used to provide rotation locking capabilities. Some non-limiting examples of filaments 1100A and 1100B with such guides 1102A and 1102B, respectively, are illustrated in FIGS. 16A and 16B. The mechanical guides 1102A and 1102B both include flat sections, with the mechanical guide 1102A in FIG. 16A being a "double D" configuration, and the mechanical guide 1102B in FIG. 16B being a "triangle" configuration. A consistent cross-section of these features enables the ease of their manufacture by using predeveloped processes such as die extrusion. It should be understood that the textures described above may be used simultaneously to achieve increased force capabilities and rotational position locking, and further, that many other textures having a variety of shapes and configurations are derivable from the present disclosure and fall within the scope of the present disclosure.

In some embodiments, the filament 200 may be pre-threaded prior to initiating an extrusion process. Alternatively, an unthreaded filament may be threaded in-process (e.g., during extrusion), for example, using a die or die cutter incorporated with the feed nut 112 of the extruder 110. The die or die-cutter can be heated, or a separate mechanism can be used to heat the surface of the filament to assist in the creation of engagement features on the filament surface. The engagement features can have a variety of profiles that are conducive to allowing the nut feed mechanism to control and/or advance the filament.

Other components can also be included as part of the extruder 110. For example, rollers 120 (e.g., a pair of rubber rollers) can he provided to firmly grip the filament 200 and prevent its twisting due to friction between the threads of the filament 200 and the feed nut 112. The extruder 110 may also include a guide 122, such as a polytetrafluoroethylene (PTFE) tube 150 or the like, which may be bent or positioned in a desired shape (e.g., a "U" shape) to guide the filament 200 from an output area or section 124 of the extruder 110 to an entrance and/or input area 142 of the heater 140. Such an arrangement in which PTFE tube 150 or the like is used may be referred to as a "Bowden" style architecture. In some exemplary embodiments, the elements or parts of the heater 140 can be concentric with the Bowden tube, and high-temperature heater components can be subsequently isolated from temperature-sensitive mechanisms of the motion system 170 (e.g., the gantry 172), such as timing belts.

In some embodiments, the nut feed extruder 110 may be mounted, assembled, and/or directly connected to the motion system 170. The nut feed extruder 110 may also and/or alternatively be mounted and/or directly connected to the frame 180 of the printer 100, as shown for example in FIGS. 1A-1D, using the Bowden cable style architecture described above. Such an arrangement in which the nut feed extruder 110 is mounted on the frame 180 may cause a reduction of the mass load on the motion system 170 (e.g., gantry 172), and may thereby improve its dynamic performance. A person skilled in the art will understand various materials that can be used to construct various components of the extruder 110, and thus no explicit discussion about suitable materials used to construct the extruder 110 is necessary.

To advance the filament 200 through the extruder 110, the rotary motor 114 rotates the feed nut 112 using a power transmission element such as a belt (e.g., the timing belt 118). In some embodiments, the rotary motor 114 is a high-speed low-torque motor. Rotation of the feed nut 112 in turn causes motion (e.g., linear motion) of the filament 200, for instance in a direction towards the output section 124 of the extruder 110 or towards the nozzle 146 for extruding material, by allowing or engaging internal threads of the feed nut 112 to push against or pull on the external threads of the filament 200. The shape and pitch of the internal threads of the feed nut 112 and/or the internal threads of the filament 200 can be determined by design to provide coarse (i.e., high-speed) linear motion or fine (i.e., high-precision) linear motion of the filament. The feed nut 112 may be constrained by bearing elements, e.g., the rollers 120, such that it rotates. Likewise, the filament 200 may be constrained such that it does not twist during the extrusion process. Such an arrangement of the feed nut 112 and filament 200 aids in the advancement of the filament in a linear motion as the nut 112 is rotated. Thus, the nut feed extruder 110 improves rate-controlled filament extrusion by providing more precise movements (e.g., linear movements) of the filament 200 and lower torque requirements from the feed nut 112.

Figure 3A:
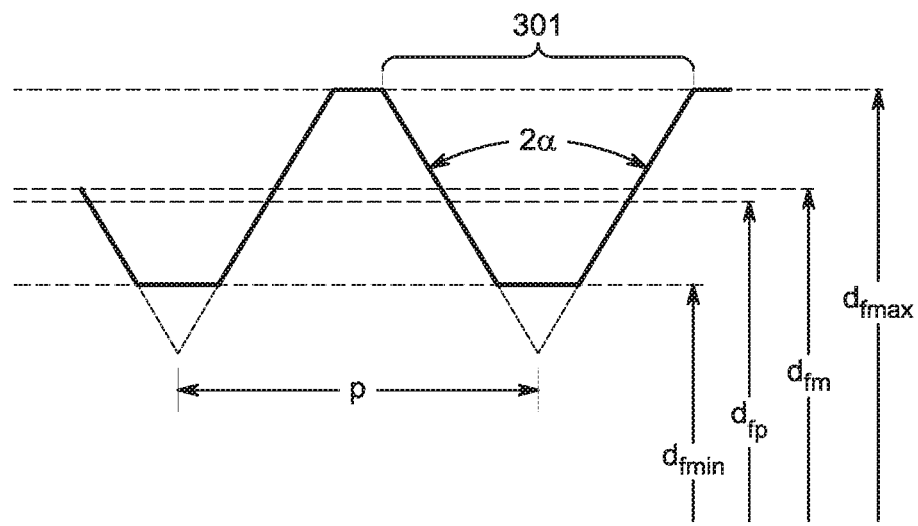
FIG. 3A is a schematic illustration of one exemplary embodiment of a thread profile for an extruder, such as the extruder of FIG. 2A.
Figure 3B:
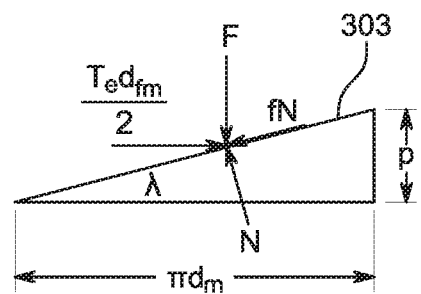
FIG. 3B is a schematic graphic illustration of forces on an unwound thread used in conjunction with an extruder, such as the extruder of FIG. 2A.

FIGS. 3A and 3B illustrate geometries related to a nut feed extruder such as the extruder 110. More specifically, in FIG. 3A, sections of threads on or of a filament (illustrated as element 301) are described by their pitch p, lead angle λ, and thread angle 2α. The filament thread is further described by the minimum diameter $d_{fmin}$, pitch diameter $d_{fp}$, major diameter $d_{fmax}$, and mean diameter $d_{fm}$. A liquefier force F (FIG. 3B) acts through the centerline of the filament and against the direction of extrusion. The liquefier force F indicates the force required to push the filament through a heater, like the heater 140, and thus would be enough force to drive the filament 200 through both the pre-heater 142 and the liquefier 144.

In FIG. 3B, forces acting on a surface 303 of an unraveled thread of a filament are shown along the mean diameter. A friction coefficient f acts between the filament and feed nut threads. That is, the friction coefficient f contributes to a resistive friction force against the direction of motion to be overcome by an extruder motor, in addition to the liquefier force F.

In some embodiments, linear displacement can be determined by knowing or determining the angular displacement of the feed nut and the thread pitch p, assuming the filament body does not, for example, rotate due to torsion or compress from loading. Linear feed rate (e.g., the relative velocity of the extrusion of the filament) can be determined or calculated from a first time derivative of the displacement equation (e.g., of angular displacement of the feed nut, which can be in radians). This linear displacement determination can be used, for example, with single-start threads, which are threads of substantially equal lead and pitch. If the nut feed is a single-start thread, the lead angle and pitch can be determined to be related.

The torque needed by the feed nut 112 to allow extrusion (e.g., to push with a linear force is a function of the pitch p, mean filament diameter $d_{fm}$, friction coefficient f, and thread angle α, as described by the following Equation 1, which is derived using the vectors illustrated in FIG. 3B:

$$T_e = \frac{FD_{fm}}{2}\left(\frac{p + \pi f d_{fm}\sec\alpha}{\pi d_{fm} - \sec\alpha}\right) \quad (1)$$

In some embodiments, a larger torque is needed when the force F increases. Further, increasing the filament radius, thread angle, and lead angle can increase thread friction and thus may also increase the amount of torque needed by the feed nut to allow extrusion.

Extrusion force capacity of a nut feed mechanism, like the feed nut 112, may be calculated by determining the maximum force $F_{emax}$ sustainable by a length of threaded filament (e.g., a length measured from the input of the extruder 110 to the output of the heater 140, which is the nozzle 146 at a distal end of the liquefier 144), and can be described, for instance, by the following Equation 2:

$$F_{emax} \cong \sqrt{3}\sigma_{uts}A_{fs} \quad (2)$$

In Equation 2 above, $\sigma_{uts}$ represents the tensile strength (e.g., ultimate tensile strength) of the filament material and $A_{fs}$ represents the cross-sectional area of the threads in shear (e.g., the length or amount of material in engagement with the feed nut 112). The √3 factor may be derived from the von Mises theory prediction of shear yield strength for ductile materials in the loading angle of pure shear, which provides an estimate or assumption for load capabilities of threads. The area of the cross-section in shear may be expressed by the following Equation 3:

$$A_{fs} = \frac{\pi l_e d_{fmax}}{p}\left[\frac{p}{2} + \frac{1}{\sqrt{3}}(d_{fmax} - d_{fp})\right] \quad (3)$$

In Equation 3, $l_e$ represents the length of engagement with the threads in shear. The shear area is related to the pitch and filament diameter but also increases linearly with the length of engagement which is independent of the pitch. Force capacity may be increased without affecting required motor torque, thread geometries, or feed rate. A greater shear area thus generates more force.

As discussed above, in some example embodiments, torsion force increases with increasing lead angle, thread angle, and thread pitch. Accordingly, the maximum torsion stress sustainable by the filament before failure can be represented as shown in Equation 4:

$$\sigma_{uts} \cong \frac{16T_e}{\sqrt{3\pi d_{fmin}^3}} \quad (4)$$

It should be understood that, in some embodiments, it may be desirable to minim torsion of the filament in order to avoid twisting of the filament, linear positioning errors, increases in resistive friction, and breakage of the filament.

In one exemplary embodiment, the loading capability or load capacity of the filament is calculated for a section of threaded filament of length 4-40 thread acrylonitrile butadiene styrene (ABS) and has the following physical dimensions illustrated in Table 1:

TABLE 1

| Parameter | Value |
|---|---|
| Pitch p (mm) | 0.635 |
| Lead Angle λ (deg) | 4.7 |
| Thread Angle 2α (deg) | 60 |
| Minimum diameter $df_{min}$ (mm) | 2.065 |
| Pitch diameter $d_{fp}$ (mm) | 2.433 |
| Major diameter $d_{fmax}$ (mm) | 2.844 |
| Mean diameter $d_{fm}$ (mm) | 2.454 |

Using the above equations and the filament information in Table 1, the threaded filament may be determined to have an ultimate tensile strength $A_{fs}$ of 33 MPa. Accordingly, the threaded filament is calculated to be able to withstand or have a loaded capacity of approximately 149 N of force per each mm of length, assuming failure at the threads. In some embodiments, the load capacity indicates the amount of force needed to cause the threads of a shear area of a filament to be stripped or fail. In embodiments presented herein, where the filament has threads with a minor cross section of 3.35 millimeters², the maximum predicted tensile force is determined to be approximately 111 Newtons before tensile failure, and a single thread of the filament is determined to support approximately 94.45 Newtons of force.

Table 2 below indicates a calculated peak force for 0.635 millimeters of engaged filament thread at various pull rates, according to exemplary embodiments presented herein:

TABLE 2

| Pull Rate (mm/s) | Peak Force (N) |
|---|---|
| .1 | 99.52 |
| .5 | 129.36 |
| .75 | 102.09 |
| 1 | 110.68 |
| 10 | 102.09 |

In some embodiments, the performance of a nut feed extruder may be calculated and/or estimated based on material properties and/or design parameters of the printer and/or extrusion system. For example, a target or needed motor angular rate for desired extrusion according to example embodiments presented herein may be determined as a function of the input filament feed rate and the filament diameter. In one exemplary embodiment, for an input material volume feed rate of 58 millimeters³ per second and mean filament diameter ($d_{im}$) of 2.45 millimeters, the target and/or necessary maximum motor speed (e.g., motor angular rate)

is 123.4 radians per second or 1178 revolutions per minute (RPM). At this speed, the motor (e.g., servomotor) is able to operate at 0.31 Newton-meters continuously. A continuous extrusion force of 976.3 Newtons may be calculated using Equation 1 described above, in which the continuous force is a function of the feed nut torque and thread pitch. The feed nut torque may be determined to be equal to the continuous motor torque when the belt ratio is 1:1.

In some embodiments, the feed rate of the nut feed extruder may be adjusted based on received parameters of the system. The parameters may be received in real-time during the extrusion, pre-heating and/or melting stages. The parameters may include the extrusion force applied by the extruder on the filament advanced by the extruder, the feed rate of the filament, the temperature of the filament prior to the filament entering the liquefier, and/or the temperature of the filament prior to the filament existing the liquefier towards a build platform, among others. In some embodiments, the parameters are measurements made and/or obtained by sensors incorporated with the printing device, such as infrared and contact temperature sensors, and force sensors such as strain gauges and load cells known to those skilled in the art. For instance, the measurements may be obtained prior to, upon, or as the material exits from the nozzle, or at the part surface.

A controller can be used to manage a number of these functions, including but not limited to using pre-set parameters and/or using real-time data received from the system. The controller, or another component of the system, can be configured to adjust an amount of power being supplied to components of the system (e.g., the pre-heater and/or the liquefier), and/or an amount of force or torque applied to the nut feed extruder, to achieve desired results. For example, the power and/or force can be adjusted to maintain a constant feed rate, to maintain a constant force being applied to the filament, and/or to match a command signal provided by a controller.

Heater

FIGS. 4A-4D illustrate the heater 140 that includes both a pre-heater 142 and a liquefier 144. The heater 140 is designed to raise the temperature of a filament to a target and/or desired melt temperature at which to extrude and/or deposit the filament material onto the build platform 190 for forming a solid three-dimensional object. As designed, the pre-heater 142 is configured to impart heat on the filament 200 during an extrusion process prior to the liquefier 144 imparts heat on the filament 200. The pre-heater 142 can raise the temperature of the filament 200 to or above a designated or desired pre-heat temperature, and the liquefier, in turn, can raise and/or maintain the pre-heated filament 200 at or above a designated or desired melt temperature, the latter generally being an optimal temperature for high-throughput extrusion and three-dimensional printing by way of additive manufacturing.

The filament 200 may be made up of one or more materials, at least one of which can be melted or softened. For example, as described herein, the filament 200 can be made up of thermoplastics. Other materials of the filament 200 may be materials that are solid such as glass, metal, or other compositions of matter that do not melt or soften by the heating provided by components like the pre-heater 142 and/or liquefier 144 provided for herein. In some embodiments, the filament 200 is made up of a thermoplastic infused with carbon nanotubes, carbon nanofibers, or metal nanowires. Doing so enables the filament and objects produced therewith to have improved strength, weight, and thermal and/or electrical conductivity. That is, by providing a filament 200 infused with a highly conductive material such as carbon nanotubes, heating of the filament 200 to a desired temperature using a radiative liquefier, joule heater, or other electrically-assisted heater can be more efficiently and effectively achieved. Accordingly, in some instances the filament 200 can be made of at least two materials, with one material being more conductive than the other (i.e., one material has higher conductivity properties than the other). As a result, as the filament 200 is heated, the first material, having lower conductivity properties than the second material, can melt when it is heated to a desired melt temperature while the second material can remain less viscous than the first material when at that desired melt temperature. In such embodiments, the filament can remain flowable as it is extruded out of the device, e.g., through the nozzle, behaving in the nature of a thermoplastic.

In other embodiments, the filament may comprise a thermoplastic, along with a second material having at least one characteristic dimension in the range of 1-100 micrometers, and a third material having at least one characteristic dimension in the range of 0.1-100 nanometers. For example, the second material may be fibers with diameter in the 1-100 micrometer range, such as graphite fibers or glass fibers or synthetic fibers such as Kevlar®. The third material may be a nanostructure such as single or few-layered graphene sheets, molybdenum disulfide, boron nitride or another atomically layered material; or may be a filamentary nanostructure such as a carbon nanotube or a boron nitride nanotube. The second material may comprise 1-10 wt % of the composite filament, or as much as 50% or more of the filament. The third material may comprise 0.1-1%, or as much as 10% or more. In one further embodiment, a composite of thermoplastic, such as ABS, ULTEM™, or PPSF is provided with carbon fibers at loading of at least 10%, and carbon nanotubes of loading of at least 0.1%. This is used in an extrusion additive manufacturing process in accordance with the present invention, where volumetric pre-heating is performed by passing an electrical current through the filament.

It should be understood that, in some embodiments, like the one illustrated, the pre-heater 142 and the liquefier 144 may be provided as a single heating unit, i.e., the heater 140, while in some other embodiments they may be separate units that are in fluid communication with each other, and in turn the extruder 110. As described herein, the pre-heater 142 may alternately be referred to as a first chamber or a pre-heater unit, section, mechanism, and/or system, and the liquefier 144 may alternately be referred to as a second chamber and/or a liquefier unit, section, mechanism, and/or system.

In the illustrated embodiment, the heater 140 is in fluid communication with the extruder 110. In some embodiments, the heater 140 can be implemented as a module or part of an extruder, and in other embodiments it can be a separate unit that is nevertheless in fluid communication with an extruder. It should be understood that the heater 140 may be assembled on or connected to, for example, the frame 180 of the printer 100, separate from the nut feed extruder 110. In such embodiments, the extruder 110 and the heater 140 can connected via a tube 150 or the like through which the filament 200 is fed and/or advanced from the extruder 110 to and/or through the heater 140.

Pre-Heater

In some embodiments, it may be desirable to volumetrically heat a moving filament during an extrusion process, though it should be understood that surface heating may also be used to heat a filament. Surface heating may include heating the surface of the filament such that heat reaches the interior of the filament by first being absorbed or conducted into its surface or exterior, and then conducting from this region to the interior of the filament. Volumetric heating, in some examples, may heat the body or volume of a sample or filament material to a substantially uniform target temperature. In other examples, volumetric heating includes transferring heat to the filament material such that molecules throughout the cross-section of the filament directly receive thermal energy due to coupling from the heat source. Volumetric heating, in other embodiments, may include heating the filament to a depth or volume less than its entire depth or volume. In one example embodiment, an infrared (IR; having a wavelength approximately in the range of about 0.7 micrometers to about 10.6 micrometers) pre-heater is used to heat a moving filament. IR heating transfers energy to the molecules of the material of the filament which, when absorbed, can cause heat generation from molecular oscillations which can then be conducted to adjacent molecules. For example, IR heating may include providing electromagnetic energy via a laser whose beam is incident upon the surface of the filament, or concentrically around the filament. In other exemplary embodiments, a pre-heater may heat a moving filament by passing an electric current through the filament, for instance when the filament is conductive. In some embodiments, the filament is conductive when its material (or materials) permits or enables the passage of an electrical current therethrough. Some non-limiting examples of such materials include metals, polymers with a conductive additive that forms a percolation network, or polymers with an intrinsic electrical conductance. In some exemplary embodiments, the conductivity of materials of a conductive filament may range from approximately 0.001 siemens per meter (S/m) to 1000 S/m. In some exemplary embodiments, the conductivity of materials may be at least 1 S/m. It should be understood that because the conductivity of materials can change, for example, based on temperature fluctuations, the electrical current needed to dissipate a desired amount of electrical power by resistive heating may vary based on the temperature of the material. The electric current may be passed to the filament by contacting the filament at two points while it is fed along its axis. The current may be controlled to maintain the desired temperature at one or more locations along the filament, or at the portion of the filament disposed at the output portion of the nozzle. While the conductivity of the filament can vary based on a variety of factors, in some exemplary embodiments a conductive filament that is configured to be heated with electrical current can have a volume resistivity that is at least about 0.6 ohm-cm. It should be understood that, as described herein in more detail, other types of heaters or heating mechanism may be used to heat a filament.

As discussed above, in some embodiments the pre-heater 142 can be used to heat or pre-heat the filament 200 to or above a pre-heat temperature. The pre-heated filament 200 is in turn advanced to the liquefier 144, which raises and/or maintains the temperature of the filament to or above a melt temperature prior to extruding the filament, for example, passing the filament from the liquefier through the nozzle 146. The pre-heat temperature is a target and/or optimal temperature for advancing the filament 200 to the liquefier 144 without being damaged (e.g., broken), and for enabling the liquefier 144 to effectively and efficiently melt the filament 200 for extrusion. The melt temperature of the filament 200 is a desired temperature that can be optimal for extrusion (e.g., through the nozzle 146) and three-dimensional printing by additive manufacturing. The temperature can depend on a variety of factors, including but not limited to the component through which the extrusions occurs, e.g., the nozzle 146, the desired size of the object being printed, and the desired cure time for the filament 200 once it is extruded onto the build platform 190.

Figure 4A:
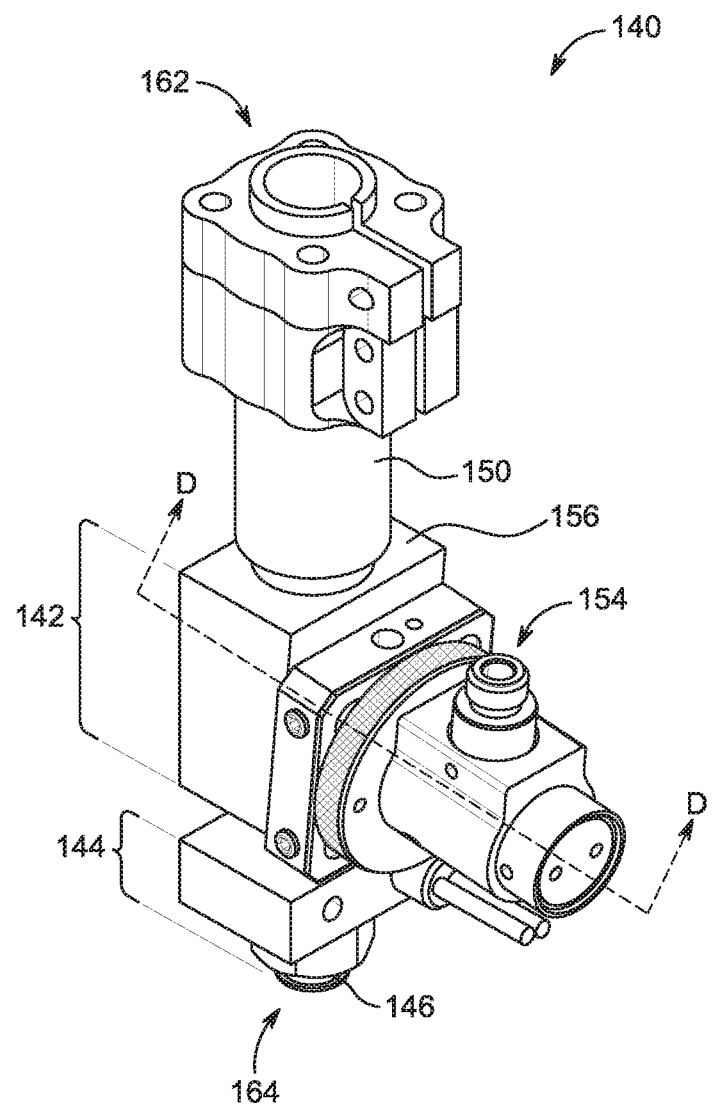
FIG. 4A is a perspective view of a heater of the printing device of FIG. 1A.
Figure 4B:
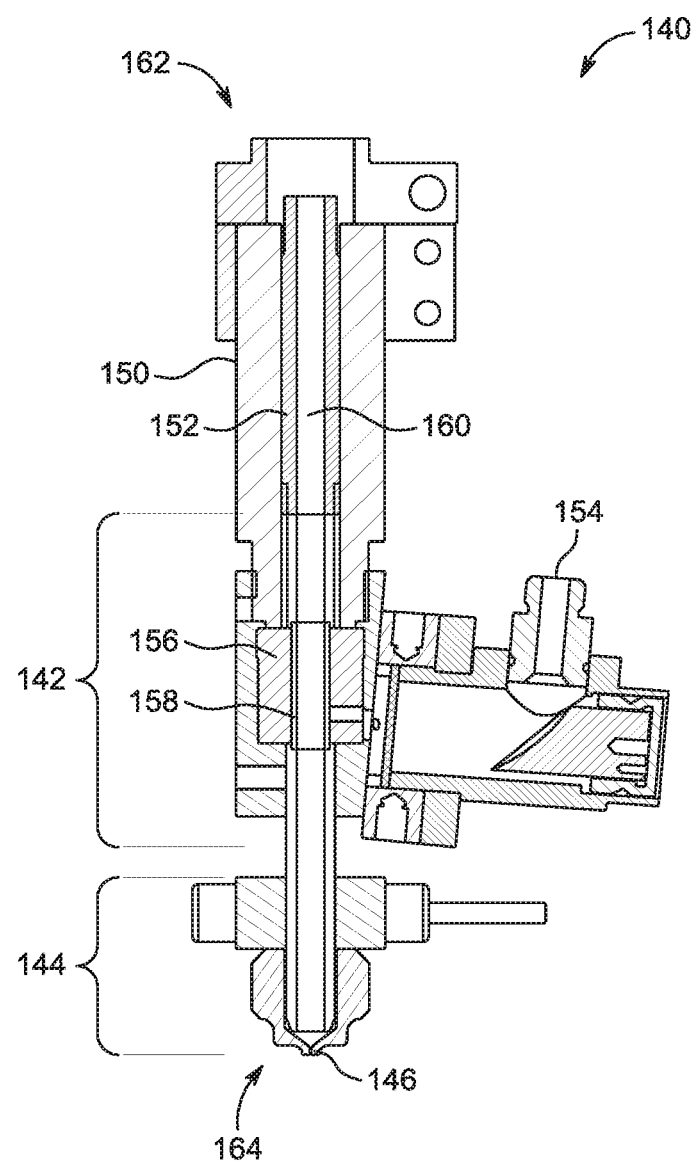
FIG. 4B is a front view of the cross-sectional view of the heater of FIG. 4A, along the line D-D.
Figure 4C:
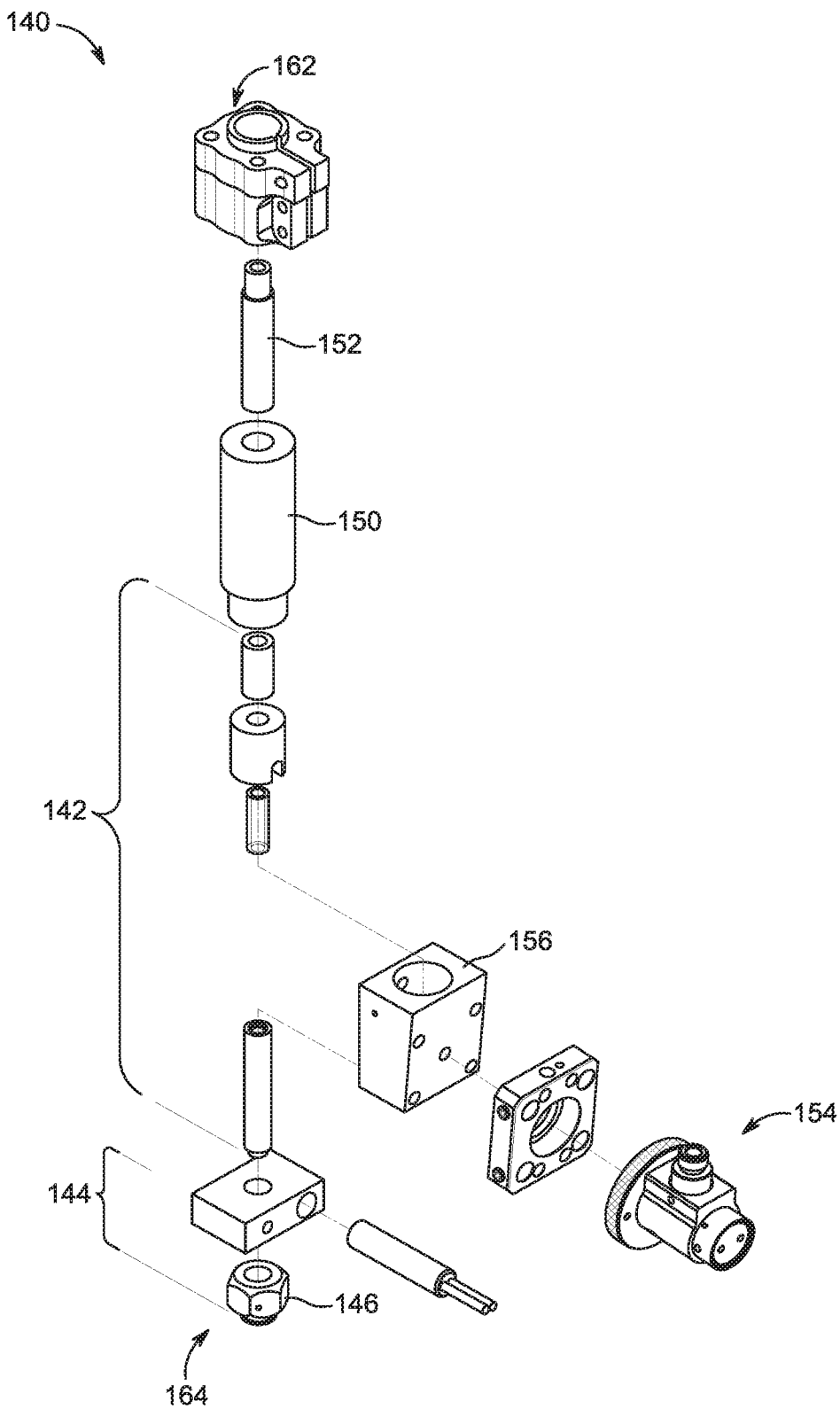
FIG. 4C is an exploded view of the heater of FIG. 4A.

As shown in FIG. 4B, the IR pre-heater 142 can be located or positioned after (e.g., relative to an extrusion process) the extruder mechanics (e.g., extruder input, filament feed section, feed nut, or the like) but before the conduction liquefier 144 and/or nozzle 146 that is disposed at the distal end of the liquefier 144. That is, during an extrusion process, a filament 200 is fed and/or advanced to the pre-heater 142 after it is fed to the feed nut 112 of the extruder 110, and, in turn, the filament 200 is fed and/or advanced to the liquefier 144. The pre-heater 142 can include a threaded polyether ether keytone (PEEK) plastic cylinder tube 150, a guide tube 152, a radiation source 154, a reflection chamber (e.g., IR reflector) 156, a transparent flow channel 158, and an opaque housing 160. In some example embodiments, the radiation source may be a light amplification by stimulated emission of radiation (LASER) diode, to target and emit particular wavelengths of radiation (e.g., 800 nanometers), In some example embodiments in which the pre-heater 142 is used in conjunction with a liquefier (e.g., the conduction liquefier 144), the pre-heater 142 can uniformly heat, or pre-heat, the filament 200 such that less time and heat is required from the liquefier 144 for the filament 200 to reach the target and/or desired melt temperature of the filament 200. Heating or pre-heating the filament 200 prior to entering the liquefier 144 enables faster extrusion while minimizing loss of output filament temperature.

The PEEK tube 150 of the pre-heater 142 is connected to and/or in fluid communication with the extruder 110, through which the filament 200 is initially fed into the extrusion process. Inside the PEEK tube can be the guide tube 152 (e.g., Teflon guide tube), positioned at a proximal end of the pre-heater 142. The guide tube 152 can further guide the filament 200 into the flow channel 158, where pre-heating of the filament is performed. A radiation source 154 can provide radiation (e.g., infrared wavelengths) to the filament 200 as described below.

That is, in some embodiments, the pre-heater 142 may use or include the radiation source 154, such as a DILAS Mini diode laser (e.g., 50 Watts maximum power, 800 nanometer wavelength) to heat the filament 200 located in the flow channel 158. The laser radiation may be delivered using a high-power optical fiber. A reflective collimator (e.g., Thorlabs RC02SMA-PO 1) may be used to narrow the beam and reflect it at a right angle such that laser radiation can enter the flow channel 158 from the side while preventing excessively sharp bending of the optical fiber. Inside the pre-heater 142, a flow chamber made of fused quartz may be used to facilitate IR radiation to pass through to heat the material while keeping the softened plastic in flow. The ends of the flow channel 158 may be sealed using Teflon washers under compression, among other techniques known to those skilled in the art in view of the present disclosures. Surrounding the flow channel 158 may be the IR reflector 156, which can optionally be made from MACOR, a ceramic with high-temperature resistance and high reflectivity in the near IR region. These components, in some embodiments, can be fully enclosed by an opaque (e.g., machined aluminum) housing 160, which may also serve as the interface between the frame 180 and the conduction liquefier section 144.

Figure 4D:
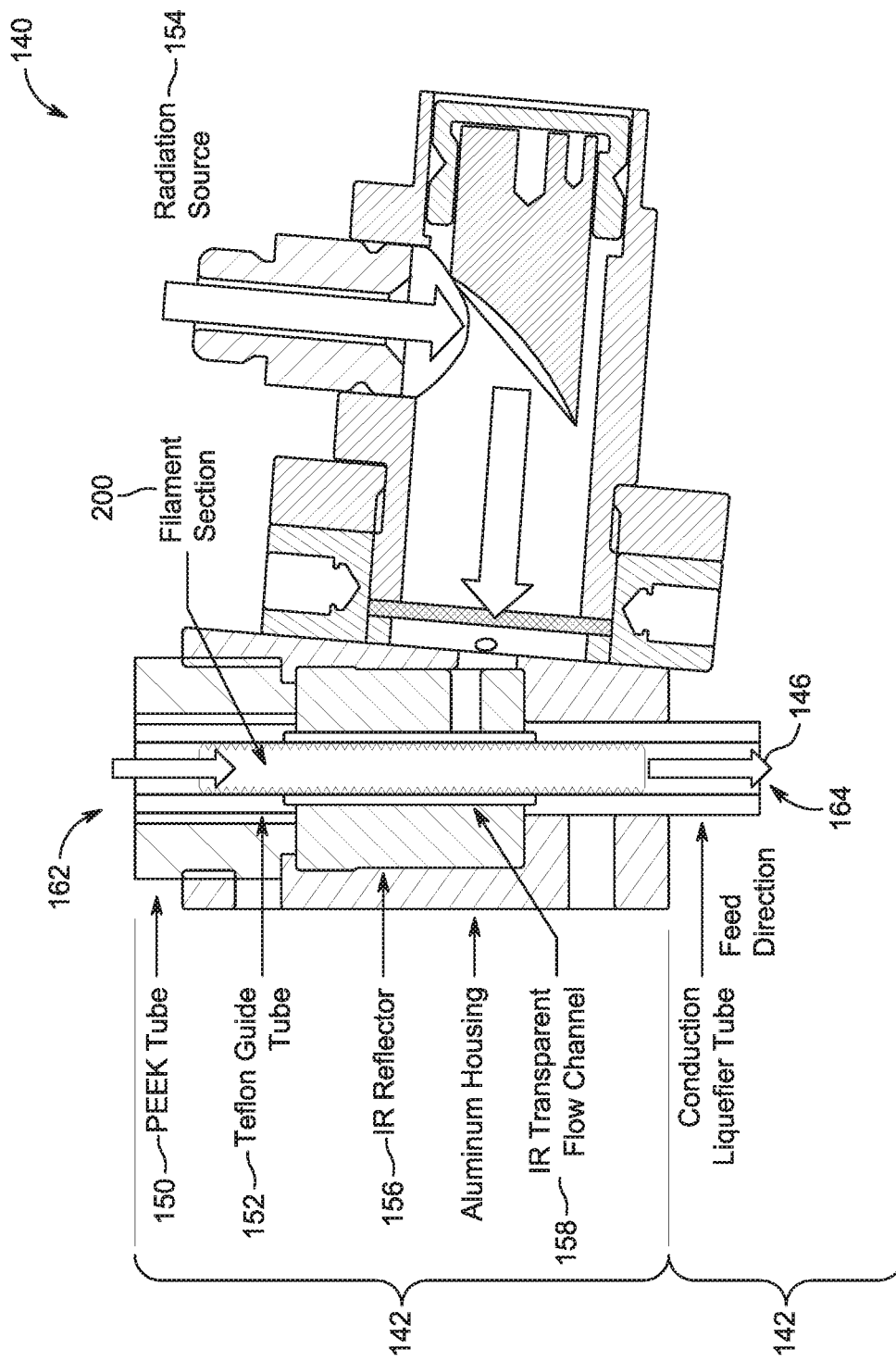
FIG. 4D is a detailed, cross-sectional view of a pre-heater of the heater of FIG. 4A taken along line D-D.

As shown in FIG. 4D, the filament 200 can be fed and/or advanced through the pre-heater 142 in the feed direction. As the filament 200 passes through the pre-heater 142, the radiation source 154 provides radiation to the filament 200 to volumetrically heat it to a target pre-heat temperature.

Figure 5A:
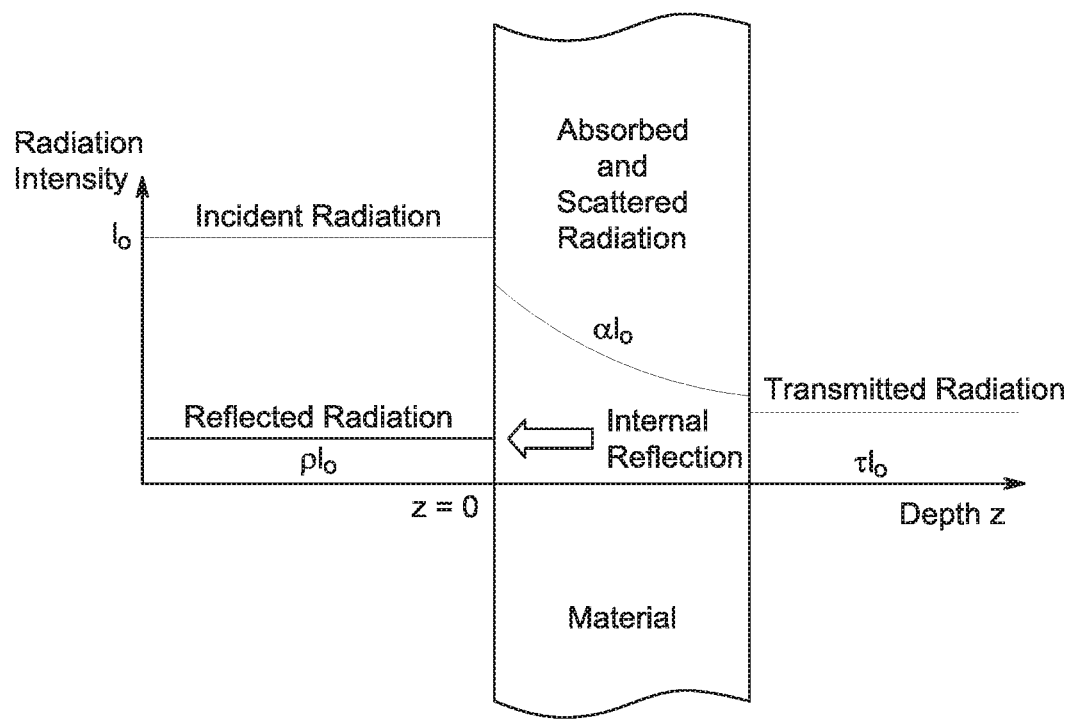
FIG. 5A is a diagram illustrating the reflection, absorption and transmission of radiation to a filament, according to an exemplary embodiment.

In some embodiments, it may be desirable to provide the pre-heater 142 with optimal target transmissivity to achieve uniform volumetric heating of the filament 200. Generally, radiation that interacts with a material of a filament is either absorbed, reflected, or transmitted, as shown in FIG. 5A. The fractions of incident power distributed to each phenomenon (e.g., absorption, reflection, and transmission) are described by the following coefficients: absorptivity (a). reflectivity (p), and transmissivity (r), The values of each coefficient are dependent, at least in part, on intrinsic properties of the material of the filament and properties of the radiation source (e.g., laser diode).

For example, reflectivity can be highly influenced by surface conditions. Smooth, bright-colored surfaces generally reflect IR radiation while matte, dark-colored surfaces generally absorb IR radiation. Radiation that is not reflected is instead absorbed or scattered within the material, and/or transmitted beyond the material. Absorption is dependent on the properties of the material, and is described in further detail below. If the radiation is not fully absorbed or reflected, the remaining fraction is transmitted through the material, Reflected and transmitted power is typically considered a loss because only absorbed power can be used for heating, such as heating of the filament material. The distribution of radiation absorbed into a material is described by the Beer-Lambert law which states that intensity of radiation decays exponentially with increasing depth into the material, as set-out in Equation 5:

$$I(z) = I_0 e^{\frac{z}{a}} \quad (5)$$

Figure 5B:
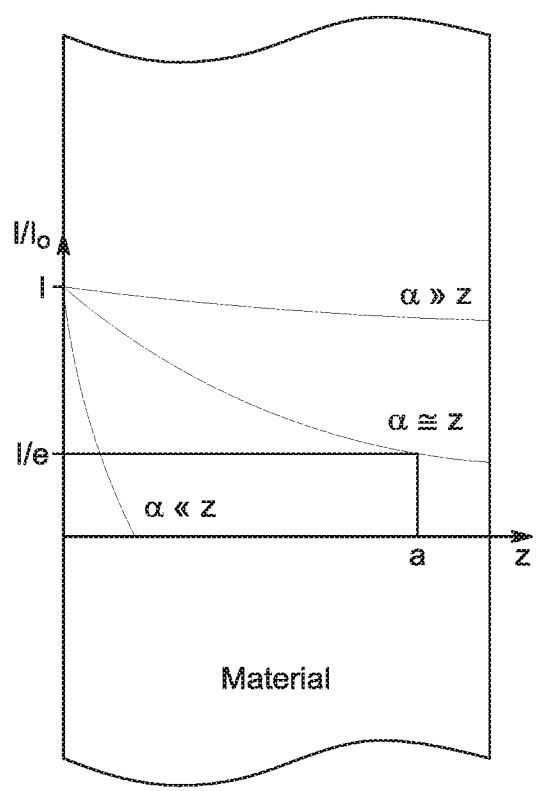
FIG. 5B is a diagram illustrating the effect of different values of optical penetration depth, according to an exemplary embodiment.

In Equation 5, an exemplary one dimensional case is described where a surface radiation intensity ($I_0$) is attenuated by the optical penetration depth (a) with increasing depth into the filament material (z). In some embodiments, the optical penetration depth is the depth at which the radiation intensity is approximately 37% of the incident radiation intensity. Thus, in some embodiments, it can be desirable to control the optical penetration depth of the heater 140, or a portion thereof, such as the IR pre-heater 142. This is illustrated in FIG. 5B, which shows the effect of different values of optical penetration depth on the material of a filament. A small optical penetration depth indicates that radiation intensity is more significant at a shallow depth while a large optical penetration depth means intensity is distributed across the thickness of the material. If the optical penetration depth is larger than the total thickness of the material, radiation intensity may be distributed across the entire thickness and at a fraction of the radiation intensity may be transmitted through the material. It is therefore desirable, in some embodiments, to verify that radiation is transmitted through the material, yet reflected within the housing such that it can be further absorbed, as shown in FIG. 5B.

Figure 5C:
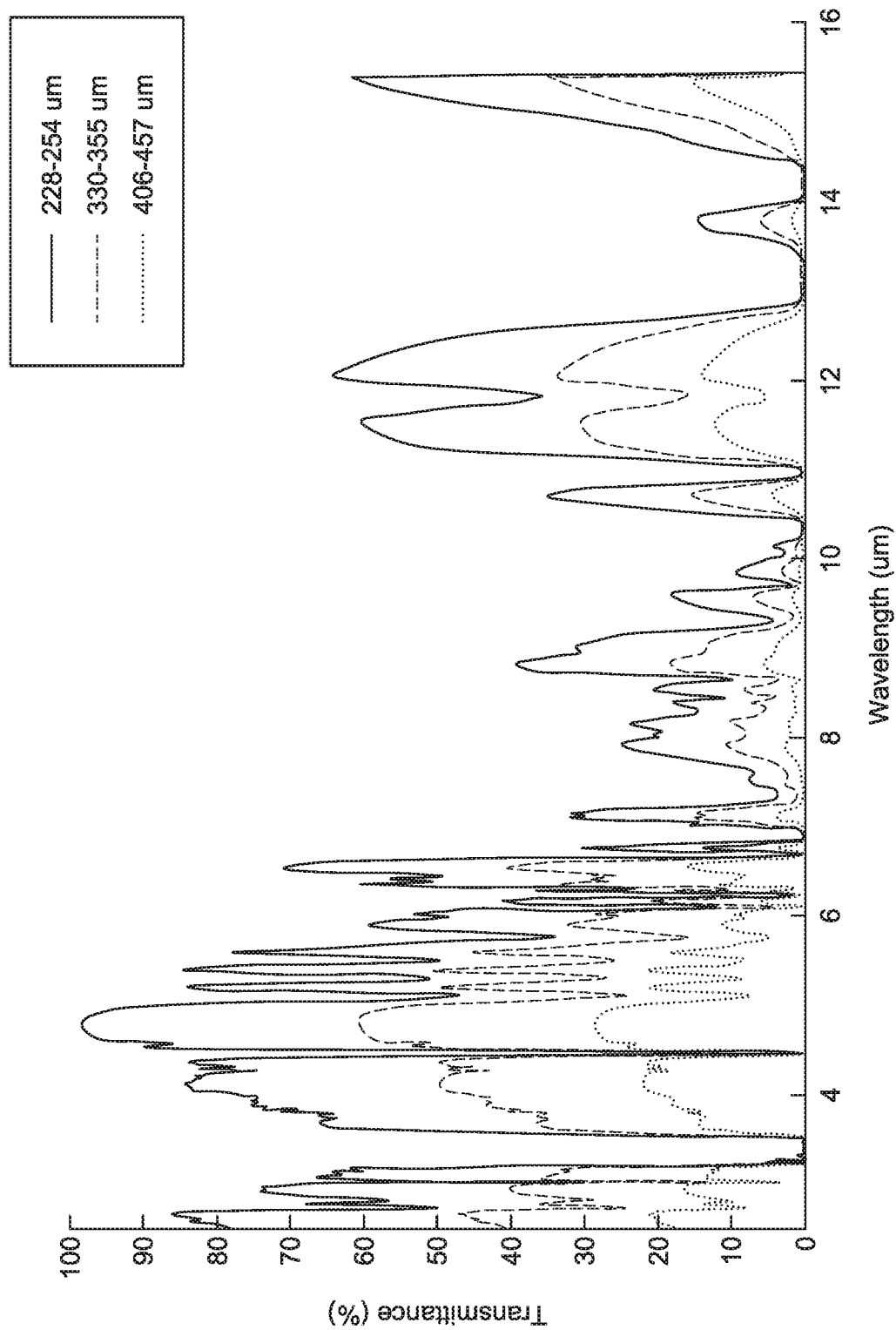
FIG. 5C is a chart illustrating the transmission spectrum of ABS plastic at various thicknesses, according to an exemplary embodiment.

The optical penetration depth differs among materials of the filament and can vary with temperature and radiation wavelength. Optical penetration depth may be calculated, or measured, using spectral photometers and the like, such as Fourier transform infrared (FTIR) spectroscopy, which can determine absorption, transmission, and reflection of a material as a function of wavelength. Examples of a transmission spectrum of ABS plastic at various thicknesses measured using FTIR is shown in FIG. 5C.

Figure 5D:
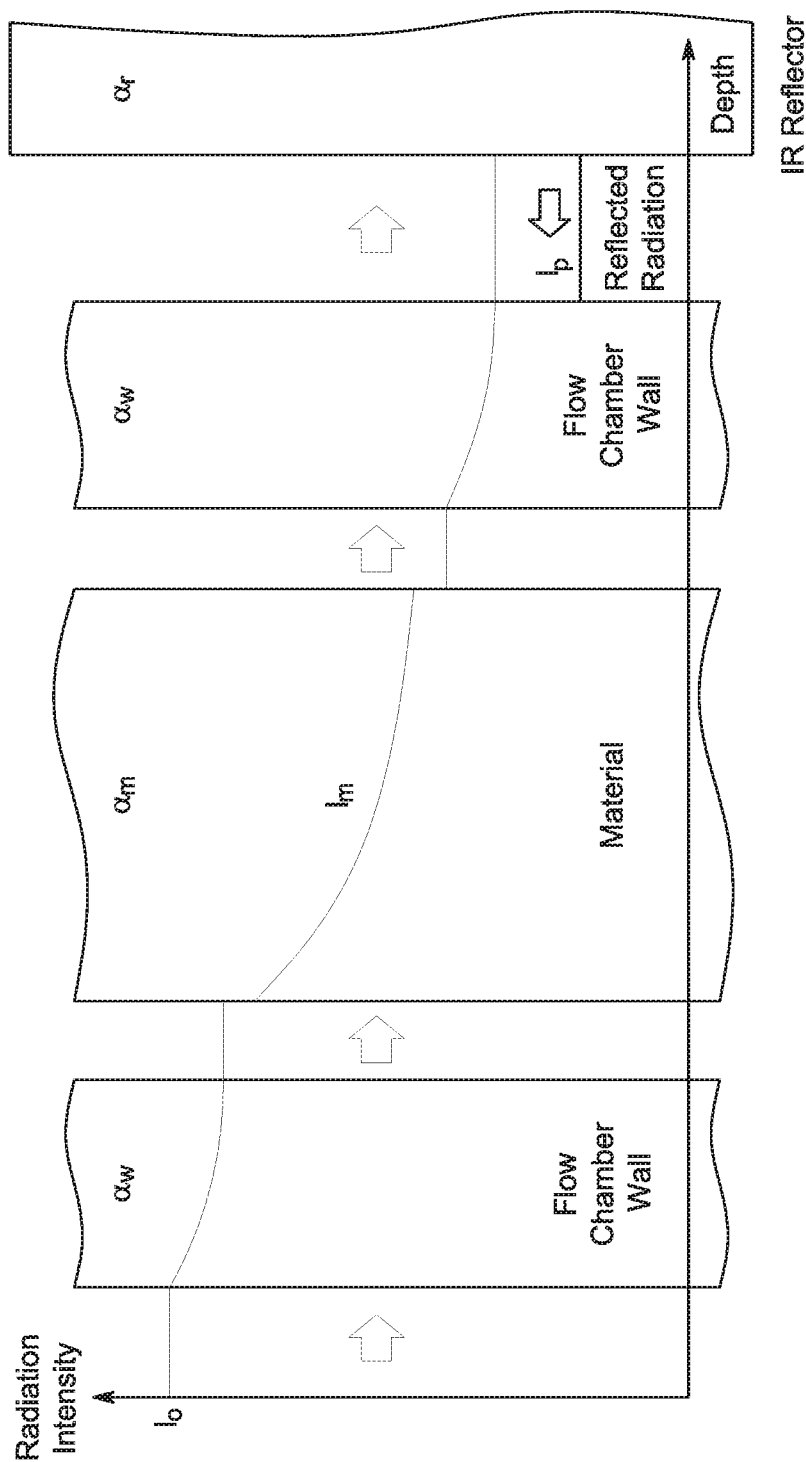
FIG. 5D is a diagram illustrating radiative losses in a first pass of laser radiation, according to an exemplary embodiment.

The transmission spectrum can be used to determine the optical penetration depth at a given wavelength and material thickness, which in turn can be used to select a laser for use in the IR pre-heater 142. In the IR pre-heater according to some example embodiments, radiation intensity does not fall or decrease immediately incident on the filament surface, but instead is first attenuated by auxiliary structures in the IR-pre heater (e.g., flow chamber wall), as shown in FIG. 5D. In some embodiments, the flow chamber wall through which the beam first passes can be transmissive or highly transmissive, at least in a region where the laser enters. More particularly, FIG. 5D illustrates exemplary radiative losses in a first pass of laser radiation through the IR pre-heater 142.

The IR transparent flow channel 158 may constrain the softened filament while allowing the radiation source to provide heat. In one embodiment, the flow channel is fully transparent to the radiation source at its emission wavelength, though losses may occur. That is, in some embodiments, the radiation source can pass through the filament and two layers of flow channel before contacting the reflector surface. Further, in some embodiments, the penetration depth of each material can be larger than its respective thicknesses and each material can have homogenous properties throughout its volume. Input intensity can pass through the flow channel wall of thickness and penetration depth, which can leave transmitted power to be absorbed by the filament which has a corresponding thickness and penetration depth. Power transmitted through the filament can, in turn, be attenuated by the opposing wall of the flow channel to net a radiation intensity before contacting the reflector surface.

In some example embodiments, if the incident radiation intensity and material properties are known, the internal temperature profile within the filament can be determined.

After radiation makes its first pass though the material and flow channel 158, it contacts a reflector 156 which returns the radiation back towards the sample where it is attenuated by the channel walls and absorbed into the material. Laser pump chambers may use polished gold or less expensive glazed ceramics, which have a reflectivity of approximately 95% and upwards, as IR reflectors 156. This cycle can continue until the radiation intensity is fully dispersed. Because the time scale of radiation transmission and absorption can be relatively fast (e.g., in a matter of picoseconds), the absorption of radiation can be assumed to be instantaneous or nearly instantaneous with respect to thermal time constants, thereby enabling the following Equations 6 and 7 to represent the total fraction of source intensity absorbed by the filament without time dependency:

$$I_p = I[1 - (1 - \alpha_w)^2(1 - \alpha_m)(1 - a_r)] \quad (6)$$

$$I_m = I_0 \left[ \frac{(\alpha_m(1 - \alpha_w))}{1 - (1 - \alpha_w)^2(1 - \alpha_m)(1 - \alpha_r)} \right] \quad (7)$$

In Equations 6 and 7, the reflector chamber 156 absorptivity is represented as $\alpha_r$, the intensity of the radiation emission source is represented by $I_0$, the total intensity absorbed per pass is represented by $I_p$, and the total intensity absorbed by the filament is represented by $I_m$. The walls of the IR flow channel 158 and the material, in one example embodiment, lose no radiation due to reflection ($\alpha_w$, $\alpha_m$=0) and the IR reflector 156 transmits no radiation ($\alpha_r$=0). To improve the efficiency of the IR pre-heater 142, the flow chamber walls can be configured to minimize radiation intensity absorptivity and the reflector 156 can be configured to maximize intensity reflection in the wavelength of the emission source.

In some embodiments, the absorption characteristics of thermoplastic materials may be altered by material additives. For instance, transmissivity is generally highest for natural polymer blends, and additives serve to increase surface absorptivity or internal scattering by introducing local absorbing or reflecting agents within the material. Examples of polymer resin additives include pigments, fibers, and inorganic particulates. Many dyes for coloration do not affect absorption significantly, unless the pigment is derived from carbon black, because carbon black particles have high absorption across all wavelengths of IR and can reduce penetration depth to about 100 microns in most plastics with just about 0.1% pigment. Inorganic fillers like reinforcing fibers, metal-based pigments, and glass spheres, in some embodiments, scatter IR radiation within the material of the filament and lower transmission ratios. In some embodiments, scattered IR radiation and lower transmission ratios may be less desirable for the IR pre-heater 142.

Figure 5E:
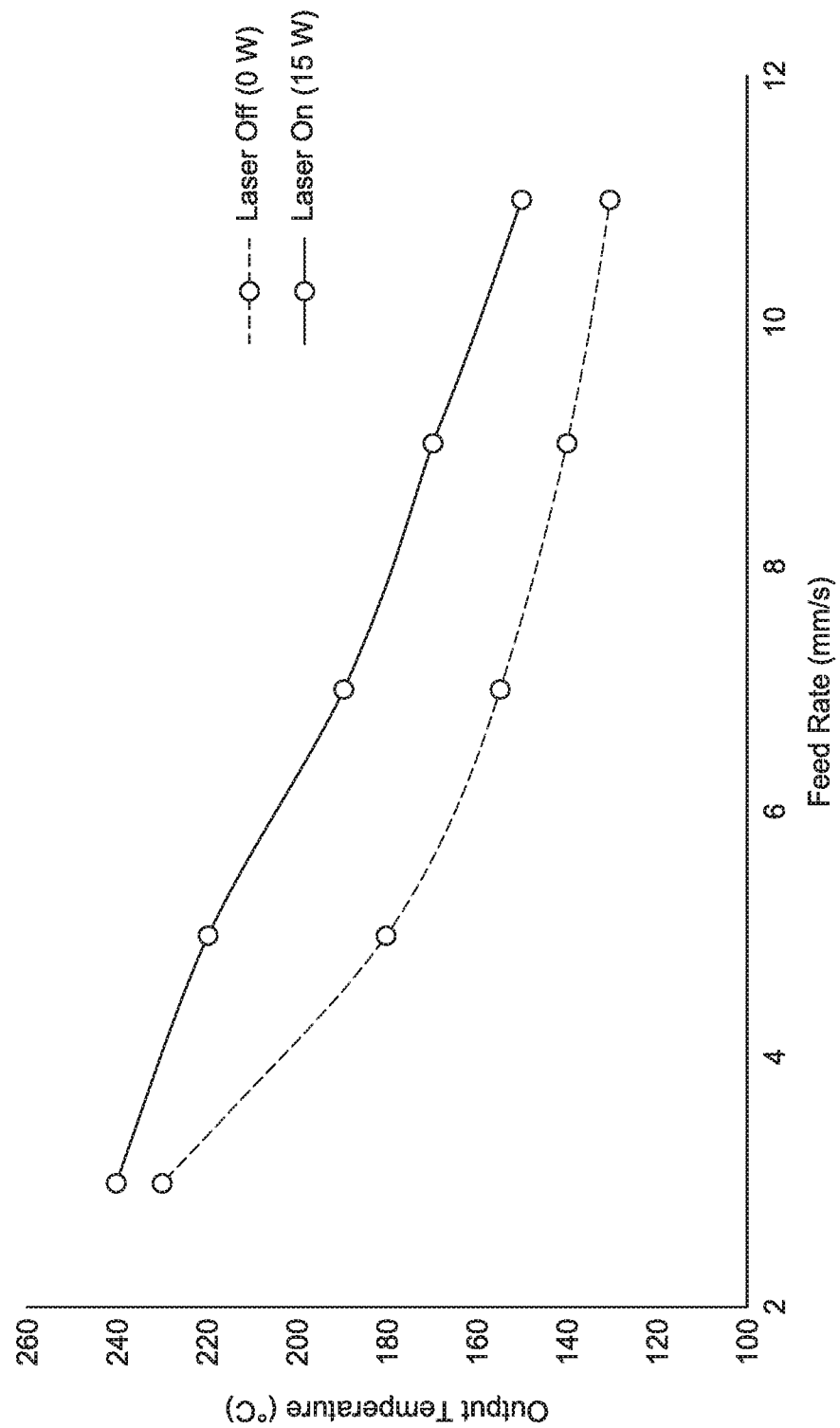
FIG. 5E is a chart illustrating a temperature plot showing the effect of infrared heating on a filament, according to an exemplary embodiment.

The IR pre-heater 142 is provided for generating increased throughput by outputting extrudate filament at elevated temperatures and at higher feed rates. In such embodiments, the IR pre-heater 142, the conduction liquefier 144, and a nut feed extruder 110 can be provided. IR radiation is delivered to the IR pre-heater 142 using a high-power fiber coupled to an 800 nanometer, 50 Watt max diode laser (e.g., DILAS Mini) located out of view. Control electronics for the conduction heater and extruder are also out of view in FIGS. 4A-4D. In one exemplary embodiment, 15 Watts of laser power is used to heat the filament 200 over a collimated area of 7.06 millimeters$^2$ projected on the filament 200 having an average diameter of 2.2 millimeters. FIG. 5E is a temperature plot illustrating the use of an IR pre-heater (e.g., "Laser On") compared with a process of not using an IR pre-heater (e.g., "Laser Off").

As shown in FIG. 5E, the output temperature of the filament can be greater at various feed rates when the IR source is used. In some example embodiments, if the filament is colder than the liquefier upon entry, the performance of the conduction liquefier determines if the filament reaches the target temperature. If the filament is warmer than the liquefier upon entry, the filament temperature drops while flowing through the liquefier. Thus, in some embodiments, it may be desirable to achieve an ultimate feed rate at which the IR heater can heat the filament to the target temperature plus a margin (e.g., without exceeding the degradation temperature), thereby allowing the filament to remain at the target output temperature after flowing into and through a liquefier and nozzle.

Figure 6A:
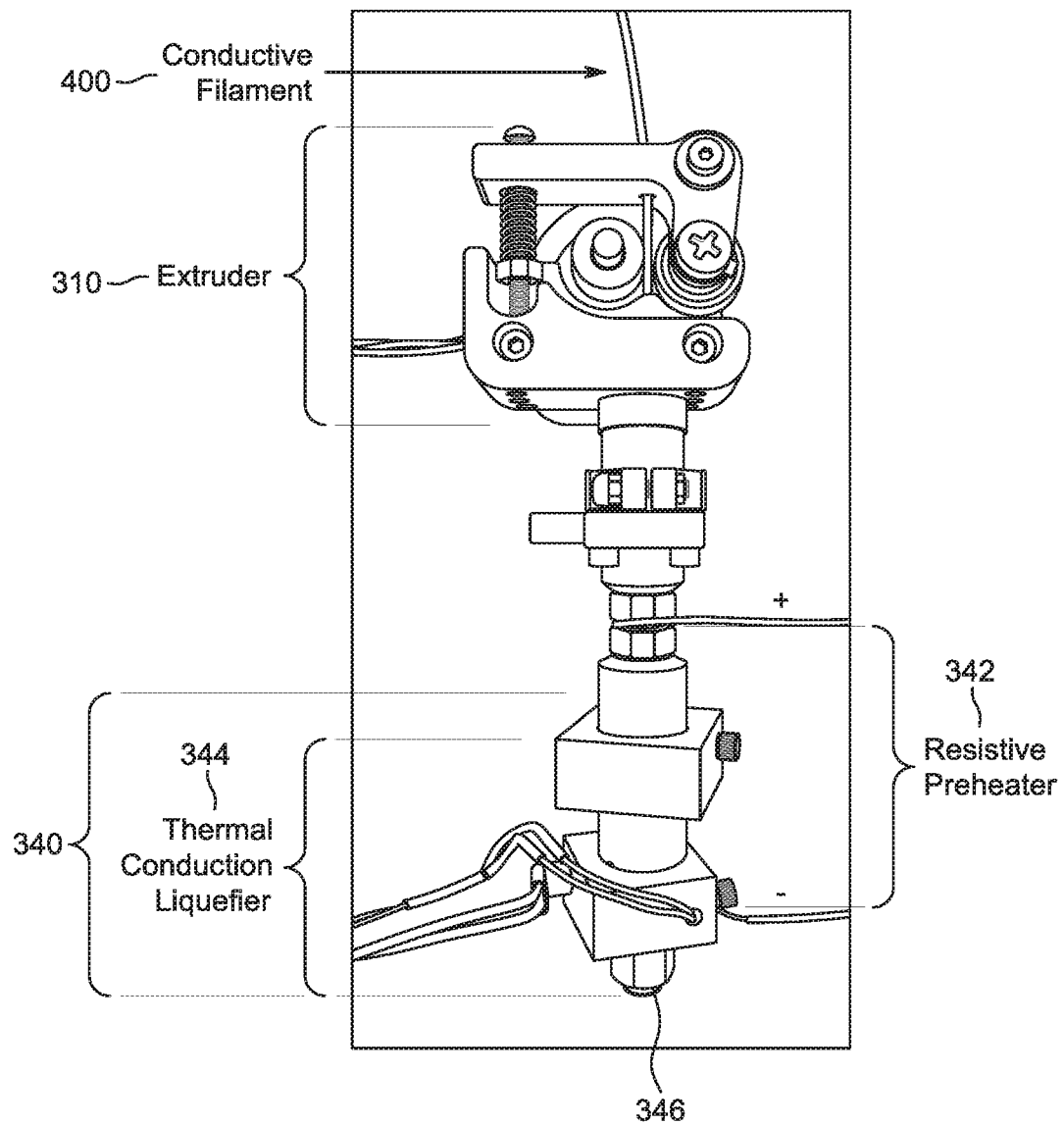
FIG. 6A is a perspective view of another exemplary embodiment of a printing device.
Figure 6B:
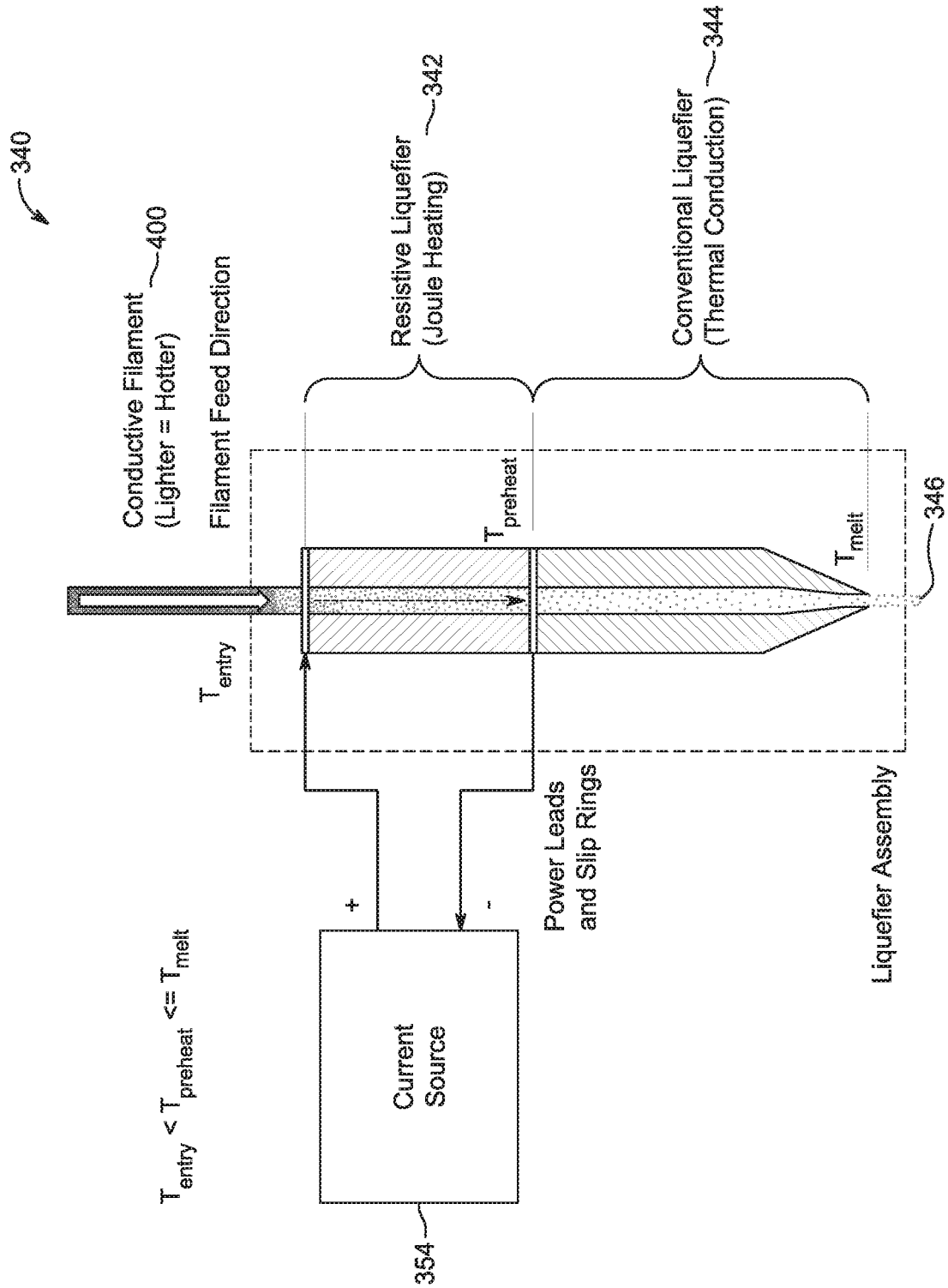
FIG. 6B is a schematic view of a printing process associated with the using the printing device of FIG. 6A.

FIGS. 6A and 6B also illustrate a heater 340. As shown in FIG. 6A, the printing device 300 can include an extruder 310 that is in fluid communication with a heater 340, with the heater including a resistive pre-heater (or pre-heater portion) 342 and a thermal conduction liquefies 344. Similar to previously discussed embodiments, a conductive filament 400 can be advanced from the extruder 310, towards the heater 340, for eventual deposition onto a build platform (not shown). As shown, the heater 340 includes a resistive liquefier or joule heater 342 for heating or pre-heating a filament from a starting temperature (e.g., $T_{entry}$) to or above a pre-heat temperature (e.g., $T_{preheat}$) during an extrusion process, and a conventional liquefier 344 for heating or maintaining the temperature of the pre-heater at or above the desired melt temperature (e.g., $T_{melt}$). It should be understood that other electrically-assisted heating techniques may be used for volumetric heating, and/or surface heating, without departing from the spirit of the present disclosure.

During the resistive heating process by the heater 340, volumetric heating is provided by heating a filament's volume via passing current through its body, which is then dissipated throughout as heat, That is, a current source 354 of or connected to the heater 340 via + and − wires, and more particularly is connected to the filament 400 using slip rings to ensure proper contact. The filament 400, having advanced from a feed area of an extruder, is fed into the resisting liquefier portion 344 at or above a pre-heat temperature $T_{entry}$. In turn, current may be supplied through a separate or interconnected power supply or current source 354, whose output in some embodiments is coupled with the feed rate of the filament 400 such that a higher feed rate results in increased current. As a result, the temperature of the filament 400 is heated and, in turn, is fed to the conventional liquefier 344, where its temperature is raised to or maintained at or above the optical target melt temperature $T_{melt}$. As shown in FIG. 6B, the temperature of the filament 400 throughout an extrusion and heating process can be described as set-out in Equation 8:

$$T_{entry} > T_{preheat} <= T_{melt} \tag{8}$$

In some embodiments, electrically-assisted heating such as that illustrated in FIG. 6B can be used to process (e.g., heat) filament materials that are IR-opaque graphene) or carbon nanotube (CNT)-filled polymers, for example, and to print materials that may combine a nano-filler (e.g., CNT), a micro-filler (e.g., chopped fiber), and a thermoplastic.

While the desired, desired temperatures for the pre-heat temperature $T_{preheat}$ and the melt temperature $T_{melt}$ can depend on a variety of factors described herein or otherwise derivable by those having skill in the art, in some exemplary embodiments the pre-heat temperature can be approximately in the range of about 80° Celsius to about 400° Celsius and the melt temperature can be approximately in the range of about 150° Celsius to about 400° Celsius. In one non-limiting exemplary embodiment, the pre-heat temperature is about 120° Celsius, and the melt temperature is about 260° Celsius.

In some embodiments, the predetermined pre-heat temperature and melt temperature may be adjusted based on received parameters of the system. The parameters may be received in real-time during the pre-heating and/or melting stages. The parameters may include the extrusion force applied by the extruder on the filament advanced by the extruder, the feed rate of the extruder, the temperature of the filament prior to the filament entering the pre-heater, and/or the temperature of the filament prior to the filament existing the liquefier towards a build platform. In some embodiments, the parameters are measurements made and/or obtained by the printing device. For instance, the measurements may be obtained prior to, upon, or as the material exits from the nozzle, or at the part surface.

As described above, in some embodiments, a controller can be used to manage a number of functions, including but not limited to using pre-set parameters and/or using real-time data received from the system. The controller, or another component of the system, can be configured to adjust an amount of power being supplied to components of the system (e.g., the pre-heater and/or the liquefier), and/or an amount of force or torque applied to the nut feed extruder, to achieve desired results. For example, the power and/or force can be adjusted to maintain a constant feed rate, to maintain a constant force being applied to the filament, and/or to match a command signal provided by a controller.

Figure 6C:
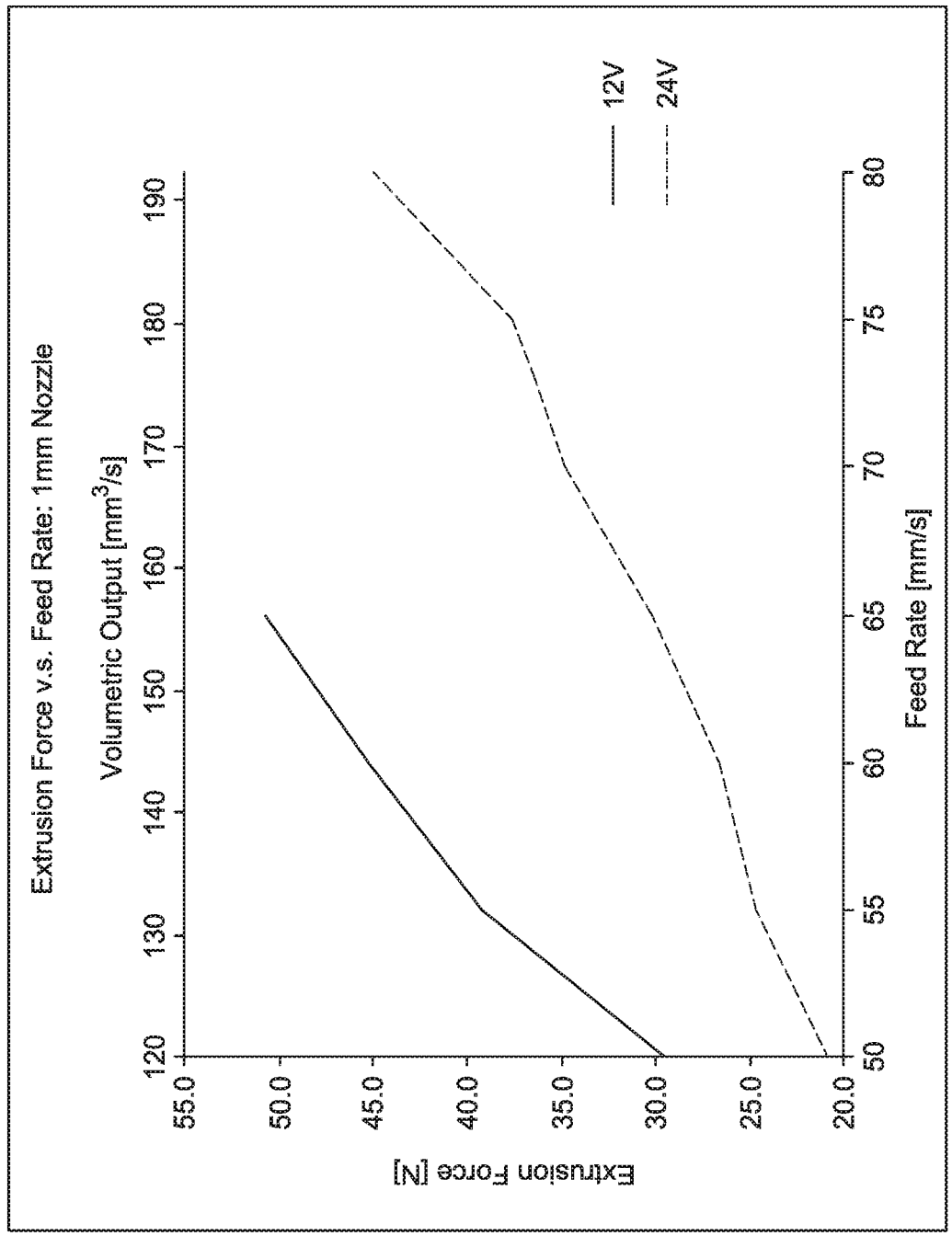
FIG. 6C is a chart illustrating the relationship between extrusion force and feed rate for the printing device of FIG. 6A.

FIG. 6C is a chart illustrating the relationship between extrusion force and feed rate, according to an exemplary embodiment like that of FIGS. 6A and 6B, and other configurations and embodiments provided for herein. As shown in FIG. 6C, increasing voltage decreases extrusion force for given feed rates, and higher voltages allow for greater feed rates to be achieved. In other words, the embodiments herein demonstrate how it is possible to increase volumetric output of an extrusion device.

Liquefier

As described above and illustrated with respect to FIGS. 4A-4D, 6A, and 6B, the heater 140, 340 (the heater 140 is used for the remainder of this description for simplicity) may include a liquefier 144 such as a conduction liquefier. The liquefier 144 may sometimes be a surface conduction heater. As described above, the liquefier 144 is connected to and/or attached to the pre-heater 142, distal to the extruder 110. The liquefier 144 can include a receiving portion 162 into which the filament 200, after being pre-heated, is fed, and an output portion 164, such as the nozzle 146 or the like, via which lncited filament 200 is extruded.

The liquefier 144 can heat the moving filament 200 from a temperature; below its melt temperature to a set-point or desired temperature that may be equal to the melt temperature defined for the material of the filament 200. The melt temperature may be defined by a temperature range, in which case the liquefier can be controlled to raise the temperature of the filament 200 to a temperature within the melt temperature range. Ranges of melt temperatures may be used when working with thermoplastic filaments. In additive manufacturing systems, the liquefier 144 may heat the filament 200 by conduction, and the filament 200 can move through a cylindrical cavity that is heated such that it transfers heat to the moving filament 200 upon mechanical contact. The nozzle 146, which can be attached to and/or in fluid communication with the liquefier 144, may be heated directly or by proximity to the heated liquefier such that the cross-sectional area of the heated filament 200 is reduced, allowing the filament 200 to exit toward the build surface.

In some embodiments, the conduction liquefier 144 uses and/or includes threaded features to concentrically constrain parts (e.g., the filament 200) and allow for high amounts of modularity. A tube 148 of the liquefier 144 may be built, for example, from a 38.1 millimeter (1.5 inch) long brass set screw that is bored to 2.84 millimeter (0.112 inches) for a close fit with the major diameter of a 4-40 threaded filament. In the illustrated embodiment, approximately at a midway point lengthwise of the liquefier tube 148 is the thermal mass which can include a large aluminum block 166 with features to mount, for example, a 100K thermistor and 80 Watts, 24 Volt cartridge heater, or the like. A 0.4 millimeter brass nozzle 146 may thread onto the end of the liquefier tube 148 and tighten against the thermal mass. In some embodiments, the set point of the liquefier 144, i.e., the target melt temperature, can be approximately 260° Celsius for the duration of the print.

The input power to achieve a desired melt temperature for the liquefier 144 may be calculated based on other requirements of the liquefier 144. For instance, with a target material volume flow rate of 58 millimeters$^3$ per second and mean filament diameter of 2.45 millimeters, the input filament feed rate is calculated to be 12.5 millimeters per second. In some embodiments, to achieve a target or desired output temperature of about 230° Celsius at a feed rate of about 12.5 millimeters per second, the filament 200 must enter and/or be input into the conduction liquefier 144 at approximately 120° Celsius. Assuming an ambient temperature of approximately 25° Celsius, the pre-heater 142 is tasked with raising the filament temperature by about 95° Celsius.

The power to raise the temperature of a volume of material ($P_{IR}$) can be calculated using the material's volume flow rate (Q), material density (p), specific heat ($C_p$), and temperature change ($\Delta T$). For example, if ABS plastic is used (p=1100 kilograms per meters$^3$, $C_p$=2000 Joules per Kilogram-Kelvin or 12.3 Watts of power is needed to be absorbed in the material to raise the filament about 95° Celsius across the IR pre-heater 142. Additional power may be required to compensate for losses from elements within the IR pre-heater 142 such as the flow chamber and reflector, whose absorption coefficients can be approximately 0.05 and 0.2, respectively, at 800 nanometers in some embodiments.

In some embodiments, to determine the required laser power per filament feed velocity, a finite element model can first be generated to model the conduction liquefier section. This model can be used to determine the required bulk input temperature for the core of the filament to reach the desired melt temperature by the time it reaches the nozzle 146. For instance, to reach the desired temperature, a filament 200 input or fed at a feed rate of 15 millimeters per second into the liquefier 144 needs to have a bulk filament temperature of 180° C. at the time of input into the liquefier 144. The filament 200 is assumed to enter the extruder at room temperature, which is approximately 25° C. Therefore, the IR pre-heater needs to heat the filament 155° C. before it reaches the liquefier 144.

$$\dot{m}C_p \Delta T = P \qquad (9)$$

The power (P) required to change the temperature of a filament material can be given by Equation 9 shown above. It is a function of the change in temperature ($\Delta T$), mass flow rate ($\dot{m}$), and specific heat ($C_p$). Mass flow rate and specific heat are properties of the filament and its feed rate into the liquefier 144. In one embodiment, in which natural colored ABS filament is used and filament is fed at a feed rate of 15 millimeters per second, the mass flow rate is 0.000062 kilograms per second and specific heat is 1675 Joules per Kilograms-Kelvin. Approximately 16.2 Watts are required to raise the filament by 155° C.

A portion of radiation may be lost to the environment, thereby requiring higher input power from the IR source. Losses can be related to the optical properties of materials within the pre-heater. The approximate optical properties for exemplary materials used in the IR chamber at 800 nanometers, can be as follows:

Alumina (MACOR) ceramic:
1. Absorption≈20%
2. Reflection≈80%

Optical-grade quartz glass:
1. Absorption≈5%
2. Transmission≈95%

Natural color, matte finish ABS plastic:
1. Absorption≈29%
2. Transmission≈71%

Using a one-dimensional model, the percentage of laser power absorbed by the filament 200 can be approximated. That is, 56% of input laser power can be estimated to be absorbed while the remaining 44% will be lost. To account for these losses, the input laser power can be increased by a minimum of 44%. Thus, a minimum of 28.9 Watts of laser power can be used in the pre-heater 142 such that 16.2 Watts is delivered to the filament 200 to achieve the desired melt temperature. A person skilled in the art, in view of the present disclosures, would understand how to apply these principles to achieve other desired results.

While in the illustrated embodiment the heater 140 is described as having both the pre-heater 142 and the liquefier 144, and thus both the pre-heater 142 and liquefier 144 are disposed within a housing of the heater 140, in other embodiments the pre-heater 142 and liquefier 144 can be separate units that each have their own housing and are in fluid communication by way of a tube or other comparable structure capable of providing fluid communication between two distinct units. Further, whether the pre-heater 142 and the liquefier 144 are provided as part of the same or different heating units, they can also be referred to as chambers or heating locations such that the extruded filament passes from the extruder 110, to the first chamber 142, where it is pre-heated to or above a desired pre-heater temperature, to the second chamber 144, where it is either heated or an already established temperature of the filament is maintained such that a desired melt temperature is achieved or exceeded, and passed from the second chamber out towards the build platform 190 after the desired melt temperature is achieved or exceeded. Still further, a person skilled in the art will understand various materials that can be used to construct various components of the heater 140, the pre-heater 142, and the liquefier 144, and thus no explicit discussion about suitable materials used to construct any of the same is necessary.

In some alternative embodiments, the pre-heating and heating of filament by the pre-heater 142 and the liquefier 144 described herein may be achieved solely using a mechanism similar to the pre-heater 142 described herein. That is, a pre-heater, such as a radiative liquefier, joule heater, or other electrically-assisted heater, may be used to volumetrically raise the temperature of the filament, fed from an extruder, beyond the pre-heat temperature to the desired melt temperature. It should be understood that such a pre-heater may use a variety of known volumetric heating techniques known in the art and/or described herein. Moreover, such a pre-heater may include a pre-heater tube shaped such that the filament can be reduced cross-sectionally or otherwise shaped. In some embodiments, a distal end of the pre-heater tube can take the role of a nozzle, through which the melted filament is extruded onto a build platform.

Motion System

Figure 7A:
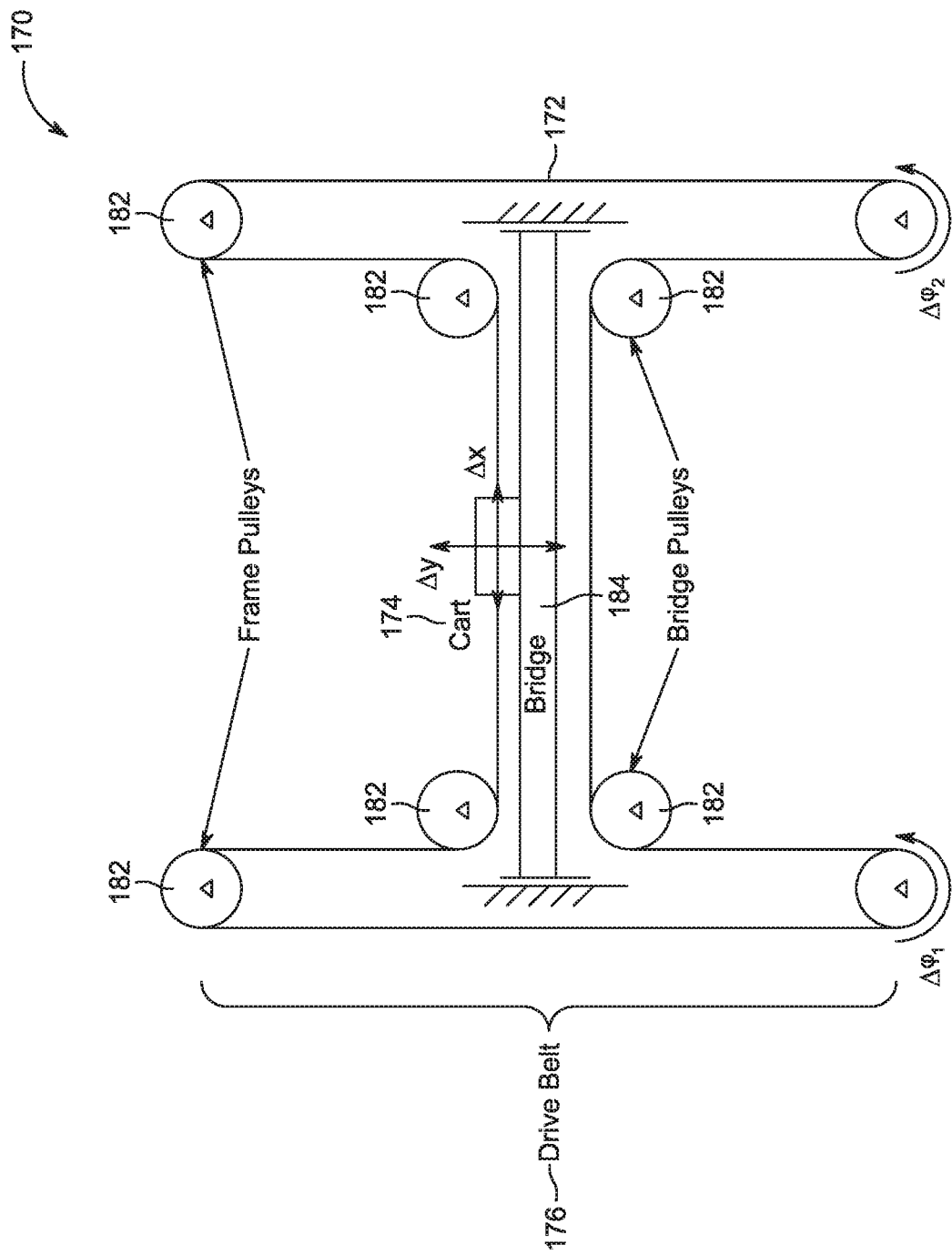
FIG. 7A is a side view of one exemplary embodiment of a motion system for positioning a nozzle and build platform of a printer.
Figure 7B:
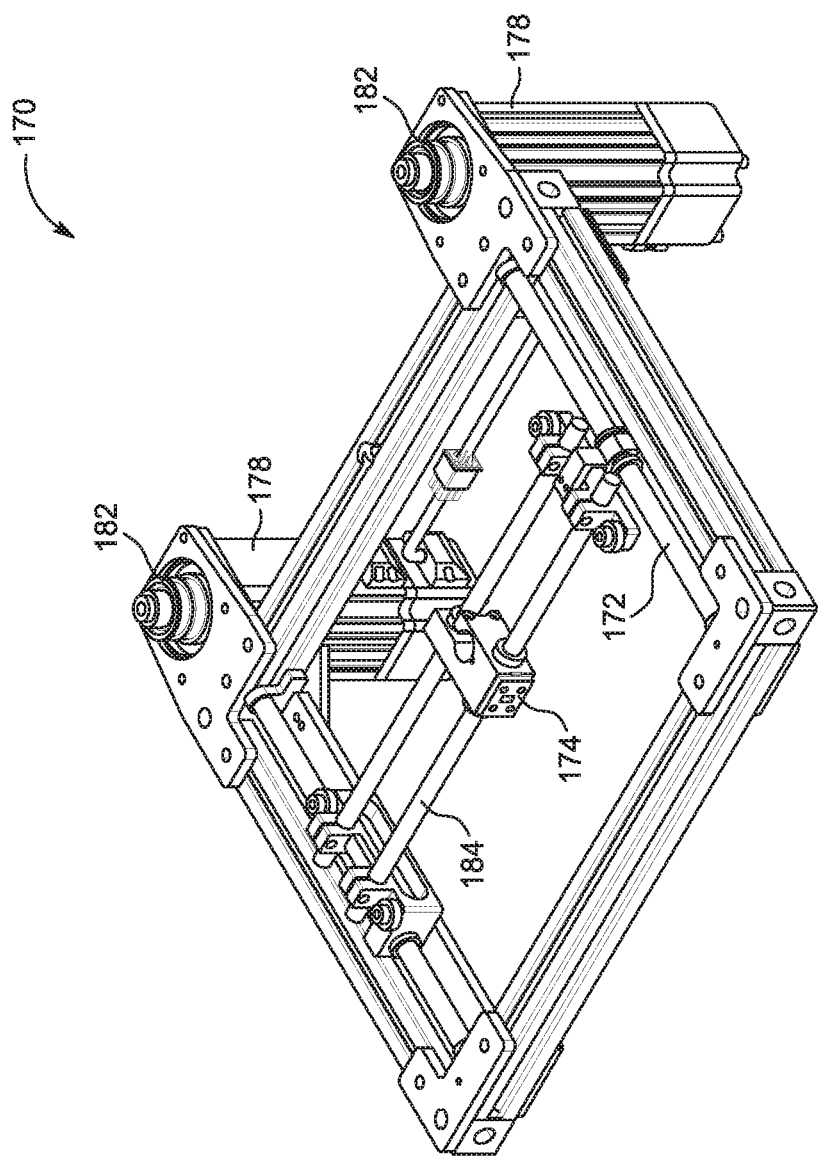
FIG. 7B is a perspective view of the motion system of FIG. 7A.
Figure 7C:
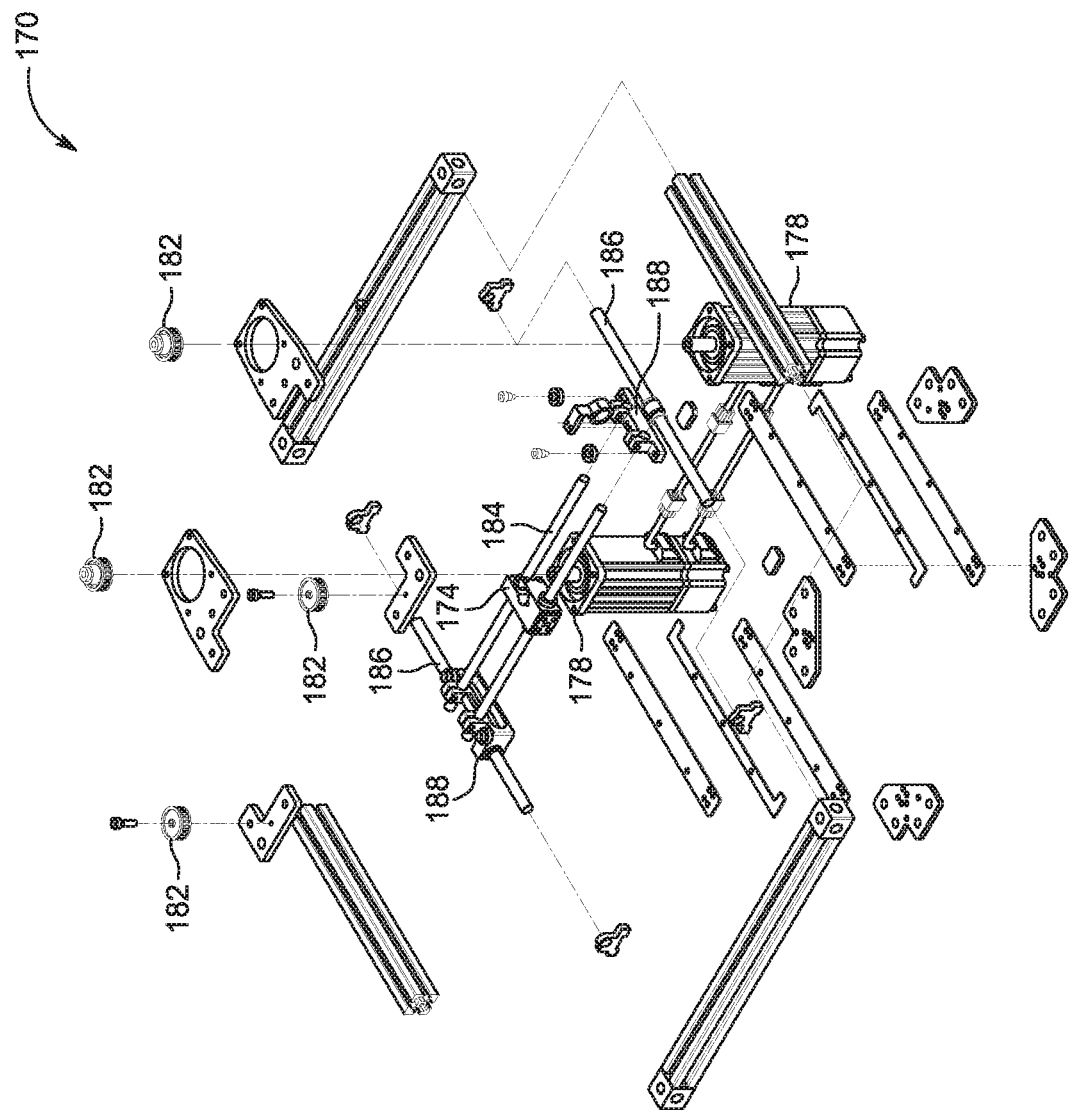
FIG. 7C is an exploded view of the motion system of FIG. 7B.

FIGS. 7A-7C illustrate the motion system 170 for positioning the second chamber 144 and/or the nozzle 146 and build platform 190 of the printer 100. In the illustrated embodiment, the motion system 170 includes an H-frame gantry 172, which is a parallel mechanism gantry capable of positioning, driving, and/or advancing an end effector (e.g., heater 140, pre-heater 142, liquefier 144, etc.) in the X-Y plane by articulation of a single continuous belt 176. As shown in FIGS. 7A and 7B, the H-frame gantry 172 may include drive motors 178, the drive belt 176, idler pulleys 182, a bridge 184, and the cart 174. The heater 140 may be assembled on and/or connected to the cart 174, as discussed above, using techniques provided for herein, derivable therefrom, or otherwise known to those skilled in the art. The H-frame gantry 172 provides reduced system inertia due to its motors being fixed to the frame, thereby decreasing the moving mass and allowing larger, more powerful motors to be used without negatively affecting the positioning speed. To further increase performance, servomotors may be used to drive the gantry 172 (e.g., instead of stepper motors or the like). Generally, servomotors are motors with a feedback mechanism such as encoders and/or hall-effect sensors.

Movement of the cart 174 in the X and Y directions on an X-Y plane is coordinated by the drive motors 178 of the H-frame gantry 172. This relationship can be expressed using the kinematic equations which describe H-frame position ($\Delta_x$, $\Delta_y$) as functions of the change in motor angles ($\Delta\varphi 1$, $\Delta\varphi 1$) and their drive pulley radii (r). Using the H-frame architecture, in some examples, motion of a single axis is driven by the motors 178. Up to twice the motor torque is thus available for accelerated movement, because both motors 178 can be used in parallel for positioning of the cart 174. Moreover, in some embodiments, the H-frame gantry 172 can include and/or use a single, continuous belt, such as the belt 176. The stiffness of the belt 176 can have a significant influence on the system dynamics and can therefore be modeled as a spring. Stiffness of a constant cross-section in tension can be calculated using the stiffness of the material of the belt 176, function of its cross sectional area, its length, and the material modulus of elasticity. The cross-section of timing belts used in tangential belt drive can be defined by the peaks of the teeth and the troughs of the body. The overall belt stiffness is, in some embodiments, defined as the summation of springs with stiffness corresponding to the peak and trough geometry of the timing belt.

The H-frame gantry 172 is a multiple-input, multiple-output (MIMO) system and therefore, the H-frame gantry 172 must be analyzed using a state-space approach, which is well suited to multi-variable system controls. In some example embodiments, variables X and Y are vectors containing state variables of the system. Variables A, B, C, and D can be called the system matrix, input matrix, output matrix, and feedthrough matrix, respectively. Formulation of the state-space matrices occurs after derivation of the kinematic equations, which may be performed using Lagrange's equations. Lagrange's equation balances non-conservative work with sources of potential and kinetic energy. In Lagrange's equation, sources of kinetic energy in the H-frame include the cart, the bridge, and the eight pulleys. Sources of potential energy in the gantry include the belts due to stretching. When all possibly independent variables (e.g., pulleys, belt segments, etc.) are considered, the gantry can reach a $20^{th}$ order. In some embodiments, Lagrange's equation can be simplified to an $8^{th}$ order model for the H-frame gantry 172. A person skilled in the art will recognize other configurations of gantries that can be utilized besides an H-frame gantry. Some of these include, but are not limited to R-theta and delta.

In one embodiment, printhead positioning is performed using the H-frame gantry 172 to position the nozzle in the X-Y axis and a lead screw linear actuator 192 to position the build platform 190 in the Z-axis. The H-frame gantry 172, in example embodiments presented herein, is based around two perpendicular sets of hardened precision rods 186 (e.g., 304.8 millimeters for length; 9.52 millimeters for diameter) held rigidly at a fixed separation. The mounting blocks 188 for the bridge 184 and cart 174 hold linear bearings which allow the respective elements to move with low friction. Motor and frame-located idler pulleys 182 may be 40T MXL pitch timing pulleys which have a pitch diameter of 25.88 millimeters (1.019 inches). The pulleys can be driven, for example, by a pair of 400 Watt servomotors (FM-04B-PB22). Shielded-race, 12.7 millimeter (0.5 inches) outer diameter ball bearings can be used for the bridge-located idler pulleys 182. All pulleys 182 and the cart 174 can be connected through a single 6.35 millimeters (0.25 inches)

wide MXL urethane timing belt 176 with Kevlar tension members. In some example embodiments, the H-frame working area spans approximately 220 millimeters×220 millimeters.

In some examples, the H-frame gantry 172 is used with a conventional print bed position, a Velmex Unislide lead screw linear stage with a pitch of about 1.27 millimeters (0.05 inches), and coupled with a stepper motor (e.g., Kysan 1124090 200 steps per revolution) for motorized open-loop control of the bed. The linear stage allows for 200 millimeters of vertical travel, thereby amounting to a build volume of 9680 cm$^3$.

A required or target maximum linear speed for either axis can be calculated or determined from the material deposition rate, road width, and layer height. The target maximum linear speed can be combined with the gantry kinematics in order to determine a target (e.g., maximum required) motor speed. In some example embodiments, motor angular rate may be calculated using the material deposition rate and physical parameters of the printer including the drive pulley radius.

A person skilled in the art will understand various materials that can be used to construct various components of the motion system 170, the frame 180, and the build platform 190, including but not limited to those described above with respect to aspects of the frame 180, walls 182, and build platform 190, and thus no explicit discussion about suitable materials used to construct any of the same is necessary.

Figure 8C:
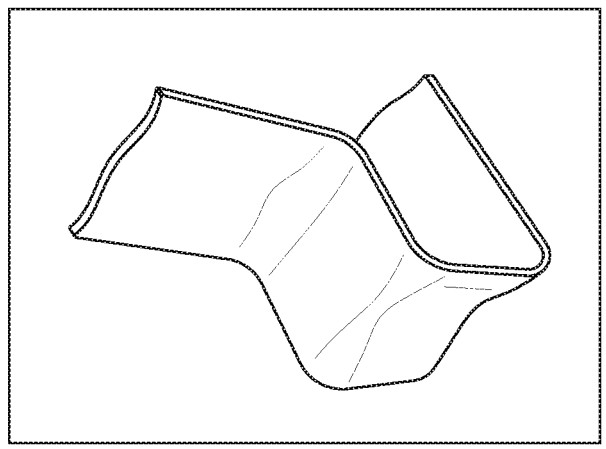
FIG. 8C is a perspective view of a printed miniature chair using the CAD model of FIG. 8A and the toolpath of FIG. 8B.
Figure 8B:
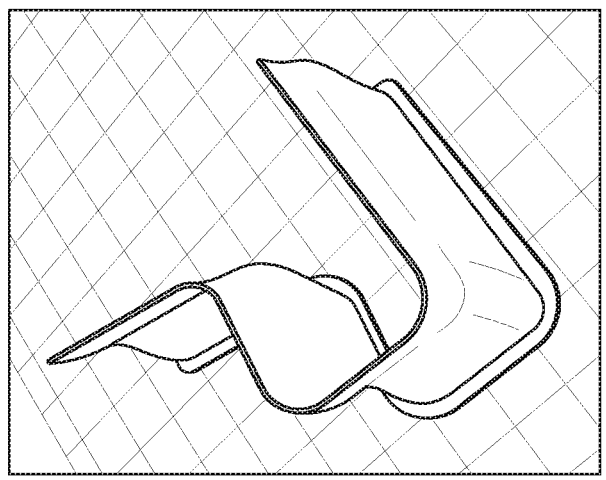
FIG. 8B is a perspective view of a toolpath generated by software used in conjunction with the CAD model of FIG. 8A to print the chair.
Figure 8A:
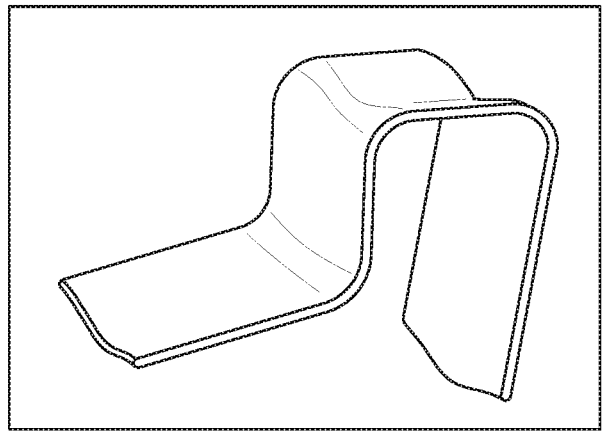
FIG. 8A is a perspective view of a CAD model of a miniature chair that can be printed using exemplary devices and methods provided for herein.
Figure 9A:
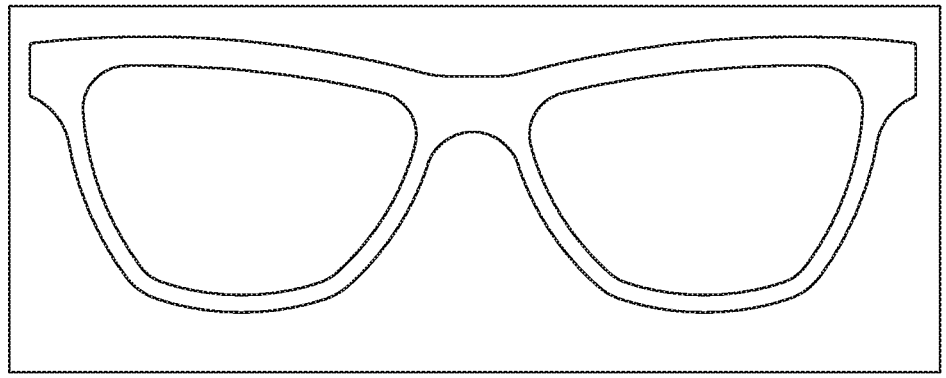
FIG. 9A is a perspective view of a CAD model of a pair of glasses that can be printed using exemplary devices and methods provided for herein.
Figure 9B:
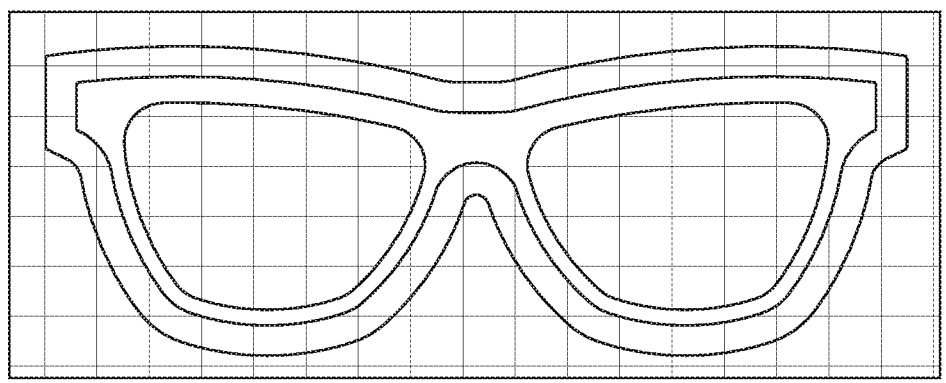
FIG. 9B is a perspective view of a toolpath generated by software used in conjunction with the CAD model of FIG. 9A to print the pair of glasses.
Figure 9C:
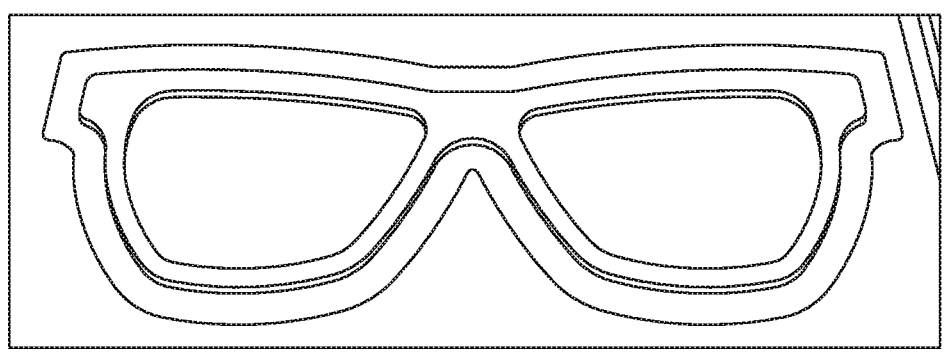
FIG. 9C is a perspective view of a printed pair of glasses using the CAD model of FIG. 9A and the toolpath of FIG. 9B.

The embodiments described herein enable high-throughput three-dimensional printing. FIGS. 8A-8C and 9A-9C illustrate sample parts, a miniature chair and eyeglasses frames, respectively, created using the systems and methods described herein. More specifically, FIGS. 8A and 9A illustrate a computer aided design (CAD) model 898A, 998A of the part or object, FIGS. 8B and 8B illustrate a toolpath 898B, 9981 generated by part slicing software generally known to those skilled in the art, and FIGS. 8C and 8C illustrate a final, printed part 898C, 998C as removed from the printer.

The illustrated chair 898C and glasses 998C were printed at 100% density with a 0.4 millimeter diameter nozzle and 0.2 millimeter layer height. Neither part required support structures. Accordingly, the following print times reflect the true print time unaltered by auxiliary printer tasks such as material changes or nozzle cleaning. The chair 898C was completed in approximately three minutes and the glasses frames 998C were completed in approximately four minutes. A decrease in print time from existing technologies is due in part to the increased infill and perimeter speeds of printing which run up to 600 millimeters per second and 200 millimeters per second, respectively. Perimeters are printed slower to give high edge and surface quality. Thus, the chair, being composed of only shells, printed at a slower average rate when compared to the glasses, but still four times faster than current commercial printers, which print the same parts at approximately 22 minutes and 13 minutes, respectively.

Rapid Flow Control

In the embodiments described herein, material is extruded to print or generate a three-dimensional object. More specifically, an extruder extrudes filament material towards a heating mechanism configured to heat the filament to a desired temperature. The material is in turn deposited via a nozzle onto desired coordinates on or above a build platform by controlling the location of the nozzle using a motion system. Typically, the part is constructed by outputting filament material to outline the cross-section of the part in a number of centric shells also known as the perimeter, and filling the internal area of the perimeter with a back and forth raster also known as the infill. Thus, as the motion system moves in a steady-state fashion, the filament material can be constantly output such that roads of material can be consistently laid down with optimal dimensional accuracy onto the build platform or atop the object created thereon.

At the ends of each back and forth raster and/or corners of a toolpath for printing of a part, the printhead changes directions, which in turn causes the motion system to decelerate and accelerate with respect to at least one of its control axes. Because the motion system does not necessarily operate in a steady state at that moment, underfill or overfill defects during the printing can occur. That is, a mismatch between the movement rate of the motion system and the flow rate of the filament material can cause the filament material to be deposited or output at a rate that is different than the nominal rate of material deposition relative to the instantaneous velocity of the nozzle. Due to the viscoelastic properties of exemplary printing materials, such as thermoplastics, dynamic modulation of the flow rate by control of the extrusion feed rate (e.g., the pinch wheel velocity, or the nut feed rotation rate) is limited in its bandwidth. Therefore, it is desirable to modulate the flow of material using means located close to the exit of the nozzle. The following rapid flow control embodiments described in FIGS. 10A, 10B, 11A, 11B, 12A, and 12B may be used to quickly control the flow of filament material during high-throughput extrusion-based additive manufacturing.

By virtue of the rapid flow control described herein, the following issues with current techniques for stopping the flow of filament may be addressed. For instance, using current techniques, even if the feeding of the filament material through the extruder and heating mechanism is halted, the filament material may continue to flow from the nozzle due to, for example, thermal expansion, die swell, or other phenomena that are functions of temperature and feed rate. Moreover, stopping the flow or reversing the filament feed a small amount to alleviate pressure within the liquefier typically fails to prevent material from flowing out of the nozzle, even if the flow of the material is reduced. Pulling the section of filament backwards can result in necking and/or breakage of the polymer. The filament body cannot generally be used to pull the molten or melted material away from the nozzle and the liquefier because the filament body typically does not form a seal with the feed tube, given that the diameter of the filament body is generally smaller than the diameter of the feed tube. Thus, the rapid flow control techniques described herein can quickly change the viscosity of the material by changing its temperature and/or modulating the volume of the liquefier chamber deeper into the melt as to maintain a seal.

Figure 10A:
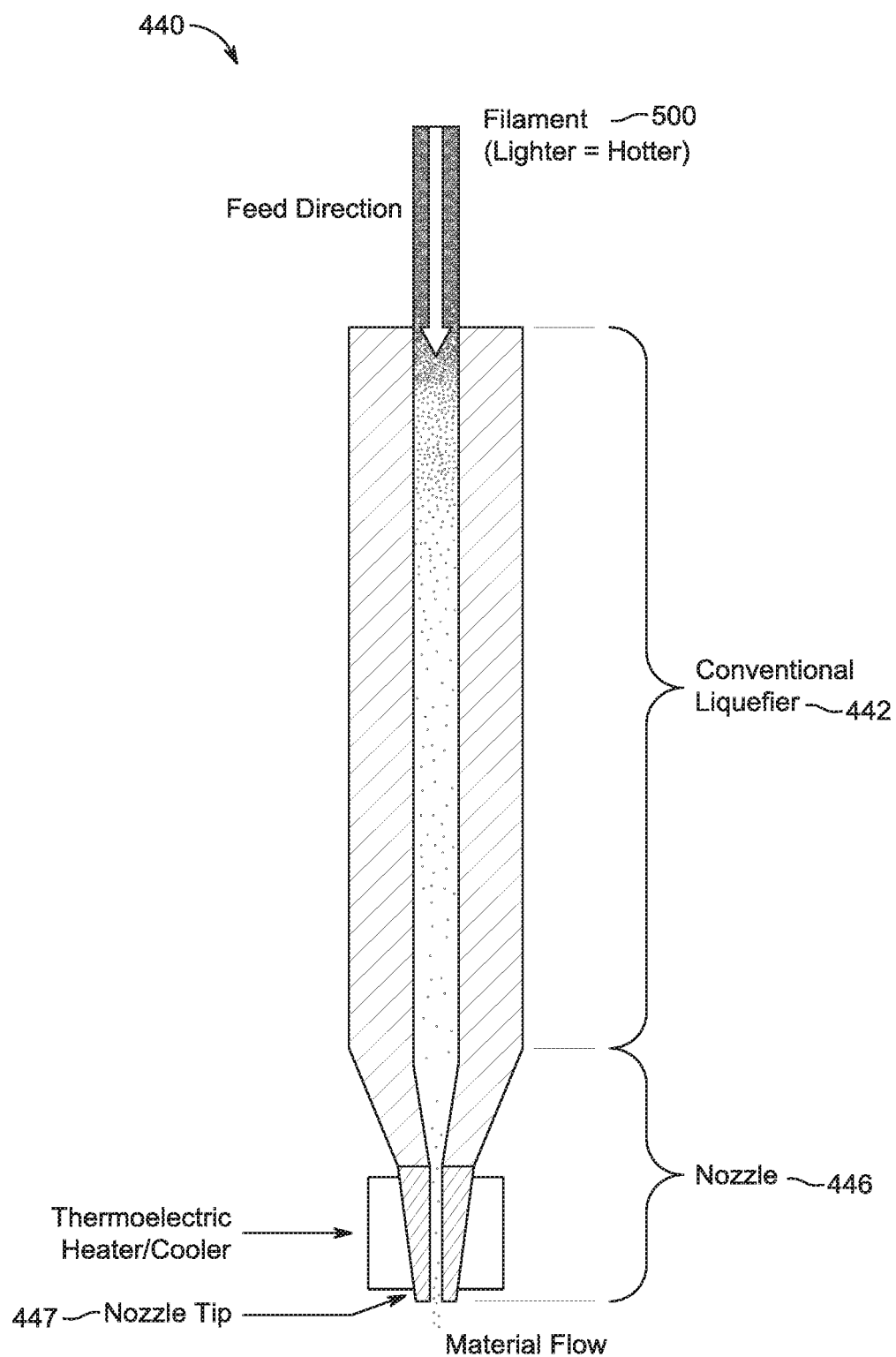
FIG. 10A is a side cross-sectional view of yet another exemplary embodiment of a printing device in which material flows through a distal end of the printing device.

As shown in FIG. 10A, a filament 500 is fed through an extruder (not illustrated) in a feed direction towards a heater 440. The heater 440 can include a conventional liquefier 442 and a nozzle 446. The nozzle 446 can be formed of one or more materials with different thermal coefficients to further increase its heat transfer rate. For instance, the nozzle 446 can be made of machined brass, steel, stainless steel, or silver. Moreover, the nozzle tip 447 can be a thin-walled tube to reduce the volume of material therein that is to be heated or cooled. That is, because the nozzle 446 and nozzle tip 447 are regions of smallest diameter in the extrusion process, the volume of material to be cooled or heated is thin or small, and therefore the highest thermal frequency response can be achieved.

As described above in further detail, the conventional liquefier 442 can heat the temperature of the filament 500 to a desired temperature such that a desired flow rate of the filament material is achieved. The heated and/or melted filament material can be output and/or flow through the nozzle tip 447 disposed at a distal end of the nozzle 446. To rapidly control the flow of the material, the nozzle 446 can include and/or can have attached thereto a thermoelectric heater or cooler configured to raise or lower the temperature of the nozzle 446, resulting in a corresponding change of temperature of the material of the filament 500.

FIG. 10A shows the material of the filament 500 that has been heated and is flowing through the nozzle 446 and the nozzle tip 447. The thermoelectric heater of the nozzle 446 may either be: (1) heating the filament 500 to achieve or maintain a desired melt temperature; or (2) turned to an off position such that it is neither heating nor cooling the filament (which is instead being heated to the desired temperature by the liquefier 442).

Figure 10B:
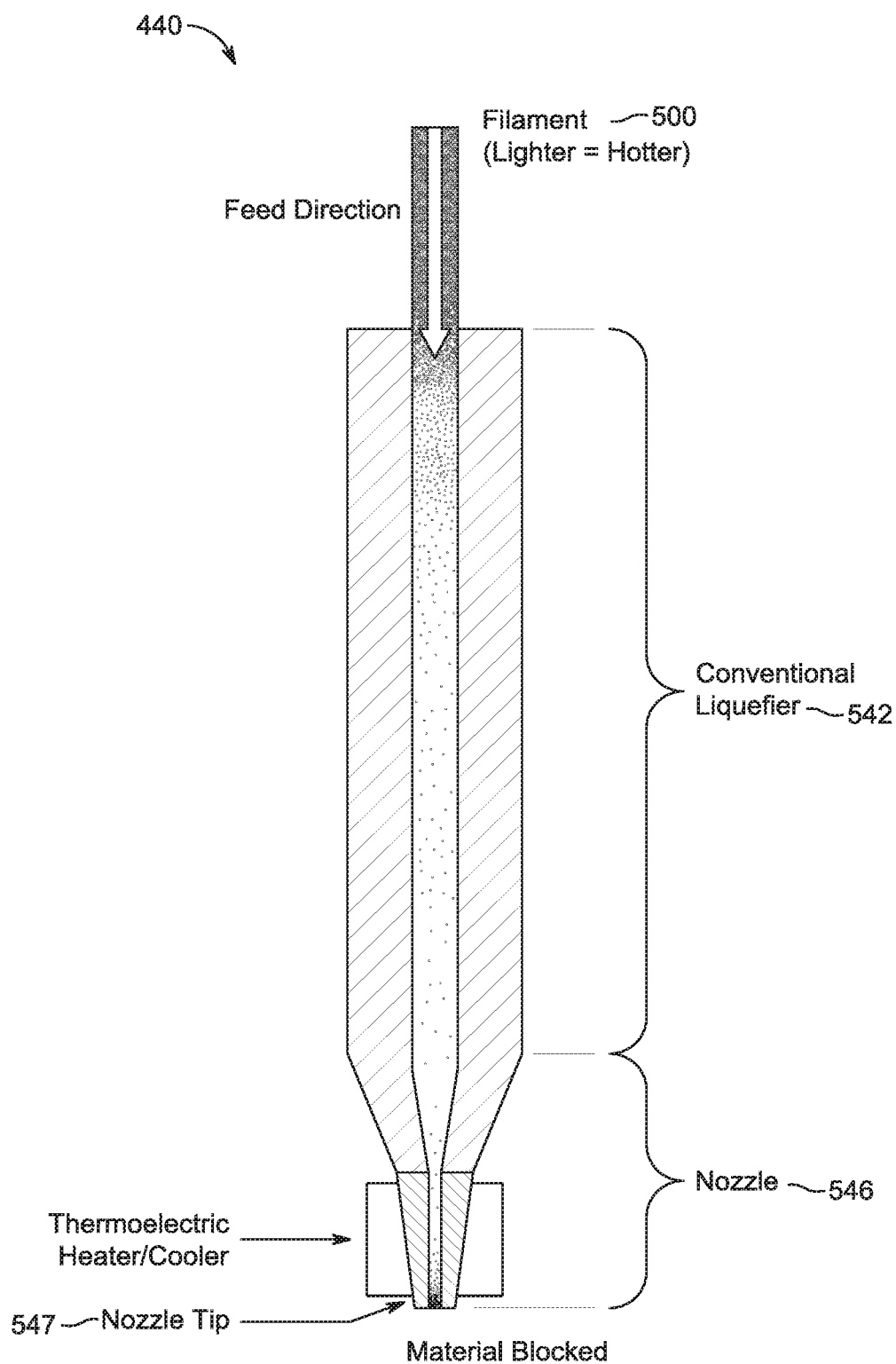
FIG. 10B is a side cross-sectional view of the printing device of FIG. 10A in which material is blocked at the distal end of the printing device.

FIG. 10B shows the material of the filament 500 when it is blocked and/or not flowing through the nozzle 446 and nozzle tip 447. That is, when a command to stop or slow the flow of the material is received by the heater 440 or its corresponding printer, the temperature of the nozzle 446 and/or nozzle tip 447 is/are lowered. Lowering the temperature of the nozzle 446 and/or nozzle tip 447 causes the temperature of the filament material to be reduced, causing an increase in the viscosity of the material. By sufficiently lowering the temperature of the filament material, the viscosity of the material is increased, such that its flow rate is decreased momentarily and optionally it does not flow out of the nozzle 446 and/or nozzle tip 447. The thermoelectric heater can be used to heat the nozzle 446 and/or nozzle tip 447 such that the temperature of the material of the filament 500 is raised and its viscosity is lowered, thereby permitting its flow out of the nozzle tip 447. It can be appreciated that, due to the nonlinear relationship between viscosity and temperature of thermoplastics, only a small change in temperature can significantly change the flow resistance in the nozzle thus altering the flow rate of the polymer through the nozzle while the force applied to the filament may remain approximately the same.

Figure 11A:
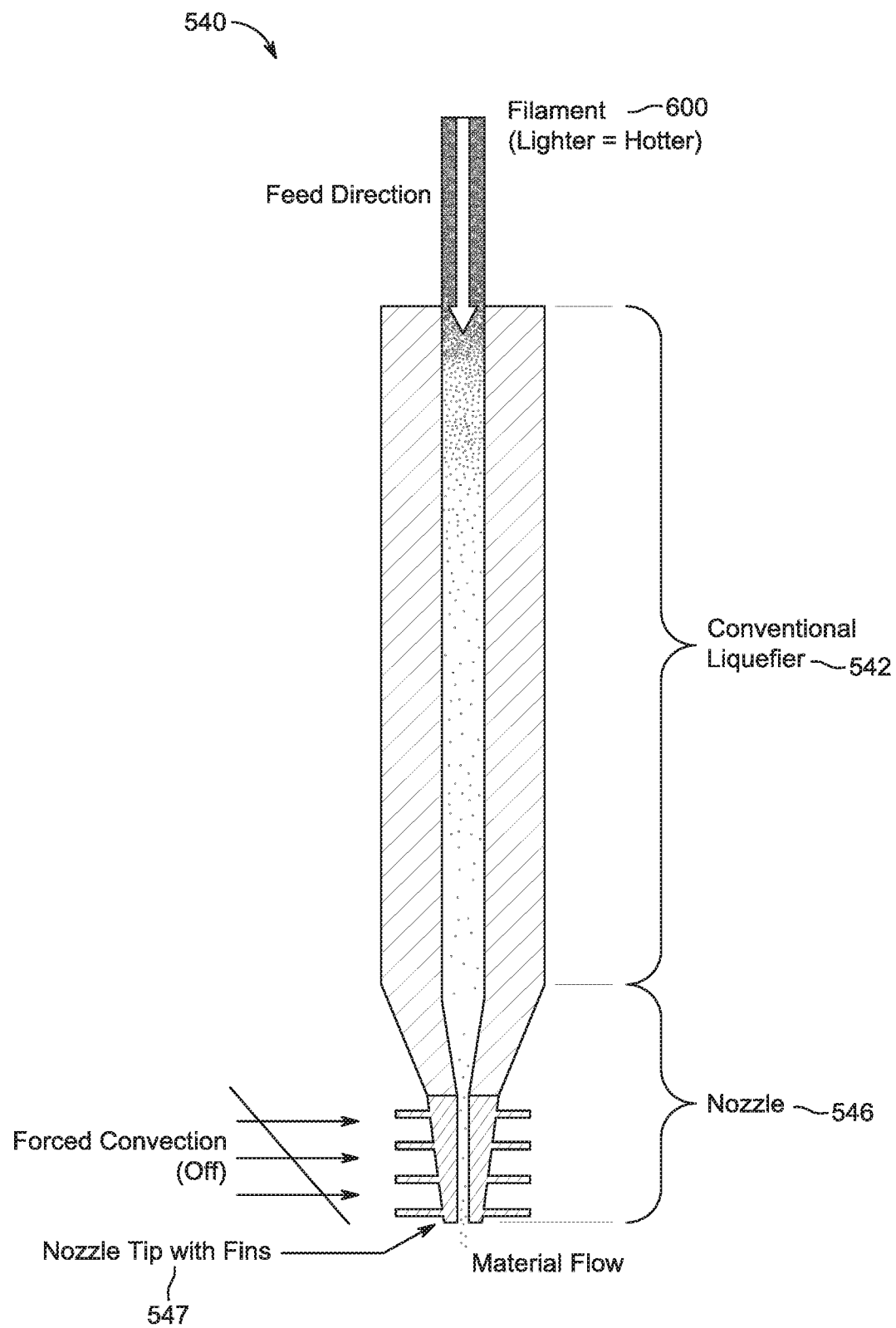
FIG. 11A is a side cross-sectional view of another exemplary embodiment of a printing device in which material flows through a distal end of the printing device.
Figure 11B:
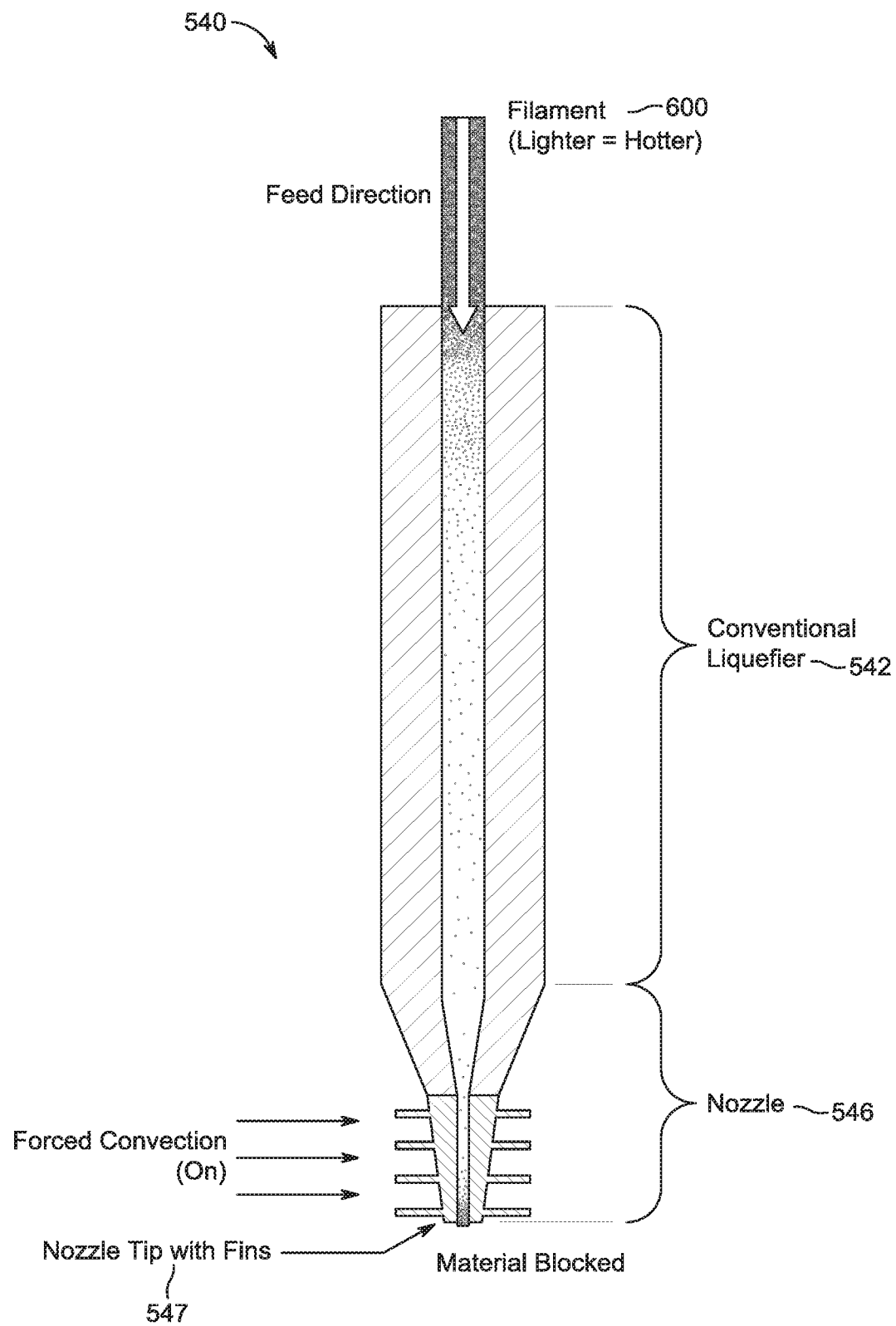
FIG. 11B is a side cross-sectional view of the printing device of FIG. 11A in which material is blocked at the distal end of the printing device.

FIGS. 11A and 11B show a heater 540 while the material of the filament 600 is flowing out of the nozzle tip 546 (FIG. 11A) and while the material of the filament 600 is blocked (FIG. 11B). In FIGS. 11A and 11B, when a command to stop or slow the flow of the material is received by the heater 540 or its corresponding printer, the temperature of the nozzle 546 and/or nozzle tip 547 is/are lowered using forced convection of cold air. That is, to lower the temperature of the material of the filament 600, a forced convection of cold air is directed at or across the tip of the nozzle 546 and/or nozzle tip 547 from a forced convection source (not shown). Sufficiently lowering the temperature of the nozzle 546 and/or nozzle tip 547 causes the material of the filament 600 to be blocked or stopped from flowing out of the nozzle tip 547. The temperature of the filament 600 can be heated using a forced convection of hot air such that the nozzle 546 and/or nozzle tip 547 are sufficiently heated to allow the filament to flow. In some embodiments, the nozzle 546 may include fins or similar convex portions configured to transmit heat distally away from the nozzle 546 such that the rate of cooling or heating, as desired, is increased.

Figure 12A:
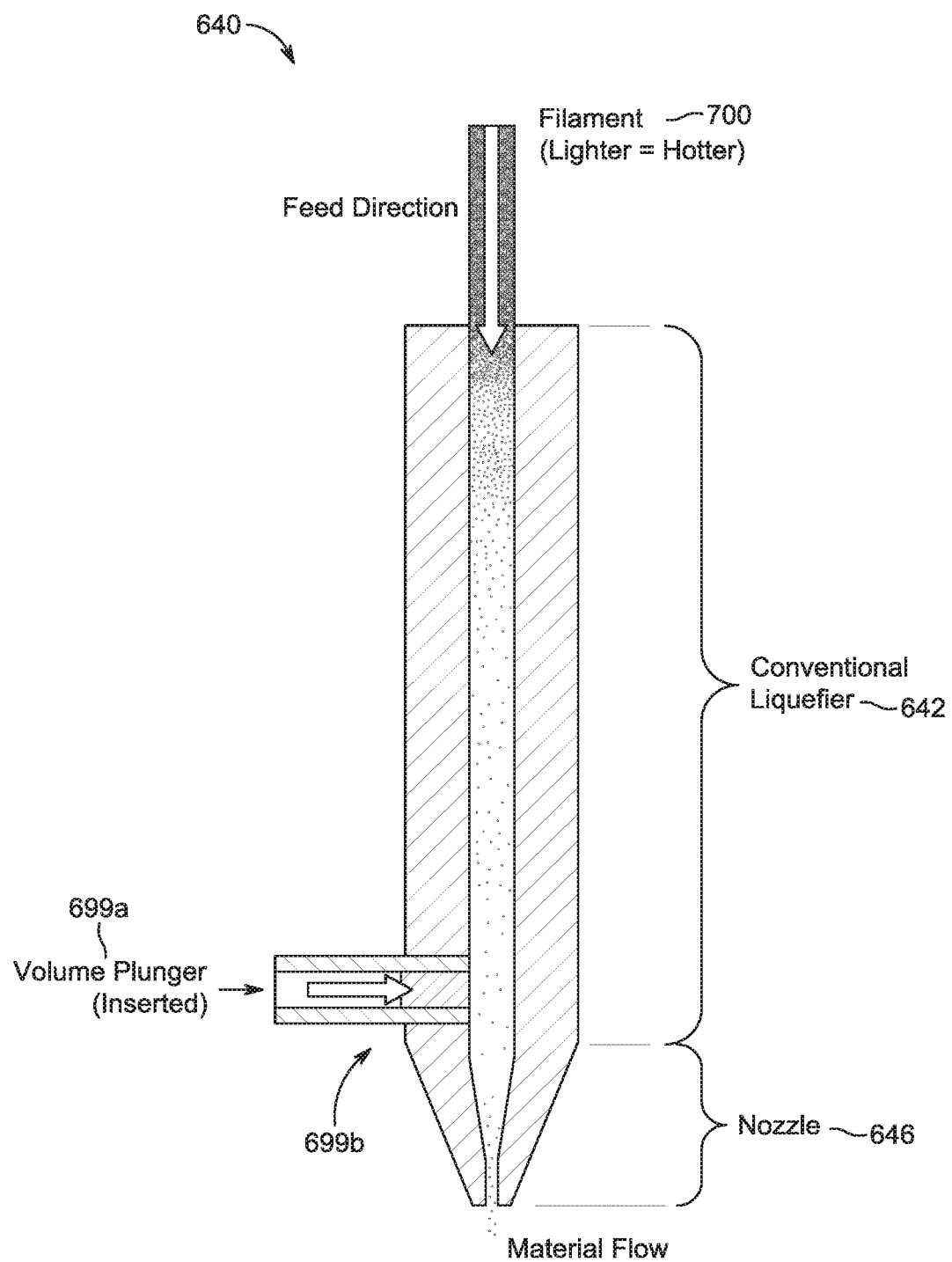
FIG. 12A is a side cross-sectional view of still another exemplary embodiment of a printing device in which material flows through a distal end of the printing device.
Figure 12B:
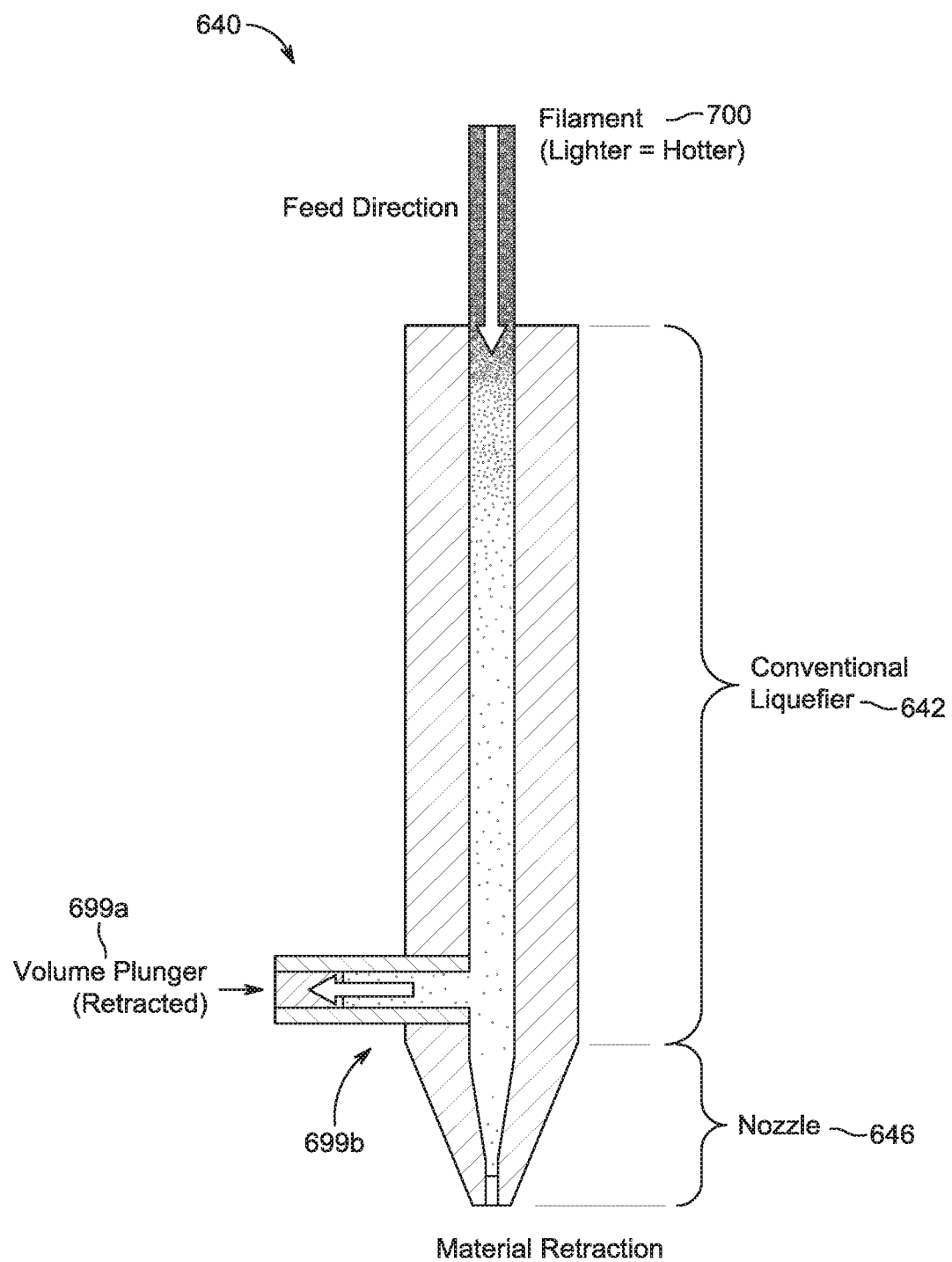
FIG. 12B is a side cross-sectional view of the printing device of FIG. 12A in which material has retracted.

In another embodiment, flow of material can be rapidly controlled by controlling the volume of material within the liquefier. As shown in FIGS. 12A and 12B, a heater 640 includes a volume plunger 699a and a corresponding auxiliary chamber 699b. The chamber 699b is connected to the chamber of the liquefier 642. When the plunger 699a is inserted proximally towards the liquefier 642, as shown in FIG. 12A, the chamber 699b can be blocked off and the volume of the liquefier 642 can remain the same. On the other hand, when the plunger is retracted distally away from the liquefier 642, as shown in FIG. 12B, the volume of the liquefier is increased to further include the volume of the chamber 699b.

The plunger 699a can be tightly sealed to the walls of the chamber 699b such that when it is retracted, molten material is pulled into the chamber 699b (and/or away from the nozzle 646). This plunger 699a can be articulated by way of linear actuators, such as solenoids, voice coils, and lead screw drives, or other components known by those skilled in the art to serve a similar purpose. Rotary actuators may be used for small angular motions to approximate linear motion. In other embodiments, a compliant diaphragm can be used to modulate volume in the chamber and/or liquefier, and to create a driving force to oppose flow of material from the chamber.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. An extrusion system, comprising:
    an extruder;
    a pre-heater in fluid communication with the extruder; and
    a liquefier in fluid communication with the pre-heater,
    wherein the extruder is configured to advance a filament through the pre-heater and the liquefier towards a build platform,
    wherein the pre-heater comprises an infrared radiation source, an infrared reflector chamber next to the infrared radiation source and a transparent flow channel arranged within the infrared reflector chamber and configured to receive the filament from the extruder, the infrared radiation source and the infrared reflector chamber are configured to transmit infrared radiation to the filament as the filament is advanced by the extruder through the transparent flow channel to volumetrically raise a temperature of the filament to at least a desired pre-heat temperature in a substantially uniform manner across a volume of the filament that extends normal to a longitudinal axis of the filament, and
    wherein the liquefier is configured to maintain or raise the temperature of the filament that passed through the pre-heater to at least a desired melt temperature prior to the filament exiting the liquefier, towards the build platform.

2. The extrusion system of claim 1, further comprising:
    a gantry; and
    a cart having the liquefier coupled thereto,
    wherein the gantry is configured to move the cart in an X-Y plane to position the liquefier to one or more target X-Y coordinates in the X-Y plane.

3. The extrusion system of claim 2, wherein the gantry is an H-frame gantry.

4. The extrusion system of claim 2, further comprising:
    the build platform towards which the filament is extruded after it exits the liquefier, the build platform being configured to be positioned on one or more Z coordinates along a Z-axis that interests the X-Y plane,
    wherein the gantry and build platform are configured to operate together such that filament extruded by the extruder through the liquefier is extruded onto one or more target X-Y-Z coordinates.

5. A printer for printing three-dimensional objects, the printer comprising the extrusion system of claim 4.

6. The extrusion system of claim 1, wherein the pre-heater and the liquefier are disposed within a housing of a single heating unit.

7. The extrusion system of claim 1, wherein the extruder is a nut feed extruder, the extruder further comprising a rotatable feed nut having one or more internal engagement features that are configured to engage one or more complementary mating external engagement features disposed on the filament advanced by the extruder to impart a force on the one or more complementary mating external engagement features and advance the filament through the pre-heater and the liquefier towards the build platform upon rotation of the feed nut.

8. The extrusion system of claim 7, wherein the rotatable feed nut is configured to advance the filament towards the build platform by rotating about an axis along which the filament is fed into the feed nut, the feed nut having internal engagement features formed thereon that are configured to engage with the filament such that the feed nut applies force to the filament along the feed axis.

9. The extrusion system of claim 7, wherein the filament is a threaded filament and the one or more complementary mating external engagement features are one or more external threads that are complementary to the one or more internal engagement features of the rotatable feed nut such that the one or more internal engagement features are configured to impart a force on the one or more external threads to advance the filament towards the build platform upon rotation of the feed nut.

10. The extrusion system of claim 9,
wherein the threaded filament comprises a first material that melts when it is heated to the desired melt temperature and a second material that remains solid or less viscous than the first material when they are heated to the desired melt temperature.

11. The extrusion system of claim 7, wherein the internal engagement features of the feed nut and the external engagement features of the filament comprise one or more complementary geometric configurations selected from the group consisting of: mating periodic textures, triangles, rectangles, and threads.

12. The extrusion system of claim 7, wherein the extruder comprises a die configured to generate one or more engagement features on an exterior of filament advanced by the extruder.

13. The extrusion system of claim 1, further comprising a controller configured to adjust at least one of power supplied to the pre-heater, power supplied to the liquefier, and force applied to a feed nut of the extruder to modify at least one of the desired pre-heat temperature, the desired melt temperature, and a feed rate of the extruder based on received real-time parameters of the system, the real-time parameters including at least one of the following parameters: (1) an extrusion force applied by the extruder on the filament advanced by the extruder; (2) the feed rate of the extruder; (3) a temperature of the filament prior to the filament entering the pre-heater; (4) a temperature of the filament prior to the filament entering the liquefier; and (5) a temperature of the filament prior to or concurrently with the filament exiting the liquefier, towards the build platform.

14. The extrusion system of claim 1, wherein the pre-heater is configured to create heat-flux across the volume of the filament in a direction extending normal to a longitudinal axis of the filament in an instantaneous or nearly instantaneous manner.

15. The extrusion system of claim 1, wherein the extrusion system is configured to deposit the filament at a rate of at least 200 millimeters per second.

16. An extrusion system, comprising:
an extruder including a feed nut, the feed nut being configured to advance a filament towards a build platform by rotating about a feed axis along which the filament is fed into the feed nut, and the feed nut having one or more internal engagement features formed thereon that are configured to engage with the filament such that the feed nut applies force to the filament along the feed axis;
a pre-heater in fluid communication with the extruder; and
a liquefier in fluid communication with the pre-heater,
wherein the pre-heater comprises an infrared radiation source, an infrared reflector chamber next to the infrared radiation source, and a transparent flow channel arranged within the infrared reflector chamber and configured to receive the filament from the extruder, the infrared radiation source and the infrared reflector chamber are configured to transmit infrared radiation to the filament as the filament is advanced by the extruder through the transparent flow channel to volumetrically raise a temperature of the filament to at least a desired pre-heat temperature in a substantially uniform manner across a volume of the filament that extends normal to a longitudinal axis of the filament, and
wherein the liquefier is configured to maintain or raise the temperature of the filament that passed through the pre-heater to at least a desired melt temperature prior to the filament exiting the liquefier, towards the build platform.

17. The extrusion system of claim 16, wherein the extruder comprises a die configured to generate one or more engagement features on an exterior of filament advanced by the extruder.

18. The extrusion system of claim 16, wherein the one or more internal engagement features are substantially perpendicular to the feed axis when they engage the filament.

19. The extrusion system of claim 16, wherein the one or more internal engagement features are configured to engage one or more complementary engagement features formed on an outer surface of the filament.

20. The extrusion system of claim 16, wherein the filament is a threaded filament and the one or more complementary mating external engagement features are one or more external threads that are complementary to the one or more internal engagement features of the feed nut such that the one or more internal engagement features are configured to impart a force on the one or more external threads to advance the filament through the extruder upon rotation of the feed nut.

21. The extrusion system of claim 20,
wherein the threaded filament comprises a first material that melts when it is heated to the desired melt temperature and a second material that remains less viscous than the first material when they are heated to the desired melt temperature, and
wherein the second material is more conductive than the first material.

22. The extrusion system of claim 16, wherein the one or more internal engagement features of the feed nut and one or more external engagement features of the filament comprise one or more complementary geometric configurations selected from the group consisting of: mating periodic textures, triangles, rectangles, and threads.

23. The extrusion system of claim 16, wherein the preheater is configured to create heat-flux across the volume of the filament in a direction extending normal to a longitudinal axis of the filament in an instantaneous or nearly instantaneous manner.

24. The extrusion system of claim 16, wherein the extrusion system is configured to deposit the filament at a rate of at least 200 millimeters per second.

* * * * *